(12) United States Patent
Nazarathy et al.

(10) Patent No.: US 9,008,512 B2
(45) Date of Patent: Apr. 14, 2015

(54) OPTICAL NETWORK UNIT, OPTICAL ACCESS NETWORK AND A METHOD FOR EXCHANGING INFORMATION

(75) Inventors: Moshe Nazarathy, Haifa (IL); Amos Agmon, Kiriat Tivon (IL); Dan M. Marom, Mevaseret Zion (IL)

(73) Assignees: Technion Research and Development Foundation Ltd., Haifa (IL); Yissum Research Development Company of the Hebrew University of Jerusalem Ltd, Jerusalem (IL)

( * ) Notice: Subject to any disclaimer, the term of this patent is extended or adjusted under 35 U.S.C. 154(b) by 192 days.

(21) Appl. No.: 13/805,344

(22) PCT Filed: Jun. 22, 2011

(86) PCT No.: PCT/IB2011/052743
§ 371 (c)(1),
(2), (4) Date: Mar. 14, 2013

(87) PCT Pub. No.: WO2011/161637
PCT Pub. Date: Dec. 29, 2011

(65) Prior Publication Data
US 2013/0216228 A1    Aug. 22, 2013

Related U.S. Application Data

(60) Provisional application No. 61/357,097, filed on Jun. 22, 2010, provisional application No. 61/357,544, filed on Jun. 23, 2010.

(51) Int. Cl.
*H04J 1/14* (2006.01)
*H04J 14/02* (2006.01)
(Continued)

(52) U.S. Cl.
CPC .......... *H04J 14/0227* (2013.01); *H04B 10/272* (2013.01); *H04J 14/002* (2013.01);
(Continued)

(58) Field of Classification Search
CPC .......................................................... H04J 1/14
USPC ...................................................... 398/65, 69
See application file for complete search history.

(56) References Cited

U.S. PATENT DOCUMENTS 7,197,205 B1 * 3/2007 BuAbbud ........................ 385/24

*Primary Examiner* — Danny Leung
(74) *Attorney, Agent, or Firm* — Oren Reches

(57) ABSTRACT

An Optical Access Network, a Optical Network Unit (ONU) and various methods for exchanging information are provided. The method may include: receiving, by the ONU, a pilot signal and down-stream information signals; wherein the pilot signal is received at a pilot frequency slot and the downstream information signals are received at a downstream information frequency slot; wherein the ONU is allocated with a spectral slice that comprises the pilot frequency slot, the downstream information frequency slot, a guard frequency slot and an upstream information frequency slot; wherein at least one other spectral slice is allocated for exchanging information with at least one other group of ONUs; splitting the downstream information signals to downstream information signals portions; splitting the pilot signals to pilot signals portions; detecting downstream information, in response to at least a first portion of downstream information signals; modulating a portion of the pilot signal by upstream information signals to provide upstream information signals that are within the upstream information frequency slot; modulating a second portion of the downstream information signals by the upstream information signals to provide upstream secondary signals that are outside the pilot frequency slot, the downstream information frequency slot and the upstream information frequency slot; and upstream transmitting the upstream information signals and the upstream secondary signals.

31 Claims, 25 Drawing Sheets

(51) Int. Cl.
*H04B 10/272* (2013.01)
*H04J 14/00* (2006.01)
*H04J 14/06* (2006.01)
*H04L 5/00* (2006.01)
*H04L 27/20* (2006.01)
*H04L 27/26* (2006.01)

(52) U.S. Cl.
CPC ............ *H04J14/0282* (2013.01); *H04J 14/06* (2013.01); *H04L 5/0023* (2013.01); *H04L 5/0048* (2013.01); *H04L 27/2096* (2013.01); *H04L 27/2613* (2013.01); *H04J 14/0239* (2013.01); *H04J 14/0246* (2013.01); *H04J 14/025* (2013.01); *H04J 2014/0253* (2013.01)

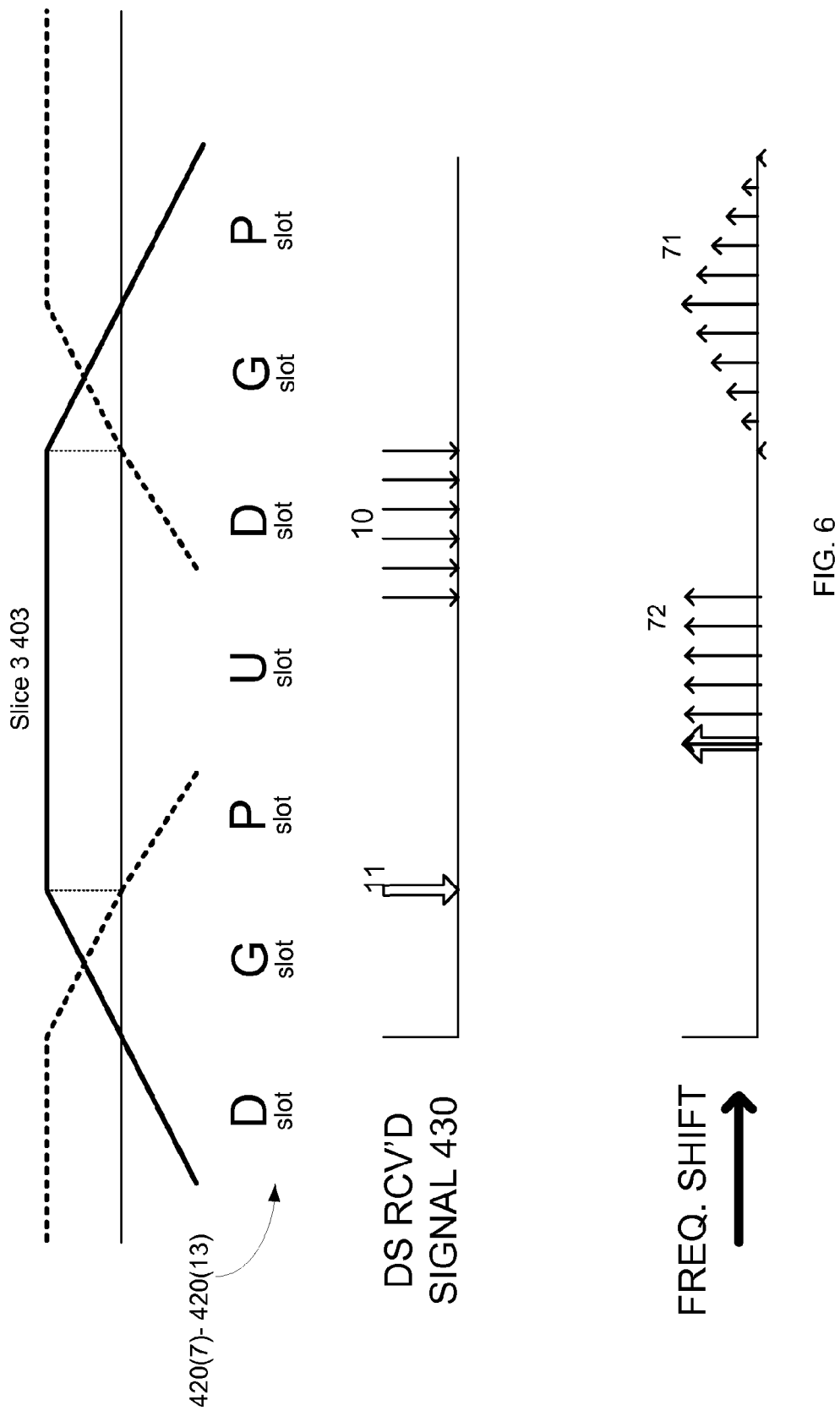

OPTICAL NETWORK UNIT, OPTICAL ACCESS NETWORK AND A METHOD FOR EXCHANGING INFORMATION

RELATED APPLICATIONS

This application claims priority from U.S. provisional patent application filing date Jun. 23, 2010 Ser. No. 61/357,544 and from U.S. provisional patent application filing date Jun. 22, 2010 Ser. No. 61/357,097 which are incorporated herein by reference.

FIELD OF THE INVENTION

This application relates to Optical Access Networks such as but not limited to a Passive Optical Network (PON) with a laserless, colorless, low-cost ONU (Optical Network Unit, the endpoint equipment), capable of very-high and flexible data throughput.

BACKGROUND OF THE INVENTION

General background information concerning self-coherent detection may be found for example in the following references:

[1] Moshe Nazarathy, Alik Gorshtein, and Dan Sadot "Doubly-Differential Coherent100 G Transmission: Multi-Symbol Decision-Directed Carrier Phase Estimation with Intradyne Frequency Offset Cancellation," SPPCom, Karlsruhe, Germany (Jun. 21-24, 2010).
[2] E. Ip and J. M. Kahn, "Fiber Impairment Compensation using Coherent Detection and Digital Signal Processing", J. of Lightwave Technol., vol. 28, no. 4, pp. 502-519, Feb. 15, 2010 (Invited Paper)
[3] S. Zhang, P. Y. Kam, J. Chen, and C. Yu, "Decision-aided maximum likelihood detection in coherent optical phase-shift-keying system", Optics Express, vol. 17, issue 2, p. 703
[4] W. Shieh and C. Athaudage, "Coherent optical orthogonal frequency division multiplexing," Electron. Lett., vol. 42, no. 10, pp. 587-589, May 2006.
[5] A. Leven, N. Kaneda, U. V. Koc, Y. K. Chen, Photon. Technol. Lett., 19, 366 (2007).
[6] K. Piyawanno, M. Kuschnerov, B. Spinnler and B. Lank, Paper 7.3.1 in Proc. ECOC '09 (2009)
[7] R. Noe, Photon. Technol. Lett., 17, 887 (2005).
[8] M. G. Taylor, paper Tu4.2.6 in Proc. ECOC '05 (2005).
[9] G. Goldfarb and G. Li, Opt. Express, 14, 8043 (2006).
[10] E. Ip and J. M. Kahn, J. Lightwave Technol, 25, 2675 (2007).
[11] M. Nazarathy et al, J. Lightwave Technol., 26, 1921 (2008).
[12] X. Liu, S. Chandrasekhar, and A. Leven, Opt. Express 16, 792 (2007).
[13] S. Zhang, P. Y. Kam, J. Chen, and C. Yu, Opt. Express 17, 723 (2009).
[14] Nobuhiko Kikuchi, Kohei Mandai, Shinya Sasaki and Kenro Sekine "Proposal and First Experimental Demonstration of Digital Incoherent Optical Field Detector for Chromatic Dispersion Compensation, PDP Th. 4.4.4., ECOC 2006.
[15] Nobuhiko Kikuchi, et al., OFC/NFOEC 2007, PDP21.
[16] Nobuhiko Kikuchi and Shinya Sasaki, "Incoherent 40-Gbit/s 16QAM and 30-Gbit/s staggered 8APSK (amplitude- and phase-shift keying) signalling with digital phase pre-integration technique,", WD3.2, LEOS '08, 2008.
[17] Nobuhiko Kikuchi and Shinya Sasaki "Optical dispersion-compensation free incoherent multilevel signal transmission over single-mode fiber with digital pre-distortion and phase pre-integration techniques," paperTu.1.E.2, ECOC 2008.
[18] Nobuhiko Kikuchi and S. Sasaki, "Highly sensitive optical multilevel transmission of arbitrary quadrature-amplitude modulation (QAM) signals with direct detection," J. Lightwave Technol., vol. 28, pp. 123-130 (2010).
[19] Xiang. Liu, et al., OFC/NFOEC 2007, OtuA6.
[20] Y. Atzmon, M. Nazarathy, "Laser Phase Noise in Differential Optical Transmission Revisited in the Polar Domain," J. Lightwave Technol., 27, 1, pp. 19-29 (2009).
[21] William Shieh and Keang-Po Ho "Equalization-enhanced phase noise for coherent detection systems using electronic digital signal processing," OPTICS EXPRESS, Vol. 16, 15718-15727, 2008.
[22] X. Liu, S. Chandrasekhar, and A. Leven, "Digital self-coherent detection," Opt. Express, vol. 16, pp. 792-803 (2008).
[23] X. Liu, "Receiver sensitivity improvement in optical DQPSK and DQPSK/ASK through data-aided multi-symbol phase estimation," in Proceedings of European Conference on Optical Communications 2006, Paper We2.5.6, 2006.
[24] X. Liu, "Generalized data-aided multi-symbol phase estimation for improving receiver sensitivity in direct-detection optical m-ary DPSK," Opt. Express 15, 2927-2939 (2007).
[25] X. Liu, S. Chandrasekhar, A. H. Gnauck, C. R. Doerr, I. Kang, D. Kilper, L. L. Buhl, and J. Centanni, "DSP-enabled compensation of demodulator phase error and sensitivity improvement in direct-detection 40-Gb/s DQPSK," in Proceedings of European Conference on Optical Communications 2006, post-deadline paper Th4.4.5, 2006.
[26] X. Liu, "Digital self-coherent detection and mitigation of transmission impairments", 2008 OSA Summer Topic Meeting on Coherent Optical Technologies and Applications (COTA '08), paper CWB2.
[27] N. Kikuchi, K. Mandai, and S. Sasaki, "Compensation of non-linear phase-shift in incoherent multilevel receiver with digital signal processing," in Proceedings of European Conference on Optical Communications 2007, Paper 9.4.1, 2007.
[28] Y. Takushima, H. Y. Choi, and Y. C. Chung, "Adjustment-free DxPSK receiver based on single delay interferometer using 120-degree optical hybrid," in Optical Fiber Communication Conference and Exposition and The National Fiber Optic Engineers Conference on CD-ROM (OFC/NFOEC 2009) (Optical Society of America, Washington, D.C., 2009), paper OMM2.
[29] Y. Takushima, H. Y. Choi, and Y. C. Chung, "Plug-and-play phasor monitor for DxPSK signals based on single delay-interferometer using a 3×3 optical coupler," in Optical Fiber Communication Conference and Exposition and The National Fiber Optic Engineers Conference on CD-ROM (OFC/NFOEC 2008) (Optical Society of America, Washington, D.C., 2008), paper OThW4.
[30] Y. Takushima, H. Y. Choi, and Y. C. Chung, "Measurement of differential phasor diagram of multilevel DPSK signals by using an adjustment-free delay interferometer composed of a 3×3 optical coupler," J. Lightwave Technol. 27(6), 718-730 (2009).
[31] Y. Takushima, H. Y. Choi, and Y. C. Chung, "Enhanced sensitivity of DxPSK receiver by using data-aided phase noise estimation algorithm," in Opto-Electronics and Communications Conference (OECC 2009), paper WV3.

[32] H. Leib, "Data-aided noncoherent demodulation of DPSK," IEEE Trans. Commun. 43(2), 722-725 (1995).

[33] Y. Takushima, H. Y. Choi, and Y. C. Chung, "Quality monitoring of DxPSK signals by using differential phasor diagram," to appear in IEEE Photon. Technol. Lett.

SUMMARY OF THE INVENTION

According to an embodiment of the invention a method may be provided for exchanging information over an Optical Access Network (OAN). The method may include receiving, by an Optical Network Unit (ONU), a pilot signal and downstream information signals; wherein the pilot signal may be received at a pilot frequency slot and the downstream information signals are received at a downstream information frequency slot; wherein the ONU may be allocated with a spectral slice that comprises the pilot frequency slot, the downstream information frequency slot, a guard frequency slot and an upstream information frequency slot; wherein at least one other spectral slice may be allocated for exchanging information with at least one other group of ONUs; splitting the downstream information signals to downstream information signals portions; splitting the pilot signals to pilot signals portions; detecting downstream information, in response to at least a first portion of downstream information signals; modulating a portion of the pilot signal by upstream information signals to provide upstream information signals that are within the upstream information frequency slot; modulating a second portion of the downstream information signals by the upstream information signals to provide upstream secondary signals that are outside the pilot frequency slot, the downstream information frequency slot and the upstream information frequency slot; and upstream transmitting the upstream information signals and the upstream secondary signals.

According to an embodiment of the invention a method can be provided for exchanging information over An Optical Access Network (OAN), the method may include receiving, by an Optical Network Unit (ONU) that belongs to a group of ONUs, a pilot signal and downstream information signals; wherein the pilot signal may be received at an upstream frequency slot and the downstream information signals are received at a downstream information frequency slot; wherein the ONU may be allocated with an upstream spectral slice and a downstream spectral slice; wherein the upstream spectral slice may include a pilot frequency slot, the upstream frequency slot and an upstream guard frequency slot; wherein the downstream spectral slice may include the downstream information frequency slot and a downstream guard frequency slot; wherein at least one other upstream spectral slice and downstream spectral slice are allocated for exchanging information with at least one other group of ONUs; splitting, by the ONU, the downstream information signals and the pilot signal to downstream information signals portions and pilot signals portions; detecting, by the ONU, downstream information, in response to a first portion of downstream information signals; modulating, by the ONU, upstream information signals by (i) a portion of the pilot signal, and (ii) a second portion of the downstream information signals to provide (a) upstream information signals that are within the upstream information frequency slot, and (b) upstream secondary signals that are outside the upstream information; upstream transmitting, by the ONU, the upstream information signals and the upstream secondary signals; suppressing, by at least one component of the OAN that differs from the ONU, the upstream secondary signals; and extracting, by an Optical Line Terminal (OLT) upstream information from the upstream information signals.

The ONU may belong to a group of ONUs that are allocated with the spectral slice; and wherein at least one other spectral slice is allocated for at least one other group of ONUs.

Either one of the methods can include upstream transmitting the first upstream signals, by the ONU, over a frequency sub-band of the upstream information frequency slot that differ from other frequency sub-bands of the upstream information frequency slot used by other ONUs that belong to the same group of ONUs.

The frequency sub-bands subsets of tones used by the ONUs that belongs to the same group of ONUs, form, together, an Orthogonal Frequency Division Multiplexing (OFDM) signal.

Either one of the methods can include wherein a first portion of the upstream secondary signals is within the guard frequency slot and wherein a second portion of the upstream secondary signals is outside the spectral slice.

The upstream information signals may be electrical signals that may be within an intermediate frequency (IF) range that is frequency shifted from zero frequency.

The center of the intermediate frequency range may be frequency shifted from zero frequency by a frequency shift may be slightly bigger than (for example about 150% of) the bandwidth (BW) of least one of the pilot frequency slot, the downstream information frequency slot, the guard frequency slot and the upstream information frequency slot.

The pilot frequency slot, the downstream information frequency slot, a guard frequency slot and an upstream information frequency slot may differ from each other, under some constraints, and are adjacent to each other.

Either one of the methods can include upstream transmitting the upstream information signals and the upstream secondary signals to components of the OAN that are arranged to filter out the upstream secondary signals.

Either one of the methods can include detecting the downstream information by self-coherent detection.

The self-coherent detection may include evaluating a relationship between first portion of downstream information signals and a delayed version of the first portion of downstream information signals.

Either one of the methods can include further detecting an amplitude of the first portion of the downstream information signals.

Either one of the methods can include receiving a locally generated laser signal and utilizing the laser signal to detect the downstream information in a coherent manner.

The splitting of the downstream information signals and the pilot signal comprises performing polarization based splitting and power splitting.

Either one of the methods can include: splitting the downstream information signals to first polarization components and second polarization components; performing a first power splitting of the first polarization components to provide the first portion and the second portion of the downstream information signals; performing a polarization rotation of the second polarization components of the downstream information signals to provide rotated second polarization components of the downstream information signals; and performing a second power splitting of the rotated second polarization components of the downstream information signals to provide a third portion and a fourth portion of the downstream information signals.

Either one of the methods can include: providing the first portion of the downstream information signals to a first polarization In-Phase (I) delay interferometer and to a first polarization Quadrature (Q) delay interferometer; photo-detecting output signals of the first polarization I delay interferometer and the first polarization Q delay interferometer to provide first polarization I photo-detection signals and first polarization Q photo-detection signals; providing the first polarization I photo-detection signals and first polarization Q photo-detection signals to a first set of amplifiers to provide first polarization I delay-interferometer detected output signals and first polarization Q delay-interferometer detected output signals; analog to digital converting the first polarization I delay-interferometer detected output signals and first polarization Q delay-interferometer detected output signals to provide first polarization digital I signals and first polarization digital Q signals; performing self coherent field reconstruction of the first polarization digital I and Q signals to provide first polarization I and Q field reconstructed signal; and processing at least the first polarization I and Q field reconstructed signal to provide downstream receiver output signal.

Either one of the methods can include: providing the third portion of the downstream information signals to a second polarization I delay interferometer and to a second polarization Q delay interferometer; photo-detecting output signals of the second polarization I delay interferometer and the second polarization Q delay interferometer to provide second polarization I photo-detection signals and second polarization Q photo-detection signals; providing the second polarization I photo-detection signals and second polarization Q photo-detection signals to a second set of amplifiers to provide second polarization I delay-interferometer detected output signals and second polarization Q delay-interferometer detected output signals; analog to digital converting the second polarization I delay-interferometer detected output signals and second polarization Q delay-interferometer detected output signals to provide second polarization digital I signal and second polarization digital Q signal; performing self coherent field reconstruction of the second polarization digital I and Q signals to provide second polarization I and Q field reconstructed signal; and processing the first polarization I and Q field reconstructed signals, the second polarization I and Q field reconstructed signals to provide downstream receiver output signals.

Either one of the methods can include performing a polarization diversity maximal ratio combining of the first polarization I field reconstructed signals, the first polarization Q field reconstructed signals, the second polarization I field reconstructed signals and the second polarization Q field reconstructed signals. The maximal ratio combining can be executed by an OLT.

Either one of the methods can include MIMO processing of the first and second polarizations, I and Q signals (4 signals together) to mitigate cross talk and distortions introduced by either the channel and the receiver front end.

Either one of the methods can include further detecting an amplitude of the first portion of the downstream information signals.

Either one of the methods can include: splitting the pilot signal to first polarization pilot components and second polarization pilot components; performing a first power splitting of the first polarization pilot components to provide the first portion and the second portion of the pilot signal; performing a polarization rotation of the second polarization pilot components of the pilot signal to provide rotated second polarization pilot components; and performing a second power splitting of the pilot rotated second polarization components of the pilot signal to provide a third portion and a fourth portion of the pilot signal.

Either one of the methods can include: modulating upstream information signals by the second portion of the pilot signal, and the second portion of the downstream information signals to provide (a) first upstream information signals that are within the upstream information frequency slot, and (b) first upstream secondary signals that are outside the pilot frequency slot, the downstream information frequency slot and the upstream information frequency slot; and performing a polarization rotation of the first upstream information signals and the first upstream secondary signals to provide second polarization upstream information signals and second polarization upstream secondary signals; modulating the upstream information signals by the fourth portion of the pilot signal, and the fourth portion of the downstream information signals to provide (a) first polarization upstream information signals that are within the upstream information frequency slot, and (b) first polarization upstream secondary signals that are outside the pilot frequency slot, the downstream information frequency slot and the upstream information frequency slot; and adding the second polarization upstream information signals, the second polarization upstream secondary signals, the first polarization upstream information signals and the first polarization upstream secondary signals to provide the upstream information signals and the downstream information modulated upstream information.

Either one of the methods can include: receiving, by an Optical Line Terminal (OLT) that is coupled to the ONU at the other end of the OTN, the upstream information signals; filtering out, by the OLT, the first polarization upstream secondary signals and the second polarization upstream secondary signals; aligning, by the OLT, common phases of the second polarization upstream information signals and the first polarization upstream information signals; and performing a coherent combination of the second polarization upstream information signals and the first polarization upstream information signals.

Either one of the methods can include wherein the first and second polarizations are orthogonal to each other.

Either one of the methods can include: providing the first portion of the downstream information signals to a first direct detection circuit to provide first direct detection signals; providing the third portion of the downstream information signals to a first direct detection circuit to provide second direct detection signals.

Either one of the methods can include further sending the first and second direct detection signals to a receiver circuit that comprises an analog to digital converter and a field reconstruction circuit.

The first detection circuit may exhibit a spectrum that comprises the pilot frequency slot, the downstream information frequency slot and the upstream information frequency slot.

The stages of receiving, splitting, modulating and upstream transmitting can be executed by a laserless ONU.

The stages of receiving, splitting, modulating and upstream transmitting can be executed without optical frequency filtering—by a so called "colorless" ONU.

The pilot frequency slot, the downstream information frequency slot, the guard frequency slot and the upstream information frequency slot may have a same bandwidth.

The pilot frequency slot, the downstream information frequency slot, the guard frequency slot and the upstream information frequency slot may differ from each other by bandwidth.

Either one of the methods can include receiving by a hub of the OAN the upstream information signals and the upstream secondary signals; and filtering out by the hub at least a portion of the upstream secondary signals.

The frequency slots can be ordered such that pilot frequency slot precedes the upstream information frequency slot, the upstream information frequency slot precedes the downstream information frequency slot and the downstream information frequency slot precedes the guard frequency slot.

The ONU may belong to a group of ONUs that are allocated with a common spectral slice; and wherein at least one other spectral slice may be allocated for at least one other group of ONUs.

According to an embodiment of the invention the extracting of upstream information may include aligning, by the OLT, common phases of the second polarization upstream information signals and the first polarization upstream information signals; and performing a coherent combination of the second polarization upstream information signals and the first polarization upstream information signals.

According to an embodiment of the invention an Optical Network Unit (ONU) may provided and may include an interface for receiving a pilot signal and downstream information signals; wherein the pilot signal is received at a pilot frequency slot and the downstream information signals are received at a downstream information frequency slot; wherein the ONU is allocated with a spectral slice that may include the pilot frequency slot, the downstream information frequency slot, a guard frequency slot and an upstream information frequency slot; wherein at least one other spectral slice is allocated for exchanging information with at least one other group of ONUs; at least one splitting circuit for splitting the downstream information signals and the pilot signal to portions of downstream information signals and pilot signals; a detection circuit for detecting downstream information, in response to at least a first portion of downstream information signals; a modulator for modulating upstream information signals by (i) a portion of the pilot signal, and (ii) a second portion of the downstream information signals to provide (a) upstream information signals that are within the upstream information frequency slot, and (b) upstream secondary signals that are outside of; the pilot frequency slot, the downstream information frequency slot and the upstream information frequency slot; and a transmitter circuit for upstream transmitting the upstream information signals and the upstream secondary signals.

According to an embodiment of the invention an Optical Access Network (OAN) may be provided and may include an Optical Line Terminal (OLT); a hub that is coupled to the OLT and to a plurality of groups of ONUs; multiple ONUs that belong to the plurality of groups of ONU; wherein the OLT may be arranged to control an exchange of information over the OAN and to perform frequency allocation so that each group of ONUs is allocated with a spectral slice and different groups of ONUs are allocated with different spectral slices; wherein each spectral slice may include a pilot frequency slot, a downstream information frequency slot, a guard frequency slot and an upstream information frequency slot; wherein the hub may include a Wavelength Division Multiplexer (WDM) arranged to perform wavelength division multiplexing according to an allocation of frequency slices to different ONU groups; and multiple passive splitters, each passive splitter may be arranged to split downstream information between different ONUs of a same group of ONUs; wherein each ONU may include an interface for receiving, a pilot signal and downstream information signals; wherein the pilot signal is received at the pilot frequency slot allocated to the group of ONUs that may include the ONU; wherein the downstream information signals are received at a downstream information frequency slot allocated to the group of ONUs that may include the ONU; at least one optical splitting circuit for splitting the downstream information signals and the pilot signal to downstream information signals portions and pilot signals portions; a photo-detection circuit for detecting downstream information, in response to at least a first portion of downstream information signals; a modulator for modulating upstream information signals by (i) a portion of the pilot signal, and (ii) a second portion of the downstream information signals to provide (a) upstream information signals that are within the upstream information frequency slot allocated to the group of ONUs that may include the ONU; and (b) upstream secondary signals that are outside the pilot frequency slot, the downstream information frequency slot and the upstream information frequency slot allocated to the group of ONUs that may include the ONU; and a transmitter circuit for upstream transmitting the upstream information signals and the second upstream signals.

The ONU may belong to a group of ONUs that are allocated with the spectral slice; and wherein at least one other spectral slice is allocated for at least one other group of ONUs.

The ONU may be arranged to upstream transmit the first upstream signals, by the ONU, over a frequency sub-band of the upstream information frequency slot that differ from other frequency sub-bands of the upstream information frequency slots used by other ONUs that belong to the same group of ONUs.

The frequency sub-bands subsets of tones used by the ONUs of the group of ONU form an Orthogonal Frequency Division Multiplexing (OFDM) comb.

A first portion of the upstream secondary signals is within the guard frequency slot and wherein a second portion of the upstream secondary signals is outside the spectral slice.

The upstream information signals are within an intermediate frequency range that is frequency shifted from zero frequency.

The intermediate frequency range is frequency shifted from zero frequency by a frequency shift that is equal to a bandwidth of at least one of the pilot frequency slot, the downstream information frequency slot, the guard frequency slot and the upstream information frequency slot.

The pilot frequency slot, the downstream information frequency slot, a guard frequency slot and an upstream information frequency slot differ from each other and are adjacent to each other.

The ONU may be arranged to upstream transmit the upstream information signals and the upstream secondary signals to components of the OAN that are arranged to filter out the upstream secondary signals.

The ONU may be arranged to detect the downstream information by self-coherent detection.

ONU may be arranged to perform the self-coherent detection by evaluating a relationship between first portion of downstream information signals and a delayed version of the first portion of downstream information signals.

The ONU may be arranged to detect amplitude of the first portion of the downstream information signals.

The ONU may be arranged to receive a laser signal and utilizing the laser signal to detect the downstream information in a coherent manner.

The ONU may be arranged to perform the splitting of the downstream information signals and the pilot signal by performing polarization based splitting and power splitting.

The ONU may be arranged to split the downstream information signals to first polarization components and second polarization components; perform a first power splitting of the first polarization components to provide the first portion and the second portion of the downstream information signals; perform a polarization rotation of the second polarization components of the downstream information signals to provide rotated second polarization components of the downstream information signals; and perform a second power splitting of the rotated second polarization components of the downstream information signals to provide a third portion and a fourth portion of the downstream information signals.

The ONU may be arranged to provide the first portion of the downstream information signals to a first polarization I delay interferometer and to a first polarization Q delay interferometer; photo-detect output signals of the first polarization I delay interferometer and the first polarization Q delay interferometer to provide first polarization I photo-detection signals and first polarization Q photo-detection signals; provide the first polarization I photo-detection signals and first polarization Q photo-detection signals to a first set of amplifiers to provide first polarization I delay-interferometer detected output signals and first polarization Q delay-interferometer detected output signals; analog to digital converting the first polarization I delay-interferometer detected output signals and first polarization Q delay-interferometer detected output signals to provide first polarization digital I signals and first polarization digital Q signals; perform self coherent field reconstruction of the first polarization digital I and Q signals to provide first polarization I and Q field reconstructed signal; and process at least the first polarization I and Q field reconstructed signal to provide downstream receiver output signal.

The ONU may be arranged to provide the third portion of the downstream information signals to a second polarization I delay interferometer and to a second polarization Q delay interferometer; photo-detect output signals of the second polarization I delay interferometer and the second polarization Q delay interferometer to provide second polarization I photo-detection signals and second polarization Q photo-detection signals; provide the second polarization I photo-detection signals and second polarization Q photo-detection signals to a second set of amplifiers to provide second polarization I delay-interferometer detected output signals and second polarization Q delay-interferometer detected output signals; analog to digital converting the second polarization I delay-interferometer detected output signals and second polarization Q delay-interferometer detected output signals to provide second polarization digital I signal and second polarization digital Q signal; perform self coherent field reconstruction of the second polarization digital I and Q signals to provide second polarization I and Q field reconstructed signal; and process the first polarization I and Q field reconstructed signals, the second polarization I and Q field reconstructed signals to provide downstream receiver output signals.

the ONU may be arranged to perform a polarization diversity maximal ratio combining of the first polarization I field reconstructed signals, the first polarization Q field reconstructed signals, the second polarization I field reconstructed signals and the second polarization Q field reconstructed signals.

The ONU may be arranged to perform Multiple Input Multiple Output processing of the first and second polarizations, I and Q signals (4 signals together) to mitigate cross talk and distortions introduced by either the channel and the receiver front end.

The ONU may be arranged to detect amplitude of the first portion of the downstream information signals.

The ONU may be arranged to split the pilot signal to first polarization pilot components and second polarization pilot components; perform a first power splitting of the first polarization pilot components to provide the first portion and the second portion of the pilot signal; perform a polarization rotation of the second polarization pilot components of the pilot signal to provide rotated second polarization pilot components; and perform a second power splitting of the pilot rotated second polarization components of the pilot signal to provide a third portion and a fourth portion of the pilot signal.

The ONU may be arranged to modulate upstream information signals by the second portion of the pilot signal, and the second portion of the downstream information signals to provide (a) first upstream information signals that are within the upstream information frequency slot, and (b) first upstream secondary signals that are outside the pilot frequency slot, the downstream information frequency slot and the upstream information frequency slot; perform a polarization rotation of the first upstream information signals and the first upstream secondary signals to provide second polarization upstream information signals and second polarization upstream secondary signals; modulate the upstream information signals by the fourth portion of the pilot signal, and the fourth portion of the downstream information signals to provide (a) first polarization upstream information signals that are within the upstream information frequency slot, and (b) first polarization upstream secondary signals that are outside the pilot frequency slot, the downstream information frequency slot and the upstream information frequency slot; and combine using a Polarization Beam Combiner, the second polarization upstream information signals, the second polarization upstream secondary signals, the first polarization upstream information signals and the first polarization upstream secondary signals to provide the upstream information signals and the downstream information modulated upstream information.

The first and second polarizations may be orthogonal to each other.

The ONU may be arranged to provide the first portion of the downstream information signals to a first direct detection circuit to provide first direct detection signals; provide the third portion of the downstream information signals to a first direct detection circuit to provide second direct detection signals.

The ONU may be arranged to sending the first and second direct detection signals to a receiver circuit that may include an analog to digital converter and a field reconstruction circuit.

The first detection circuit exhibits a spectrum that may include the pilot frequency slot, the downstream information frequency slot and the upstream information frequency slot.

The ONU may be a laser-less ONU.

The ONU may be arranged to receive, split, modulate and upstream transmit without frequency filtering.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1B-1E illustrate an Optical Network Unit (ONU) and various signals according to an embodiment of the invention;

FIGS. 5, 6, 7A, 8, 11, 12, 13 and 14 illustrate various signals according to various embodiments of the invention;

Figure 1A:
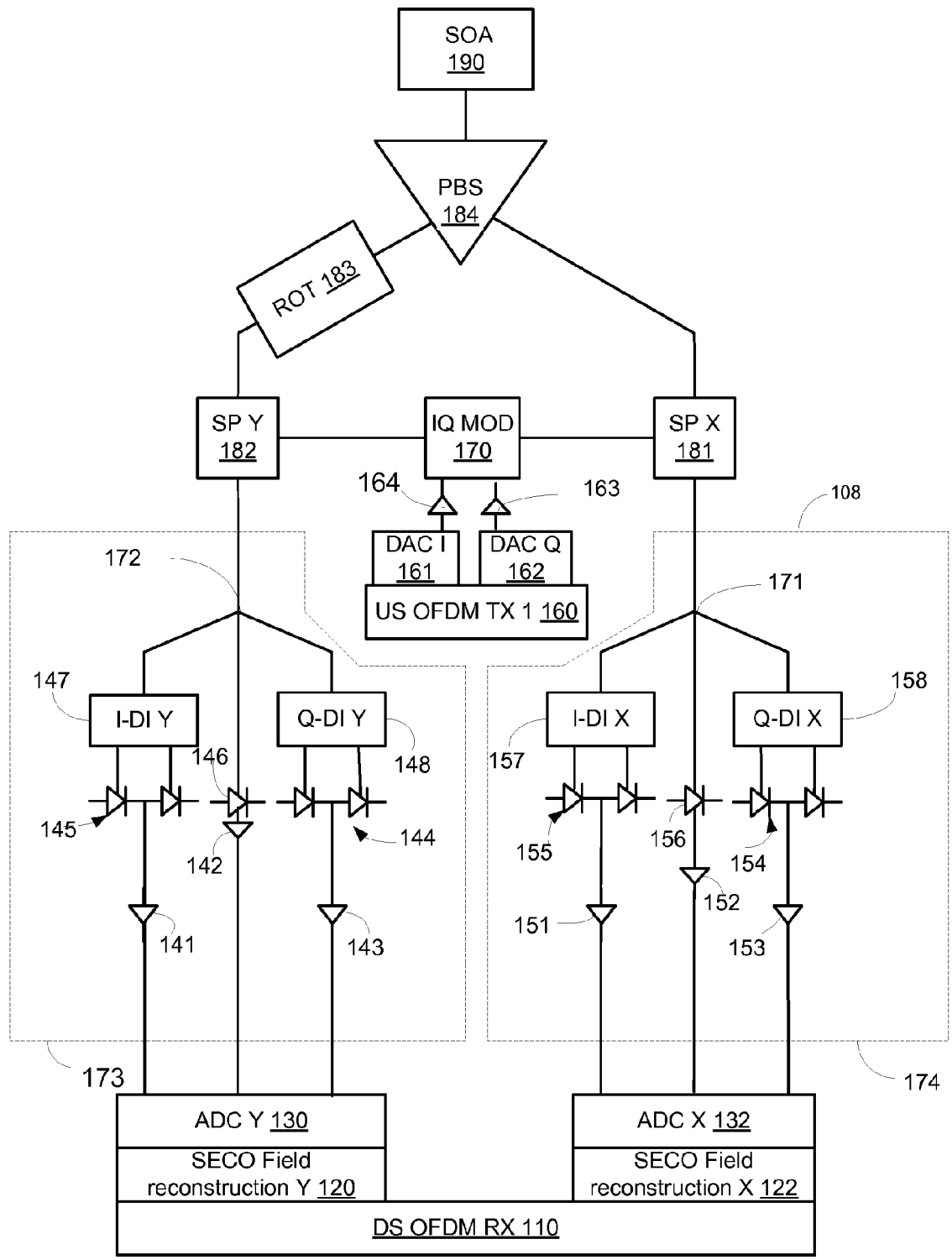
FIGS. 1A-1F, 10A and 10B illustrate Optical Network Units (ONUS) according to various embodiments of the invention.

It will be appreciated that for simplicity and clarity of illustration, elements shown in the Figures have not necessarily been drawn to scale. For example, the dimensions of some of the elements may be exaggerated relative to other elements for clarity. Further, where considered appropriate, reference numerals may be repeated among the Figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The drawings are generally not to scale.

For clarity, non-essential elements were omitted from some of the drawings.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

LIST OF ABBREVIATIONS

BW Band-Width
CE Complex Envelope
DD Direct Detection
DS Down Stream
IF Intermediate Frequency
MIMO Multiple Input Multiple Output
OAN Optical Access Network
ONU Optical Network Unit (user equipment)
OLT Optical Line Terminal (central office equipment)
OFDM Orthogonal Frequency Division Multiplexing
PON Passive Optical Network
RECO Remote Coherent
SCFE Self Coherent Front End
SECO Self Coherent
US Up Stream There are provided OANs, PONs, ONUs, OLTs and methods and especially a laserless, colorless, low-cost ONU capable of very-high and flexible data throughput.

For simplicity of explanation the following specification will refer to PON although any method, ONU, OLT and the like can be applied mutatis mutandis to any OAN.

As will be described in details in the following sections of this document, this aim may be achieved by a novel combination and application of at least some of the following:

a. Applying Self-Coherent and Field-Reconstruction detection techniques b. Network architecture and spectral structure of the DS signal.

key feature is the usage of two levels of splitting, the first level being orthogonal spectral splitting, typically incurring a fixed excess loss which ideally does not depend on the split ratio, and the second level being passive power splitting, incurring an inherent loss of 1:Nmcast in addition to its excess loss c. Corresponding to network architecture, DS signal is transmitted with a novel spectral structure in the DS and US directions, with a spectral structure that is composed of spectral frequency slots and pilot tones, designed to enable re-modulation while separating the US from DS signals to prevent hack-scattering interference.

According to an embodiment of the invention the method may include applying reflective re-modulation in the US direction, thus allowing colorless and laserless ONU operation while preventing unwanted interaction between US and DS modulations and also prevent Rayleigh back-scattering interference The application of self-coherent detection may eliminate the need for a local oscillator (laser) in the receiver and the reflective re-modulation of the novel spectral structure eliminates the need for a laser in the transmitter, thus allowing the realization of a laserless ONU.

Aside from the laserless ONU design, to alternative ONU design options are given incorporating a laser source for the use in the receiver and additionally or alternatively transmitter.

Furthermore, there is provided a novel, a simple and low-cost way to realize the ONU reflective transmitter, given that the DS signal is polarization multiplexed. This method allows the ONU to modulate the two polarization components, using a single modulator, and using polarization diversity reception with Maximal Ratio Combining (MRC) in the Optical Line Terminal (OLT) Receiver (Rx).

Self Coherent and Field Reconstruction Detection in the ONU

As stated in the abstract, there may be provided a PON with laserless ONU. To achieve this goal the ONU should not have a laser in the Transmitter (Tx), as described in the following sections, as well as a local oscillator at the receiver (Rx). The solution for the later constraint is described herein in this section.

To increase spectral efficiency, information is encoded onto the transmitted signal phase and amplitude, and therefore decoding the information at the receiver requires means to detect the signal phase in addition to its amplitude (or power). Realizing the optical detector by means directly applying the optical signal onto a quadratic-nature photo-diode, erases the phase information.

A traditional approach of gaining access to the phase information is coherent detection, where the detected optical signal is mixed with a reference Continuous-Wave (CW) optical signal, before it is applied onto the photo-diode. This technique requires a local-oscillator in the receiver to generate such a CW signal. The signal itself, or more specifically its history may replace the CW signal and serve as a reference to itself [self coherent references]. The illustrated PON and ONU make use of these techniques, known as self-coherent (SECO) detection, or field-reconstruction.

The SECO is briefly described below, merely for the completeness of presentation.

As seen in FIGS. 1A-1E, an ONU 100(1), includes 2 SECO receiver front ends 173 and 174 each includes a pair of I and Q delay interferometers (147, 148) and (157,158), just as in DQPSK detection, and an optional AM branch comprising a photo-diode (146 and 156) for measurement of the optical power of the samples that is followed by an amplifier (142, 152). The self-coherent Rx goes well beyond DQPSK detection, performing signal processing to extract the full amplitude and phase (or equivalently I&Q) information in the optical field complex envelope. The amplitude info is readily obtained by taking the square root of the digitized AM branch electrical output, however the phase information is extracted from the DI outputs by some ingenious signal processing, representing an improvement on the schemes shown in [Xiang Liu, Kikuchi]. In principle, there is no difference between the complex IQ signal extracted by the SCFE and the complex IQ signal extracted by a (90° hybrid in a conventional coherent front-end. Both signals are suitable for subsequent processing such as Chromatic Dispersion (CD) compensation, carrier phase estimation, higher constellation detection, etc. The performance of the self-coherent front-end is quite comparable with that of a fully coherent front-end and even exceeds it in certain respects (yet no local oscillator is required for the self-coherent front-end). If the AM branch is not included in the SECO the amplitude may be calculated base don the outputs of the I and Q delay interferometers.

An I delay interferometer such as I DI X 157 includes an input 211 that is connected to a delay unit 203 and to a ninety degrees phase shifter 212. The outputs of the delay unit 203 and the ninety degrees phase shifter 212 are provided to a coupler 204 that has two outputs—that are connected to pair of photo-detectors 151.

A Q delay interferometer such as Q DI X 158 includes an input 211 that is connected to a delay unit 203 and to a zero degrees phase shifter 202. The outputs of the delay unit 203 and the zero degrees phase shifter 202 are provided to a coupler 204 that has two outputs—that are connected to pair of photo-detectors 151.

The three outputs of each SECO receiver front end 173 and 174 are then entered into analog to digital converters and then to the Self-Coherent Field-Reconstructor (SCFR) module in the ONU Rx that generates the full amplitude and phase representation of the detected signal, equivalently to what a coherent detector would produce.

The SCFR (Remote-Coherent Detection—An Alternative Rx Scheme

The Remote-Coherent (RECO) Detection (FIG. 1F), to be applied in the ONU as an alternative to SECO Detection, employs a simpler Optical front-end consisting of 2 Direct Detection (DD) receivers 191 and 192 (that replace the SECO front ends 174 and 173).

The concept of RECO detection relies on the fact that each passband DS signal d(t), centered around the optical frequency $f_d$, is accompanied by a pilot tone signal p(t) at the optical frequency $f_p$. This neighbor pilot tone may be used as a substitute for the LO signal of a standard coherent detection Receiver, to demodulate d(t) from around its optical carrier frequency $f_d$ to a low IF passband signal around a relatively small IF carrier frequency $f_{IF} = f_d - f_p$. This result is the outcome of a DD optical front end detecting the signal p(t)+d(t), and a PBF as shown below.

Denoting the electric, analog outputs of the x/y-pol. DD units by $r_x(t)$, $r_y(t)$, we note that these signals are perfectly equivalent to the outputs of the AM branches in the SECO Rx. These signals which are the output of quadratic DD from-ends are given by (developed for an arbitrary polarization, to be applied to both the x-pol. and y-pol. signals):

$$r(t) = |p(t) + d(t)|^2$$
$$= [p(t) + d(t)][p(t) + d(t)]^*$$
$$= |p(t)|^2 + |d(t)|^2 + p(t)d^*(t) + p^*(t)d(t) =$$
$$= |p(t)|^2 + |d(t)|^2 + 2\text{Re}\{p^*(t)d(t)\}$$
$$= |p(t)|^2 + |d(t)|^2 + 2\text{Re}\{p(t)d(t)\}$$

The term $|p(t)|^2 + |d(t)|^2$ is a baseband term limited to a double-sided bandwidth of $2W_{slot}$, i.e. it has a single-sided bandwidth of $W_{slot}$. The term Re $\{p(t)*d(t)$ is passband signal in the frequency range of $[2W_{slot}, 3W_{slot}]$, $W_{slot}$ away from the baseband term, thus spectrally separable by means of an electrical BPF. Denoting the PBF impulse response by $h_{PB}(t)$ and its output by $r_{PB}(t)$, the above explanation is expressed by:

$$r_{PB}(t) = \{r(t) \otimes h_{PB}(t)\}(t)$$
$$= \{[|p(t)|^2 + |d(t)|^2 + 2\text{Re}\{p(t)d(t)\}] \otimes h_{PB}(t)\}(t) =$$
$$= 2\text{Re}\{p(t)d(t)\}$$
$$= p(t)d(t)$$

Thus we extract the passband signal.

The PBF may be implemented either digitally after the ADC or using analog HW, prior to the ADCs. The block diagram in FIG. 1F, illustrates an implementation with digital signal processing. We use the continuous-time notation r(t), $h_{PB}(t)$, $r_{PB}(t)$ here as a generic notation also applying to the discrete-time implementation.

Expressing the real-valued passband signals d(t), p(t) by means of its Complex-Envelope (CE) baseband signals $\underline{d}(t)$, $\underline{p}(t)$ around its optical center frequencies $f_d$, $f_p$ we have the following identities: $d(t) = \sqrt{2}\mathrm{Re}\{e^{j2\pi f_d t}\underline{d}(t)\}$, $p(t) = \sqrt{2}\mathrm{Re}\{e^{j2\pi f_p t}\underline{p}(t)\}$, where $\underline{d}(t)$ is a baseband signal with a double-sided bandwidth of $W_{slot}$, thus a single-sided bandwidth of $W_{slot}/2$, and the CE of the pilot is simply the pilot amplitude chosen to be unity: $\underline{p}(t)=1$.

Expressing the PBF output in terms of the CE signals:

$$r_{PB}(t) = \{[|\sqrt{2}\mathrm{Re}\{e^{j2\pi f_p t}\}|^2 + |\sqrt{2}\mathrm{Re}\{e^{j2\pi f_d t}\underline{d}(t)\}|^2] \otimes h_{PB}(t)\}(t) + \{[2\mathrm{Re}\{\sqrt{2}\mathrm{Re}\{e^{j2\pi f_p t}\}\sqrt{2}\mathrm{Re}\{e^{j2\pi f_p t}\underline{d}(t)\}\}] \otimes h_{PB}(t)\}(t)$$

Where the first line expresses the absolute values of each of the input signal components, and the 2nd line expresses the cross-terms (beatings) between the two. It is easy to see that the terms in the first line are all baseband signals, thus rejected by the PBF, giving:

$$r_{PB}(t) = \{[2\mathrm{Re}\{\sqrt{2}\mathrm{Re}\{e^{j2\pi f_p t}\}\sqrt{2}\mathrm{Re}\{e^{j2\pi f_d t}\underline{d}(t)\}\}] \otimes h_{PB}(t)\}(t) =$$
$$= 4\{[\mathrm{Re}\{e^{j2\pi f_p t}\}\mathrm{Re}\{e^{j2\pi f_p t}\underline{d}(t)\}] \otimes h_{PB}(t)\}(t) =$$

Further expressing the CE signal $\underline{d}(t)$ in terms of its I and Q components:

$$\underline{d}(t) \equiv d_c + jd_s$$

we have:

$$r_{PB}(t) = 4\left\{\left[\cos(2\pi f_p t)\mathrm{Re}\left\{\begin{bmatrix}\cos(2\pi f_p t) + \\ j\sin(2\pi f_p t)\end{bmatrix}[d_c + jd_s]\right\}\right] \otimes h_{PB}(t)\right\}(t) =$$
$$= 4\{[\cos(2\pi f_p t)[d_c\cos(2\pi f_d t) - d_s\sin(2\pi f_p t)]] \otimes h_{PB}(t)\}(t) =$$
$$= 2\{[d_c\cos(2\pi(f_d - f_p)t) - d_s\sin(2\pi(f_d - f_p)t)] \otimes h_{PB}(t)\}(t) + + 2\{[d_c\cos(2\pi(f_d + f_p)t) - d_s\sin(2\pi(f_d + f_p)t)] \otimes h_{PB}(t)\}(t) =$$

The resulting term contains IF components inside the PBF pass-band, ideally un-affected by the filter, and high-frequency (twice the optical carrier) which are rejected, yielding the signal:

$$r_{PB}(t) = 2\{[d_c\cos(2\pi(f_d - f_p)t) - d_s\sin(2\pi(f_d - f_p)t)] \otimes h_{PB}(t)\}(t) =$$
$$= 2[d_c\cos(2\pi(f_d - f_p)t) - d_s\sin(2\pi(f_d - f_p)t)] =$$
$$= 2[d_c\cos(2\pi f_{IF}t) - d_s\sin(2\pi f_{IF}t)]$$

Where we used the IF frequency definition: $f_{IF}=f_d-f_p$.

Applying this signal into a standard digital IQ demodulator operating at the IF frequency will extract the I, Q components: $d_c$, $d_s$.

The Direct Detection (DD) receivers 191 and 192 are followed by ADCs 130 and 132 that in turn are followed by digital Bandpass IQ demodulators 121 and 123 that are followed by DS OFDM RX 110.

module takes its three inputs from the SECO receiver front ends and extracts the optical field complex envelope (I&Q components) just like a homodyne (or intradyne) coherent front-end would, in a fully coherent receiver. Once the complex field envelope is available in the digital domain, conventional coherent impairment mitigation techniques and higher-order constellation detection, may be performed by the Rx DSP. The SCFR signal processing algorithm performed by the system represents an efficient HW realization of the following: the field magnitude $|\rho_k|$ is simply obtained as the square root $|\rho_k|=\sqrt{P_k}$, of the AM branch photo-current output.

The phase of the field is obtained by signal processing applied to the pair of outputs of the two DIs in quadrature (referred to as the I and Q DIs).

They have respective electrical outputs $$I_k=|\rho_k||\rho_{k-1}|\cos\Delta\phi_k;\ Q_k=|\rho_k||\rho_{k-1}|\sin\Delta\phi_k;\ \Delta\phi_k=\phi_k-\phi_{k-1}$$

The equations above describe the interferometric mixing between the current sample and the previous sample, impacted by the phase differences $\Delta\phi_k$ of successive samples. We extract the phase differences from the two DI outputs by a simple mathematical operation, $\Delta\phi_k=\arctan[Q_k/I_k]$, then accumulate the successive phase differences, $\phi_k=\Sigma_{m=1}^{k}\Delta\phi_m+\phi_0$, obtaining the phase at any discrete-time (up to an unknown additive constant, the initial phase $\phi_0$, which is not known, but is mitigated by the subsequent signal processing). Having obtained $|\rho_k|$, $\phi_k$, the complex IQ field $\rho_k=\rho_k^I+j\rho_k^Q=|\rho_k|e^{j\phi_k}$ is readily evaluated. However, there is a key problem associated with this approach, which limitation has so far prevented the self-coherent method from attaining practical relevance: The phase $\phi_k$ of the field is reconstructed by accumulation of its phase increments, $\Delta\phi_k$, yet in practical systems, the phase difference measurements in the DIs will be inevitably accompanied by some small errors and bias deviations hence there will be a divergent accumulation of these deviations, and the SCFR system will sooner or later lose accuracy and start generating erroneous results.

Figure 2:
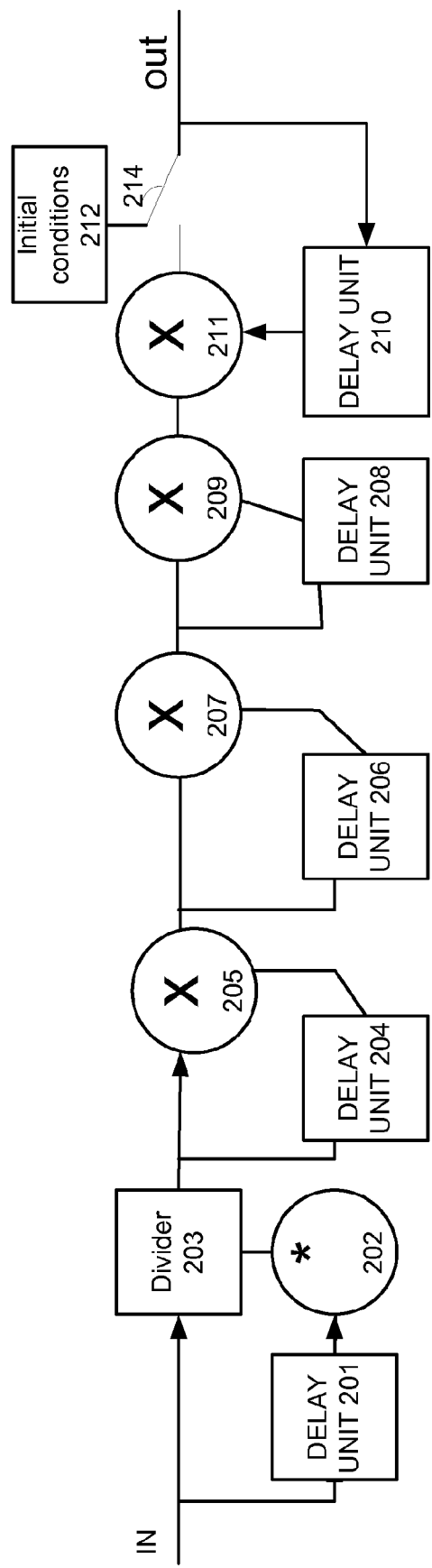
FIG. 2 illustrates a field re-constructor according to an embodiment of the invention.

This SCFR structure differs from that described in [Xiang Liu, Kikuchi] in that it is more efficient, requiring just 5 real multipliers and one complex multiplier (in turn comprising 4 real multipliers) i.e. it requires a total of 9 real multipliers (or 2.25 equivalent complex multipliers) a one-over-square-root lookup table, an adder and two delays FIG. 2 illustrates a X field re-constructor 122 that receives a complex signal at its input and provides a field reconstructed signal at its output.

The X field re-constructor 122 includes first till fifth delay units 201, 204, 206, 208 and 210 for delaying by one sample, two samples, four samples, eight samples and sixteen samples respectively. A switch 214 feeds initial conditions 212 to an input of fifth delay unit 210 and to the output of X field re-constructor 122 during first sixteen cycles of operation and then (after the first sixteen cycles) connects the output of multiplier 211 to the input of fifth delay unit 210 and to the output of X field re-constructor 122.

The complex input signal is fed to first delay unit 201 that performs a delay of one sample and provides a first delayed signal to a conjugate divider that divides the input complex signal by the first delayed signal to provide a divider output signal.

The divider output signal is fed to a first multiplier 205 and to a second delay unit 204 that performs a delay of two samples and provides a second delayed signal to first multiplier 205. The first multiplier multiples these two signals to provide a first multiplier output signal.

The first multiplier output signal is fed to a second multiplier 207 and to a third delay unit 206 that performs a delay of four samples and provides a third delayed signal to second multiplier 207. The second multiplier 207 multiples these two signals to provide a second multiplier output signal.

The second multiplier output signal is fed to a third multiplier 209 and to a fourth delay unit 208 that performs a delay of eight samples and provides a fourth delayed signal to third multiplier 209. The third multiplier 209 multiples these two signals to provide a third multiplier output signal.

The third multiplier output signal is provided to a fourth multiplier 211. The fourth multiplier 211 also receives an output signal of a fifth delay unit 210 that performs a delay of sixteen samples. The fourth multiplier 211 multiples these two signals to provide a fourth multiplier output signal that is provided by switch 214, after the first sixteen cycles, as an output of the X field re-constructor 122 and to an input of the fifth delay unit 210.

Remote-Coherent Detection—An Alternative Rx Scheme

The Remote-Coherent (RECO) Detection (FIG. 1F), to be applied in the ONU as an alternative to SECO Detection, employs a simpler Optical front-end consisting of 2 Direct Detection (DD) receivers 191 and 192 (that replace the SECO front ends 174 and 173).

The concept of RECO detection relies on the fact that each passband DS signal d(t), centered around the optical frequency $f_d$, is accompanied by a pilot tone signal p(t) at the optical frequency $f_p$. This neighbor pilot tone may be used as a substitute for the LO signal of a standard coherent detection Receiver, to demodulate d(t) from around its optical carrier frequency $f_d$ to a low IF passband signal around a relatively small IF carrier frequency $f_{IF} \equiv f_d - f_p$. This result is the outcome of a DD optical front end detecting the signal p(t)+d(t), and a PBF as shown below.

Denoting the electric, analog outputs of the x/y-pol. DD units by $r_x(t)$, $r_y(t)$, we note that these signals are perfectly equivalent to the outputs of the AM branches in the SECO Rx. These signals which are the output of quadratic DD from-ends are given by (developed for an arbitrary polarization, to be applied to both the x-pol. and y-pol. signals):

$$r(t) = |p(t) + d(t)|^2$$
$$= [p(t) + d(t)][p(t) + d(t)]^*$$
$$= |p(t)|^2 + |d(t)|^2 + p(t)d^*(t) + p^*(t)d(t) =$$
$$= |p(t)|^2 + |d(t)|^2 + 2\text{Re}\{p^*(t)d(t)\}$$
$$= |p(t)|^2 + |d(t)|^2 + 2\text{Re}\{p(t)d(t)\}$$

The term $|p(t)|^2+|d(t)|^2$ is a baseband term limited to a double-sided bandwidth of $2W_{slot}$, i.e. it has a single-sided bandwidth of $W_{slot}$. The term Re $\{p(t)*d(t)\}$ is passband signal in the frequency range of $[2W_{slot}, 3W_{slot}]$, $W_{slot}$ away from the baseband term, thus spectrally separable by means of an electrical BPF. Denoting the PBF impulse response by $h_{PB}(t)$ and its output by $r_{PB}(t)$, the above explanation is expressed by:

$$r_{PB}(t) = \{r(t) \otimes h_{PB}(t)\}(t)$$
$$= \{[|p(t)|^2 + |d(t)|^2 + 2\text{Re}\{p(t)d(t)\}] \otimes h_{PB}(t)\}(t) =$$
$$= 2\text{Re}\{p(t)d(t)\}$$
$$= p(t)d(t)$$

Thus we extract the passband

The PBF may be implemented either digitally after the ADC or using analog HW, prior to the ADCs. The block diagram in FIG. 1F, illustrates an implementation with digital signal processing. We use the continuous-time notation r(t), $h_{PB}(t)$, $r_{PB}(t)$ here as a generic notation also applying to the discrete-time implementation.

Expressing the real-valued passband signals d(t), p(t) by means of its Complex-Envelope (CE) baseband signals $\underline{d}(t)$, $\underline{p}(t)$ around its optical center frequencies $f_d$, $f_p$ we have the following identities: $d(t)=\sqrt{2}\text{Re}\{e^{j2\pi f_d t}\underline{d}(t)\}$, $p(t)=\sqrt{2}\text{Re}\{e^{j2\pi f_p t}\underline{p}(t)\}$, where $\underline{d}(t)$ is a baseband signal with a double-sided bandwidth of $W_{slot}$, thus a single-sided bandwidth of $W_{slot}/2$, and the CE of the pilot is simply the pilot amplitude chosen to be unity: $\underline{p}(t)=1$.

Expressing the PBF output in terms of the CE signals:

$$r_{PB}(t) = \{[|\sqrt{2}\text{Re}\{e^{j2\pi f_p t}\}|^2 + |\sqrt{2}\text{Re}\{e^{j2\pi f_d t}\underline{d}(t)\}|^2] \otimes h_{PB}(t)\}(t) +$$
$$\{[2\text{Re}\{\sqrt{2}\text{Re}\{e^{j2\pi f_p t}\}\sqrt{2}\text{Re}\{e^{j2\pi f_p t}\underline{d}(t)\}\}] \otimes h_{PB}(t)\}(t)$$

Where the first line expresses the absolute values of each of the input signal components, and the $2^{nd}$ line expresses the cross-terms (beatings) between the two. It is easy to see that the terms in the first line are all baseband signals, thus rejected by the PBF, giving:

$$r_{PB}(t) = \{[2Re\{\sqrt{2}\,Re\{e^{j2\pi f_p t}\}\sqrt{2}\,Re\{e^{j2\pi f_d t}\underline{d}(t)\}\}] \otimes h_{PB}(t)\}(t) =$$
$$= 4\{[Re\{e^{j2\pi f_p t}\}Re\{e^{j2\pi f_d t}\underline{d}(t)\}] \otimes h_{PB}(t)\}(t) =$$

Further expressing the CE signal $\underline{d}(t)$ in terms of its I and Q components: $\underline{d}(t) \equiv d_c + jd_s$ we have:

$$r_{PB}(t) = 4\{[\cos(2\pi f_p t)Re\{[\cos 2\pi f_d t) + j\sin(2\pi f_d t)][d_c = jd_s]\} \otimes h_{PB}(t)\}(t) =$$
$$= 4\{[\cos(2\pi f_p t)[d_c\cos(2\pi f_d t) - d_s\sin(2\pi f_d t)]] \otimes h_{PB}(t)\}(t) =$$
$$= 2\{[d_c\cos(2\pi(f_d - f_p)t) - d_s\sin(2\pi(f_d - f_p)t)] \otimes h_{PB}(t)\}(t) +$$
$$+ 2\{[d_c\cos(2\pi(f_d + f_p)t) - d_s\sin(2\pi(f_d + f_p)t)] \otimes h_{PB}(t)\}(t) =$$

The resulting term contains IF components inside the PBF pass-band, ideally un-affected by the filter, and high-frequency (twice the optical carrier) which are rejected, yielding the signal:

$$r_{PB}(t) = 2\{[d_c\cos(2\pi(f_d - f_p)t)d_s\sin(2\pi(f_d - f_p)t)] \otimes h_{PB}(t)\}(t) =$$
$$= 2[d_c\cos(2\pi(f_d - f_p)t) - d_s\sin(2\pi(f_d - f_p)t)] =$$
$$= 2[d_c\cos(2\pi f_{IF}t) - d_s\sin(2\pi f_{IF}t)]$$

Where we used the IF frequency definition: $f_{IF} = f_d - f_p$.

Applying this signal into a standard digital IQ demodulator operating at the IF frequency will extract the I, Q components: $d_c$, $d_s$.

The Direct Detection (DD) receivers 191 and 192 are followed by ADCs 130 and 132 that in turn are followed by digital Bandpass IQ demodulators 121 and 123 that are followed by DS OFDM RX 110.

Additional Information of Self Coherent Detection

Self-coherent detection: We now overview the x-pol. and y-pol. self-coherent front-ends terminated in the digital processors implementing novel yet very robust of self-coherent OFDM detection, allowing in effect to achieve all the advantages of coherent detection without having an optical local oscillator at all in the receiver. Principles of self-coherent detection (for single carrier rather than OFDM systems) were described in [Xiang Liu, Kikuchi], however in our system we use truly robust high-performance operation of the self-coherent receivers, in the PON context and for OFDM multi-carrier detection. Remarkably, we show that based on our recent advances in self-coherent detection, may even exceed conventional coherent detection performance in certain respects, especially in terms of OLT laser line width tolerance, and tolerance to frequency drifts of the OLT laser, which is superior in our self-coherent system to that of conventional (proper) coherent designs. In more detail, the OSNR-due-to-ASE (white noise) performance of the self-coherent receiver is slightly worse than a coherent intra-dyne receiver (assuming the coherent receiver does not use any compensation of frequency offset of the optical local oscillator). However, if a conventional frequency estimation circuit is included in the coherent receiver we compare against, then our self-coherent receiver performance is better. While the claim that a self-coherent receiver can do a better job without an optical local oscillator sounds counter-intuitive, it turns out that not having a local oscillator, actually eliminates a source of phase noise at the receiver—the self-coherent receiver is only affected by the phase-noise of the transmit laser, whereas a conventional receiver is affected by both phase noise sources at the local oscillator and the Tx. Moreover, as shown in [Shieh, EEPN], the effect of equalization-enhanced phase noise degrades phase noise performance in conventional coherent receiver due to the interaction between the local-oscillator phase noise, and the large delay spreads in the digital equalizer in the Rx. This adverse equalization-enhanced phase-noise effect is entirely eliminated in the self-coherent receiver. However, the white (ASE) phase noise performance of the front-end of the self-coherent receiver is worse to begin with, though once a frequency estimator is used in the reference coherent receiver, white noise enhancement also occurs there, offsetting any advantage for the coherent receiver over a self-coherent one.

Removal of the P×D Interaction:

In the remainder of this paragraph we consider the impact of the pilot tone scheme, and the potential interaction of the D downstream signal and the P pilot remodulated in the upstream. We explain why the D-P interaction does not interferer with self-coherent detection operation, and establish that the self-coherent detection may be advantageously performed at baseband, handling signals with low bandwidth $W_{slot}$ in the electrical domain, whereas alternative pilot-based direct-detection OFDM approaches would require three-times the bandwidth ($3W_{slot}$).

Indeed, denoting the DS time-domain signal, received in the D-frequency slot, by d(t) and the pilot by p(t) then the AM branch photo-detected output equals $$|p(t)+d(t)|^2 = [p(t)+d(t)][p(t)+d(t)]^* = |p(t)|^2 + |d(t)|^2 + p(t)d^*(t) + p^*(t)d(t)$$

and similarly the I and Q DI outputs equal $$Re\{[p(t)+d(t)][p(t-T)+d(t-T)]^*\},$$

$$Im\{[p(t)+d(t)][p(t-T)+d(t-T)]^*\}$$

comprising terms of the form $Re\{d(t)d^*(t-T)\}$, $Re\{p(t)p^*(t-T)\}$, $Re\{d(t)p^*(t-T)\}$, etc. The spectra of these conjugate products are given by the deterministic cross-correlations of the corresponding spectra, e.g.

$$d(t)d^*(t) \rightarrow D(f) \otimes D^*(-f)$$

$$d(t)p^*(t-T) \rightarrow D(f) \otimes \{P^*(-f)e^{j2\pi fT}\}$$

All terms involving the cross-correlations between P and D are band pass with spectral support $[2W_{slot}, 3W_{slot}]$ in the electrical domain. This is also intuitively evident considering the 'beating' (mixing in the photo-detection process) of any of the frequency components of D against the pilot, which spectral components are situated at spectral distances ranging between $2W_{slot}$ and $3W_{slot}$ away from the pilot. The beating of the pilot with itself essentially contributes a DC term, whereas the mixing products between d(t), d*(t) and d(t−T), d*(t) collectively referred to as P×P, are all in the electrical baseband domain. $[-W_{slot}, W_{slot}]$ Once we low-pass filter the photo-detected electrical signals P(t), I(t), Q(t) (the electrical outputs of the AM branch and the I and Q DIs) down into $[-W_{slot}, W_{slot}]$ range, we retain just the mixing products between d(t), d*(t) and d(t−T), d*(t), collectively referred to as D×D—there is no impact to the pilot signal P, after $W_{slot}$-band limitation. The situation is identical to having the modulation D received alone around its lightwave carrier, as if there is no pilot tone at all.

In contrast, in optical OFDM with detection [Kahn], a pilot is inserted with a large guard band away from the OFDM generated spectrum, in order to accommodate the mixing products generated in the photodiode of the data with itself around baseband, and the resulting RF signal is band pass filtered, precisely to extract a term of the form p*(t)d(t), which represents the useful information. Here we are not interested at all in such P×D term, the detection of which would require three times the bandwidth, $3W_{slot}$. Rather, we concentrate on the D×D mixing terms between d(t), d*(t) and d(t−T), d*(t) which terms have three times lower bandwidth than the P×D, just $W_{slot}$, hence allowing to substantially reducing the electronic speed. It is remarkable that our D×D terms, mixing D with itself or with a delayed version of itself, which terms appear hopelessly convoluted in the frequency domain, yet our breakthrough is to perfect previous techniques [Xiang Liu, Kikuchi] in order to precisely and robustly extract the information d(t) out of these terms. This is enabled by our recent (yet unpublished) advances in the self-coherent detection, techniques, which are ideally suited for the advanced PON environment.

Polarization handling: To summarize the polarization handling in the DS direction, the x- and y-polarization component of the received light were separated and directed to the two self-coherent receivers. It is the task of the $PMD^{-1}$ stage in the self-coherent Rx DSP of the ONU to extract the original x- and y-polarizations which were multiplexed at the OLT Tx. From the viewpoint of a "reflective US modulation" approach, we have seen that the DS the x-pol. and y-pol. each traverse the loop in opposite senses, get their polarizations interchanged (x becomes y, y becomes x) allowing them to be recombined in the PBS, and both these components are modulated by the same US information. In addition the IQ modulator will be designed to be relatively insensitive to the direction of light propagation (supporting both senses of propagation, left to right or right to left). Hence the modulator should preferably be of a lumped design, rather than a traveling electrode. Possible if BW is low. However, the modulator sees just one polarization. Considering the effect of random polarization rotations in the fiber network, the two orthogonal polarizations are resolved in the downstream, and random rotations of the polarization axes are re-aligned in the DSP by the PMD$^{-1}$ algorithm just as in conventional coherent digital detection. It remains to consider the effect random rotations of the polarization axes (polarization fading) affecting the SOP of the pilot tone in the P frequency slot reaching the ONU, to be used for re-modulation in the upstream. It is evident that random rotations of the polarization axes can also be mitigated by the PMD$^{-1}$ algorithm.

It remains to consider another potential consequence of the polarization fading (random variation of the received SOP) SOP at the ONU, posing the question whether the self-coherent detection is impacted by variations in the received SOP of the pilot. Fortunately, the answer is negative: We have shown that the P×D mixing terms (falling in the [$2W_{slot}$, $3W_{slot}$] band), are irrelevant for self-coherent detection, which is entirely based on processing D×D terms in the [$-W_{slot}$, $W_{slot}$] band, extracted by the mixing in the photo-diodes followed by electronic analog or digital band-limitation, applying onto the received electrical signal containing both the D×D and P×D terms a low-pass filter with passband over [0, $W_{slot}$] interval, and a mild transition over the [$W_{slot}$, $2W_{slot}$] spectral interval, and with stop-band over the [$2W_{slot}$, $3W_{slot}$] band. This re-iterates the conclusion of the previous paragraph, namely that the pilot signal (P) plays no role whatsoever in DS detection in its ONU, hence in the context of polarization handling, the SOP of the P signal is irrelevant for DS detection in the ONU, nor is it relevant in the US direction, as seen before, as indeed US modulation in the ONU, as well as DS detection in the OLT, are both designed to be insensitive to polarization fading, according to the principle of polarization diversity.

Spectral efficiency considerations: In terms of spectral efficiency, while seemingly we waste the U and P frequency slot, which are left empty when transmitting DS (there is just the pilot at the boundary of the G and P frequency slots), the requirement that the US and DS spectra be non-overlapping in order to avoid Rayleigh backscatter and other back reflections, forces the bidirectional PON operation to resort to orthogonal bands for the US and DS, hence the spectral efficiency is inherently cut down by a factor of two. In addition, our requirement to have a "reflective-type" ONU, void of local light source, requires that we allocate the P frequency slot, and the filter transitions require that we allocate the G frequency slot. We shall show that usage of polarization multiplexing in the DS and high QAM constellations in the US and DS still allows high overall spectral efficiency in support of ultra-high low-cost transmission rates.

Oversampling: The desired mixing products of the D frequency slot with itself were seen to appear at the AM and DI balanced photo-diode outputs as analog signals with spectral support [−Wslot, Wslot]. These sufficient statistics may in principle be sampled at the Nyquist rate of 2*Wslot, using ideal anti-aliasing filters with cutoff at Wslot rejecting the extraneous mixing products between P and D.

However, if oversampling is technologically feasible, then it is desirable to use it in the three ADCs terminating the SCFE, in order to achieve several advantages: (i): Filtering of undesired terms in the received spectrum may now be performed in the digital domain, eliminating the need for high-performance analog anti-aliasing filters, and somewhat alleviating the requirements on the FWDM filtering. (ii): The quantization noise is reduced—the effective number of bits (ENOB) is increased by 0.5 for each octave of increase in oversampling rate. (iii): The ASE noise received along with the signal is neither improved nor degraded (the wider bandwidth of the anti-aliasing filter lets in more noise, but the digital anti-aliasing filtering, or decimation reduces the noise back down. (iv): Last but not least, the delay interferometers in the ONU PIC may be made shorter by a factor equal to the oversampling ratio, which allows a more compact and more stable Silicon PIC.

Having enumerated the advantages of oversampling, to see how feasible oversampling is with accessible technology, recall that our basic frequency slot spectral width in the PUDG design may be made relatively low, enabling low speed ONU electronics and modulation, providing an important advantage of our scheme. The required Nyquist sampling rate is low, hence it is still possible to achieve oversampling with low-cost ADC technology.

Multiple access alternatives within the multicast group of ONUs: Heretofore, we implicitly assumed that there is a single ONU is linked to each port of the ONU, in effect receiving the full slice, and remodulating it for upstream transmission. This would indeed be the case for a 'heavy' user, requiring the full bandwidth available in the system under the constraint of the multiple slices structure, namely the full throughput of one slice. Likewise, when enhanced security is required, such as for a financial institution. In our system specification we actually require Quality of Service (QoS) characteristics: Either variable throughput per user, or flexible guaranteed throughput, up to a maximal rate (the 'full slice rate'), with the QoS to be enforced by a central controller server at the OLT. To support this we actually require considering multiple access schemes in the DS and US, for all the Nmcast users of a multicast group (BG), sharing a passive splitter linked to a specific port (oe slice) of the FWDM, i.e. all users sharing the PUD frequency slots of a single slice.

Considering DS transmission first, one multiple access option is (TDM) packet de-multiplexing, much like in a cable television system wherein multiple users are all tuned to the same RF channel and extract the full TDM content, selecting specific packets out of it, marked for that particular user. Here in an analogous way each of the users in the BG listen to the full lightwave 'station' (the slice) and decode the full data rate carried over this slice, selecting specific packets intended for them, and ensuring security based on higher level packet encryption algorithms. A second option for DS multiple access is to have different users in the BG select distinct non-overlapping sets of subcarriers, but on second scrutiny, to accomplish this most readily, the simplest option is to perform a full FFT analysis at the receiver and then select the data riding on specific tones (OFDM sub-channels), disregarding the data on other sub-channels, which is intended to other users. However, this is just another way of marking, out of the full decoded slice information, certain data sub streams intended for specific users, so this method is really as slight variant of the packet demultiplexing option described above, in which packets are not selected sequentially in time, but sequentially in frequency.

A more radical departure would be to partition the tones (sub-channels) of the D frequency slot into multiple contiguous subsets, and demodulate those digitally to baseband, then use a smaller size FFT, though this method would not provide substantial gain, as the system still needs to support heavy users who must acquire all the tones in the D slice, hence such variability among different users simply complicates the system unnecessarily.

Considering now options for US multiple access, the TDM option is far less attractive as it would require a departure from the current frequency-domain method and would require dealing with system transients and their effect on the SOA, burst synchronization, etc. Our preferred option for US multiple access is a form of OFDM based Frequency Division Multiple Access (FDMA), wherein the tones of the D frequency slot are partitioned into non-overlapping subsets of tones, with a distinct subset assigned to each user in the BG. It is up to each user to always transmit on his assigned tones-subset (at least for the duration of the specific session, until the assignment of tone subsets is modified by the central controller). As the subsets are disjoint, the US transmissions are orthogonal, and do not interfere with each other allowing the multiple access. In more detail, in order for the OLT Rx to successfully demodulate tones generated at different ONU US transmitters, it is necessary that all the (mutually disjoint) tones generated by the multiple ONUs in the BG, be orthogonal, i.e. be located on the common OFDM grid, at the fixed OFDM spacing, $\Delta f$. However, it is not necessary that the phases of the distinct tones of distinct ONUs be mutually locked, as the OLT may readily run its channel estimation procedure (or phase estimation) for each particular US tone it receives, and correct for any phase offset (which may differ from one tones-subset to another). Moreover, it is necessary that all OFDM blocks (frames) from distinct ONUs, be mutually locked. To this end a ranging procedure, similar to that used in the WiMax wireless algorithm and the DOCSIS cable modems algorithm may be used, (the two algorithms have much in common, with WiMax having adopted elements of the DOCSIS) whereby at setup, each ONU transmits training frames, used by the OLT to learn each specific ONU's delay, and communicates the information to the ONUs, which may then adjust their frame timings so that they simultaneously reach the receiver. This allows keeping the cyclic prefix overhead small.

We next explain how each ONU synchronizes its tones-subset to the common OFDM spacing. To this end, it is necessary to first estimate this spacing. This is readily accomplished from the received D frequency slot, which contains a segment of the spectral structure of the wideband OFDM signal DS transmitted at the OLT. The tones of this segment are all nominally spaced $\Delta f$, hence the information is available to perform the estimation of $\Delta f$ and the generation of an OFDM grid of the same spectral pitch, to be applied to the electro-optic modulator and end up being transmitted over the U frequency slot. Notice that each ONU in the BG just injects tones over a subset of the OFDM grid, which may be most simply generated by essentially generating a full frequency slot-width FFT but setting all the tones outside the tones-subset to zero (alternatively, a smaller size FFT could be generated according to the tones-subset size, then digitally up/converted to its proper location, but this is more complicated than the option of generating a sparse full size US FFT, with lots of zero sub-channels, which is the preferred approach.

Network Architecture and Spectral Structure of the DS & US Signals

The network is partitioned along several hierarchical levels. A 25 GHz-spaced DWDM channel plan is used at the network level as a means to increase capacity. Each channel utilizes OFDM-based downstream (DS) and upstream (US) transmission schemes (FIG. 3), in disjoint bands.

Figure 3:
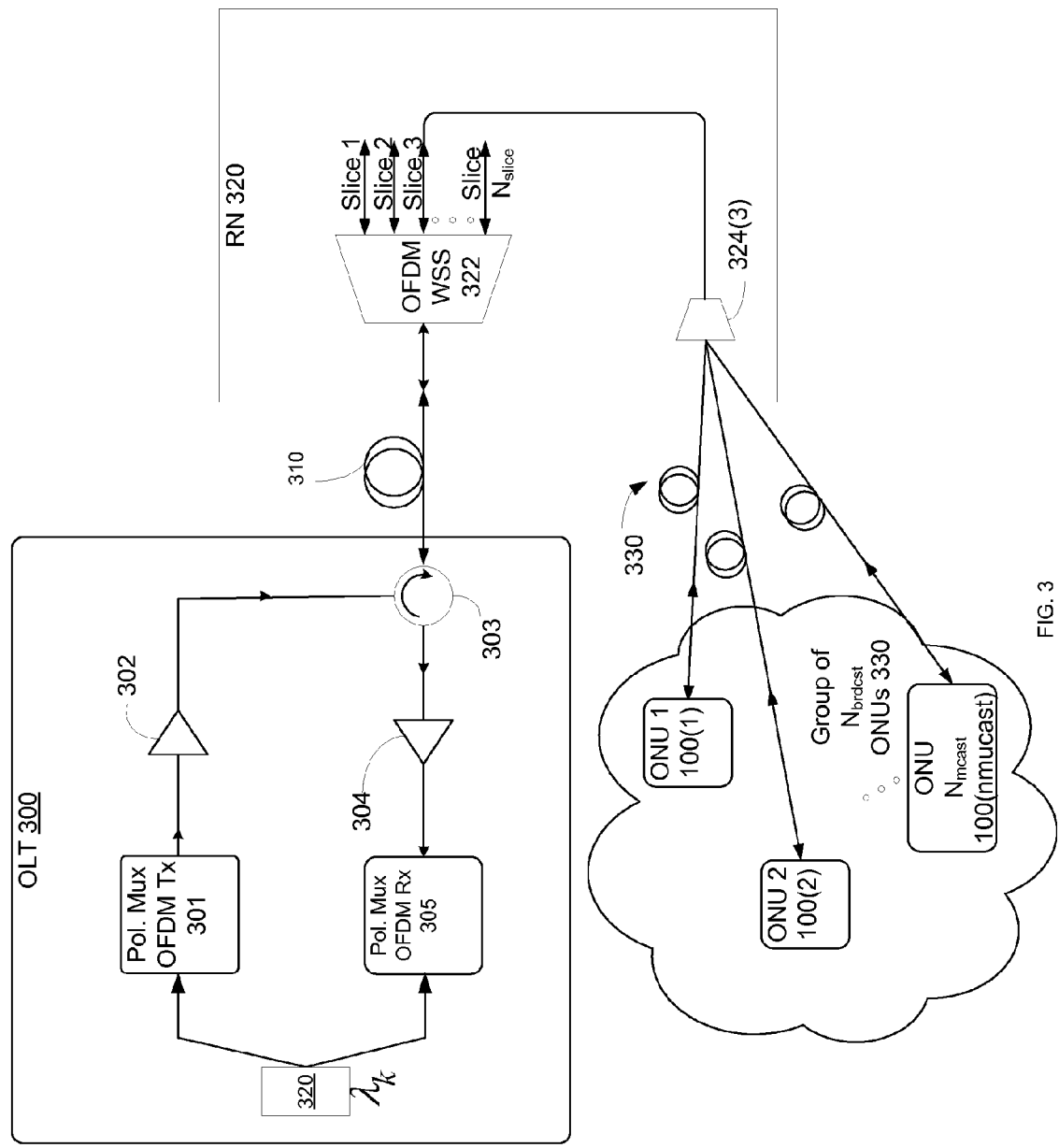
FIGS. 3, 4 and 7B illustrate optical access networks according to various embodiments of the invention.

FIG. 3 illustrates an OLT having a laser diode 320 having a wavelength of $\lambda_k$, that is coupled to a TX OFDM transmitter 301, to an amplifier 302 and via a circulator 303 to a fiber that is connected to a remote node 320. The OLT has a receiver path that starts by circulator 303, is followed by amplifier 304 and ends by OFDM receiver 305. Each OFDM channel is further composed of sub-channels (referred to as tones), and subsets of these tones serve one or more ONUs. A Fractional Wavelength Division (de)Multiplexer (FWDM 322) is inserted in the downstream path of each OFDM channel at the remote node RN 320, splitting the OFDM signal of each wavelength into Nslice frequency slices and multicasting each slice to a specific group of Nmcast ONUs—such as group 330 that includes ONUs 100(1)-100(Nmcast). Passive splitting is done by means of passive splitters (such as splitter 324(3) that receives the third frequency slice allocated to group 330 and splits it to each ONU of group 330. Each passive splitter is associated with a FWDM output port. The ONUs belonging to each such multicast group use FDM (different OFDM tones) and/or TDM for the DS reception, as elaborated below, picking up a subset of the throughput on the particular slice. Thus, a key feature is the usage of two levels of splitting for each DWDM channel, the first level being orthogonal spectral splitting, typically incurring a fixed excess loss which does not depend on the split ratio (=Nslice), and the second level being passive splitting, incurring an inherent loss of 1:Nmcast in addition to its excess loss.

Compared to alternative approaches, whereby each ONU listens to a full wavelength channel OFDM multiplex, the partitioning into spectral slices yields substantial advantages, in addition to the OSNR advantage due to the reduction in power splitting loss by a factor up to Nslice. A factor of up to Nslice OSNR improvement would then be attained for an ideal FWDM (e.g. for Nslice=4, OSNR would be improved by 6 dB). More generally, most of the opto-electronic electrical bandwidth requirements at the ONU are reduced due to the spectral width reduction.

FIG. 3 illustrates a single wavelength signal path. Signal is split in two hierarchical levels—the first level done by a FWDM component, being orthogonal spectral splitting, typically incurring a fixed excess loss which does not depend on the split ratio, and the second level being passive power split, incurring an inherent loss of 1:Nmcast in addition to its excess loss.

Figure 4:
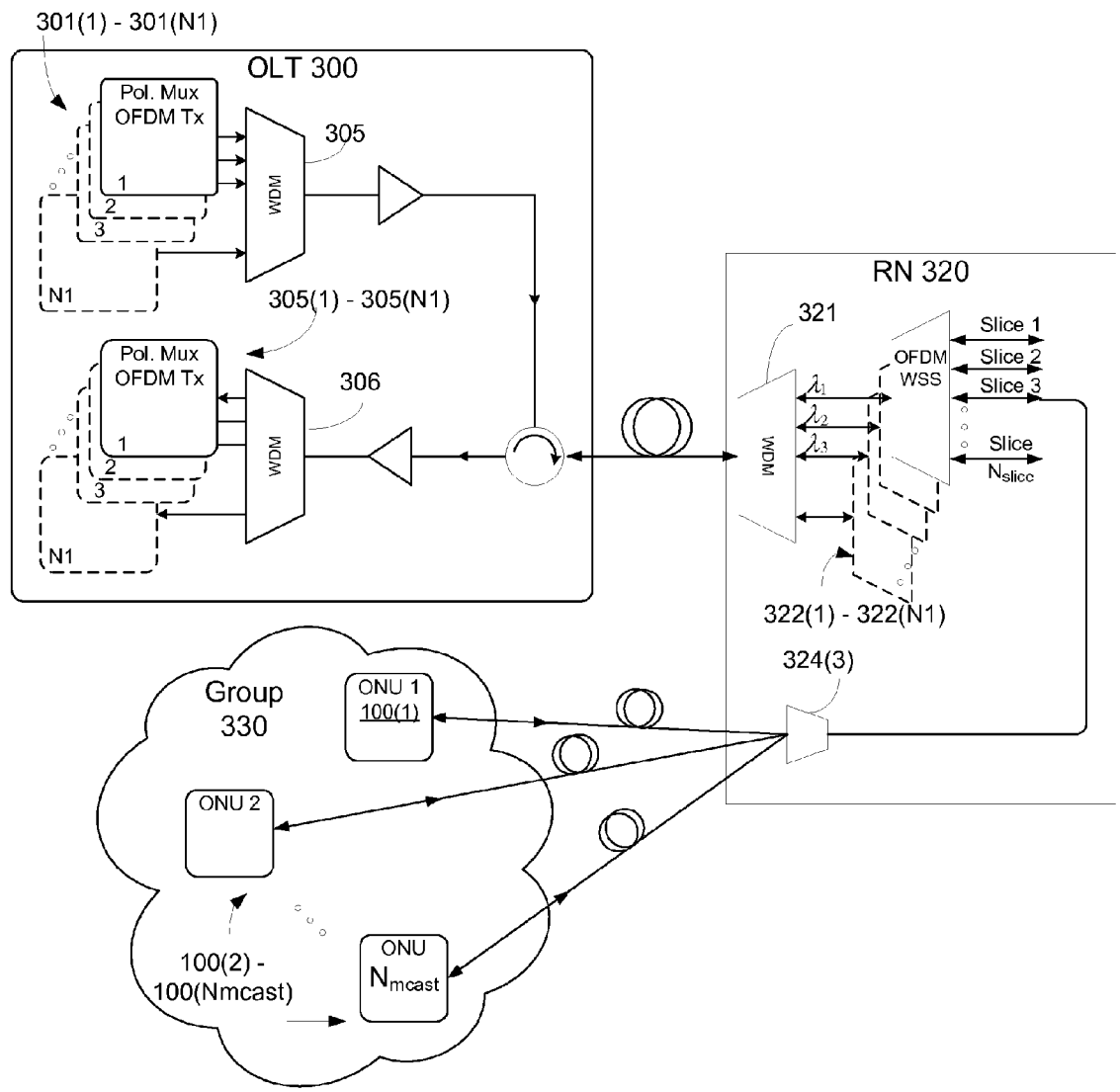

Although FIG. 3 describes a single wavelength system, it is noted that wavelength division multiplexing may be used as the top level of spectral multiplexing, for large serving areas. As shown in FIG. 4, each OFDM signal has a specific wavelength, $\lambda_k$, on a ITU-T compatible frequency grid, currently selected at 25 GHz spacing (to correspond to electronic processing speeds commercially available at reasonable cost, as required for PON applications, especially the analog-to-digital conversion). Corresponding pairs of Tx and Rx components of the OLT (labeled by the same index, 301(1)-305(1), . . . 301(N1)-305(N1) may share the same optical source, used both as a source of DS modulation and as optical local oscillator for coherent detection.

Figure 5:
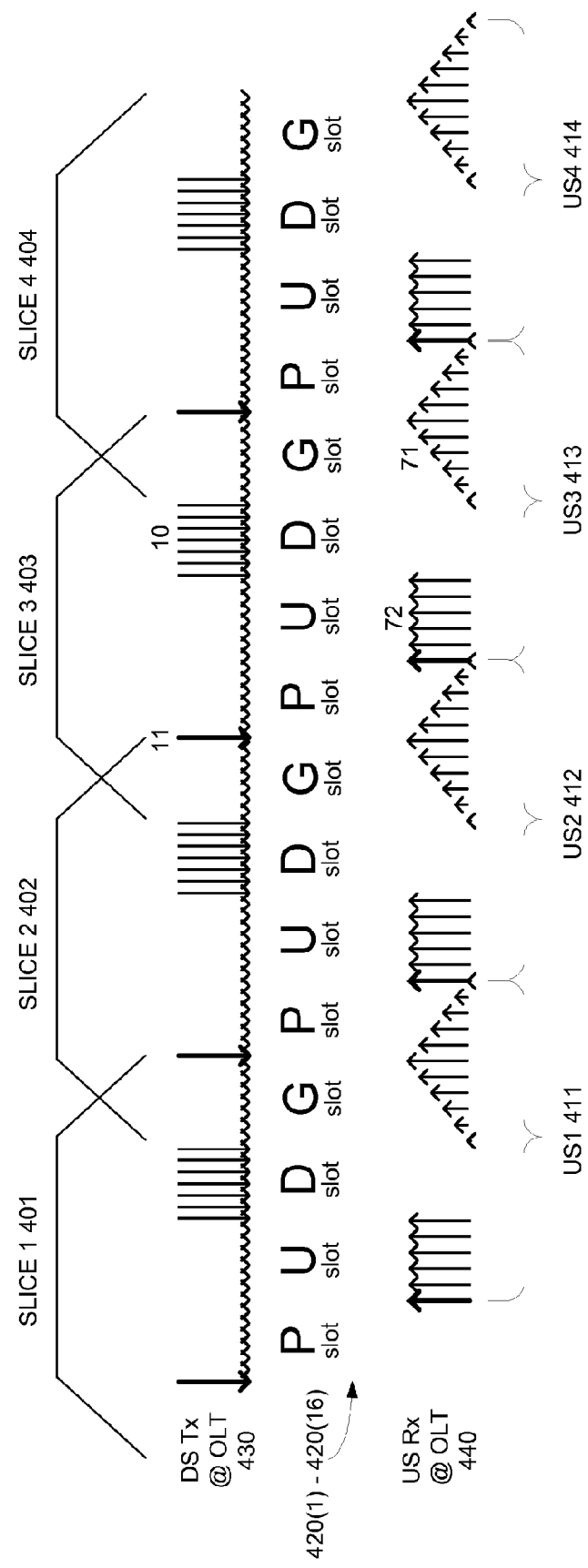

The OFDM DS spectrum of a generic OLT Tx at a particular wavelength, is not contiguous but includes multiple guard-bands as well as pilot tones, to be used by ONUs for US modulation. As shown in FIG. 5, both the DS and US spectra are first partitioned into slices 401-404, and each slice is further partitioned into frequency slots 420(1)-420(16). There are three active frequency slots marked P (Pilot), U (Upstream) and D (Downstream) in each slice, as well as a G (Guard) frequency slot separating the PUD frequency slots of adjacent slices, and allowing the adjacent filters transition. The "PUDG" structure repeats itself Nslice times over each wavelength spectral span. The OLT transmits DS data (OFDM sub-carriers) over the D-frequency slot and a pilot tone at the left edge of the P frequency slot. Hence the P frequency slot carries a single unmodulated tone, and the U and G frequency slots are empty. The channel slices are extracted by the FWDM to individual output ports, with the tones from the adjacent slices being suppressed by the FWDM slicer shape. Each spectral slice output is associated with an ONU multicast group.

The spectral width of the guard-band G may be is actually arbitrary, though for definiteness, starting with FIG. 5, we took it equal to the widths of P, U and D frequency slots. We shall denote the spectral width of the P, U and D frequency slots by W slot and the width of the G frequency slot by $\alpha W_{slot}$ with the G frequency slot relative width $\alpha$ to be determined by the FWDM filter design—how steep can the filter stop-band can be made. Notice that $\alpha=1$ is a reasonable assumption, used in the following figures.

Figure 7A:
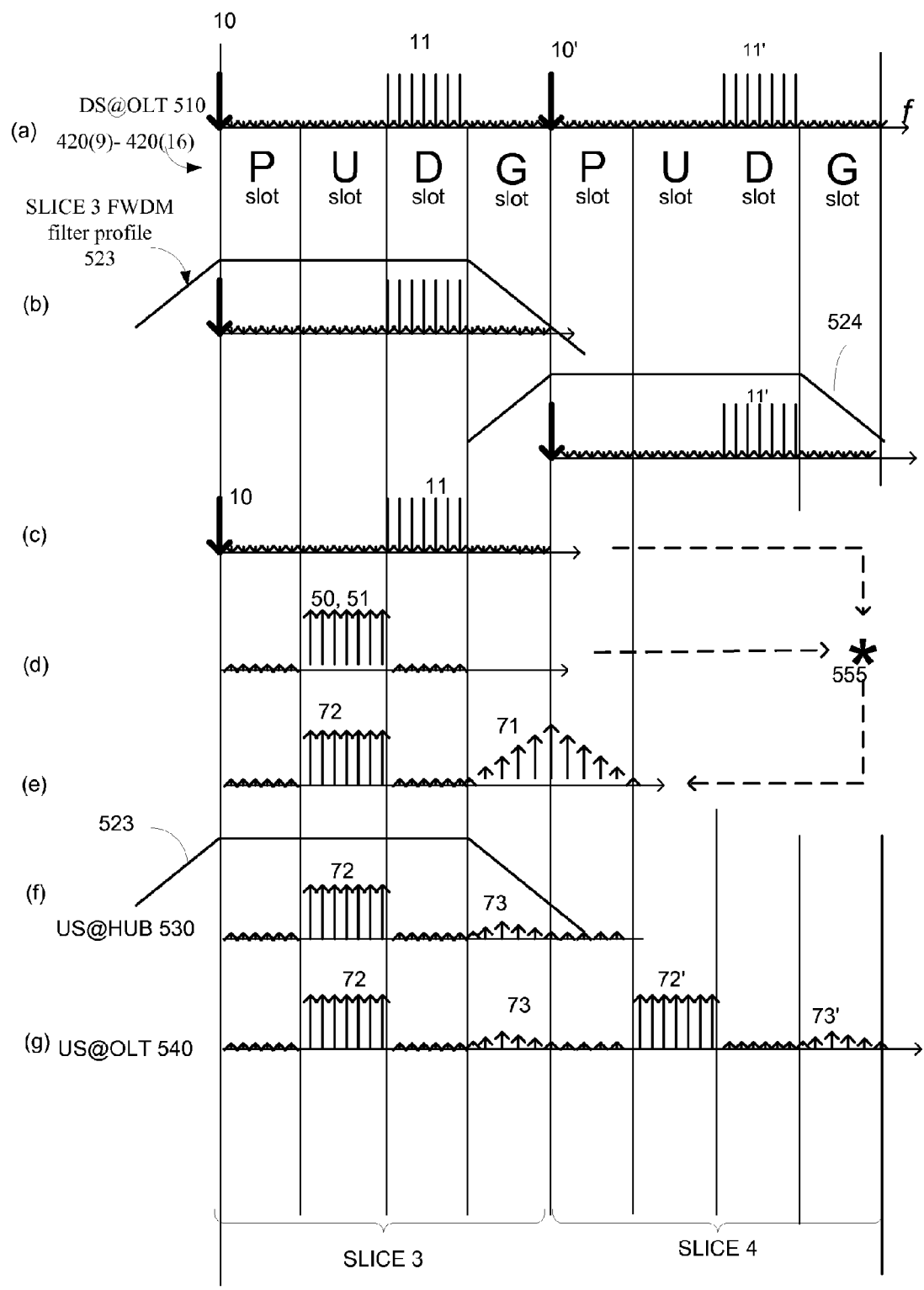

FIG. 5 also illustrates aggregate US spectral structure from all the ONUs—arranged in frequency shifted upstream slices US1-US4 411-414. It is apparent that the upstream information signals (such as 72) are transmitted upstream by the ONU over the U frequency slot of the corresponding slice to which the ONU is connected. Extraneous upstream modulation (Upstream secondary signals such as 71) is also generated over the G and P frequency slots, however (consider for definiteness the G frequency slot separating slices 1 and 2) the extraneous upstream modulation going over the P frequency slot is very strongly attenuated by slice-1 filter and preventing interference to the adjacent slice 2, whereas the upstream modulation over the G frequency slot is just partially attenuated by either slice 1 or slice 2 filters, yet it falls in a spectral region not interfering with the PUD operations in these adjacent slices. FIGS. 6 and 7A explain how the US modulation (shown at the bottom of FIG. 6) is actually generated at each of the ONUs. To this end let us recall the novel ONU structure as illustrated in a block diagram in FIG. 1A.

The top row of FIG. 5 indicates the frequency responses from the FWDM WSS 322 input to each of its output ports—it shows the different frequency slices 401-404. The second row describes the sparse wideband OFDM signal transmitted DS by the OLT 300—a pilot signals (such as 11) and downstream information signals (such as 10)—aimed to four different groups of ONUs. The 3rd row describes the "PUDG" structure of frequency slots 420(1)-420(16), with the OFDM spectrum divided into frequency slots. The bottom row describes the US spectrum received at the OLT arranged in frequency shifted upstream slices US1-US4 411-414, generated by the superposition of the multiple re-modulations performed by the ONUs upon the DS signal received at each ONU.

FIG. 6 illustrates in greater details one slice and provides a graphic illustration of the generation of the spectral structure for upstream modulation. A frequency slice 403 includes four frequency slots 420(9)-420(12), the downstream signals 430 include a pilot signal 11 and downstream information signals 10. The upstream signals include upstream information signals 72 and upstream secondary signals 71.

ONU and OLT Bandwidth Requirements

The overriding objective is to generate a very efficient, high-performance, yet low cost design. While our emphasis is on the low-cost mass-produced ONU, we should not lose track of the OLT, which may be a bit more relaxed in terms of cost, as it is shared among multiple ONUs. The spectral design, described in FIGS. 5 and 6 was formulated in abstract terms.

The suggested architecture enables of low bandwidth ONUs, facilitating low-cost electronics and electro-optic modulation. We recall that this is made possible by the usage of frequency selective optical designs for the FWDM filter banks. We show below that the ONU bandwidth, as far as reception is concerned, is brought down to $W_{slot}$, whereas in the upstream transmission, due to the requirement to avoid re-modulation over the same D frequency range, we must shift the U-frequency slot one frequency slot to the right, i.e. for US modulation we require the DAC to support a doubled bandwidth of $2W_{slot}$. This will be reflected in the bandwidth requirements for the DAC in the ONU, and the electro-optic IQ modulator, which should extend to $2W_{slot}$. Notice however that it suffices to optimize the DAC and IQ MOD and just over a band pass span $[W_{slot}, 2W_{slot}]$, providing relatively flat frequency performance over this passband range, rather than requiring flatness over the full baseband $[0, 2W_{slot}]$ range. At this point let us develop a methodology for deriving numerical values for the key parameters to be given in this example.

Exemplary Design Scenario

First we select a WDM spacing. A natural choice would be the 50 GHz ITU-T grid; out of the 50 GHz band associated with each "wavelength" some 40 GHz are usable for PON US and DS modulation, however an OFDM OLT Rx taking full advantage of this band would require an oversampling rate of about 1.4, i.e. ADCs at 40·1.4=56 Gsamp/s, which is precisely the ADC technology we would like to avoid (sampling rate is too high), as it barely starting to be introduced now. Instead we opt for halving the OLT Rx ADC speed, operating at 56/2=28 Gsamp/s, which is considered a low-cost CMOS technology (the same ADC devices will be down-graded to 20 or 10 Gsamp/sec in the ONU, which will still provide some nice oversampling advantages, trading those against power consumption, while the CMOS ASIC meets the very low-cost ONU requirements). Now, as we halved the sampling rate at the OLT, we have also halved the bandwidth, hence now two OFDM DS signals fit in the 50 GHz band (with substantial guard band margin at the two ends). A more natural choice of WDM grid is the 25 GHz spacing, also conforming to the ITU-T standard. It is possible to generate such an optical comb of lines spaced 25 GHz apart by various means, e.g. by commercially available modelocked lasers, or other type of multi-carrier generators fed from a stable laser source.

The 25 GHz WDM grid, with each wavelength modulated by the IQ signals from the two polarizations of a particular OFDM DS Tx, is wavelength multiplexed by a WDM (which may also be realized by a FWDM), and transmitted from the OLT, downstream to the remote node, where it is WDM de-multiplexed, then each 25 GHz OFDM frequency band, riding on a particular wavelength, is sliced into Nslice spectral slices. Two reasonable selections for Nslice are Nslice=2 and Nslice=4. Considering first Nslice=2, there are two slices, over the 25 GHz span within each of which we place the PUDG spectral structure. In fact a convenient design directive is to ensure periodicity across slices and across the WDM grid, hence when Nslice=2, the frequency slots design per slice may be more precisely specified as $$\frac{G}{2}PUD\frac{G}{2},$$

i.e. two concatenated frequency slots yield $$\frac{G}{2}PUD\frac{G}{2} \mid \frac{G}{2}PUD\frac{G}{2} = \frac{G}{2}PUDGPUD\frac{G}{2}$$

and two concatenated $W_\lambda$=25 GHz bands yield $$\underbrace{\overbrace{\frac{G}{2}PUD\frac{G}{2}}^{SLICE\ 1} \mid \overbrace{\frac{G}{2}PUD\frac{G}{2}}^{SLICE\ 2}}_{25\ GHz\ WDM\ BAND} = \frac{G}{2}PUDGPUD\frac{G}{2}.$$

=G/2 P U D G P U D G/2

Similarly, if we select $N_{slice}$=4, we obtain $$\underbrace{\overbrace{\frac{G}{2}PUDG\frac{G}{2}}^{SLICE\ 1} \mid \overbrace{\frac{G}{2}PUDG\frac{G}{2}}^{SLICE\ 2} \mid \overbrace{\frac{G}{2}PUDG\frac{G}{2}}^{SLICE\ 3} \mid \overbrace{\frac{G}{2}PUDG\frac{G}{2}}^{SLICE\ 4}}_{25\ GHz\ WDM\ band} =$$

$$\frac{G}{2}PUDGPUDGPUDGPUD\frac{G}{2}$$

In each slice we have (wrapping around one of the two $$\frac{G}{2}$$

from one end to another, i.e. shifting the window by $$\frac{G}{2}),$$

a PUDG pattern emrges, hence there are precisely four frequency slots per slice and we have the relations:

$$W_{slice}=W_\lambda/N_{slice};\ W_{slot}=W_{slice}/4=W_\lambda/(4N_{slice}).$$

For $W_\lambda$=25 GHz and $N_{slice}$=2 we have $$W_{slot}=25\ GHz/(4\cdot 2)=3.125\ GHz$$

whereas for $W_\lambda$=25 GHz $N_{slice}$=4 we have $$W_{slot}=25\ GHz/(4\cdot 4)=1.5625\ GHz$$

The pro and con considerations for these two selections boil down to the trade-off between the challenge of FWDM optical filtering in the remote node vs. the challenge of high-speed Silicon photonics based electro-optic IQ modulation in the ONU.

At this point, for the FWDM filter transition, separating adjacent slices $W_{slot}$=3.125 GHz is currently an available technology, whereas 1.56 GHz is harder to achieve but may be developed over the course of the project.

On the other hand, the required modulator bandwidth is shown below to equal $W_{mod}$=2$W_{slot}$ (twice the bandwidth of the information, as frequency shifting of the U (and D) band up by one frequency slot is required to prevent backscatter as discussed below).

Thus, for $N_{slice}$=2 and $W_{slot}$=3.125 GHz we require $$W_{mod}=2W_{slot}=6.25\ GHz,$$

whereas when $N_{slice}$=4 and $W_{slot}$=1.56 GHz we require $$W_{mod}=2W_{slot}=3.125\ GHz$$

Henceforth, when considering the description of the various system modules and components below, it is convenient to keep these two specific scenarios in mind:

$$W_{slot}=3.125\ or\ 1.56\ GHz$$

Heretofore we nominally took the width of the P, U, D and G frequency slots to be identical, $W_{slot}$. However, depending on the FWDM filter technology, it may be possible to have a G frequency slot filter transition equal $\alpha W_{slot}$, with $\alpha$<1. In this case, the PUDG fitting in the slice implies that (3+$\alpha$) $W_{slot}$=$W_{slice}$, hence the calculation of $W_{slot}$ is readily modified to read:

$$W_{slot}=W_{slice}/(3+\alpha)=W_\lambda/[N_{slice}(3+\alpha)].$$

Various Characteristics of the Multiplexing Format and Multiple Access

The multiple access scheme in the DS consists of OFDM with time-domain packet multiplexing. The ONUs belonging to each multicast group share and listen to a common DS OFDM signal (a slice of the wideband OLT DS OFDM signal), and TDM-extract their individual data-packets out of the overall shared DS OFDM signal.

Figure 8:
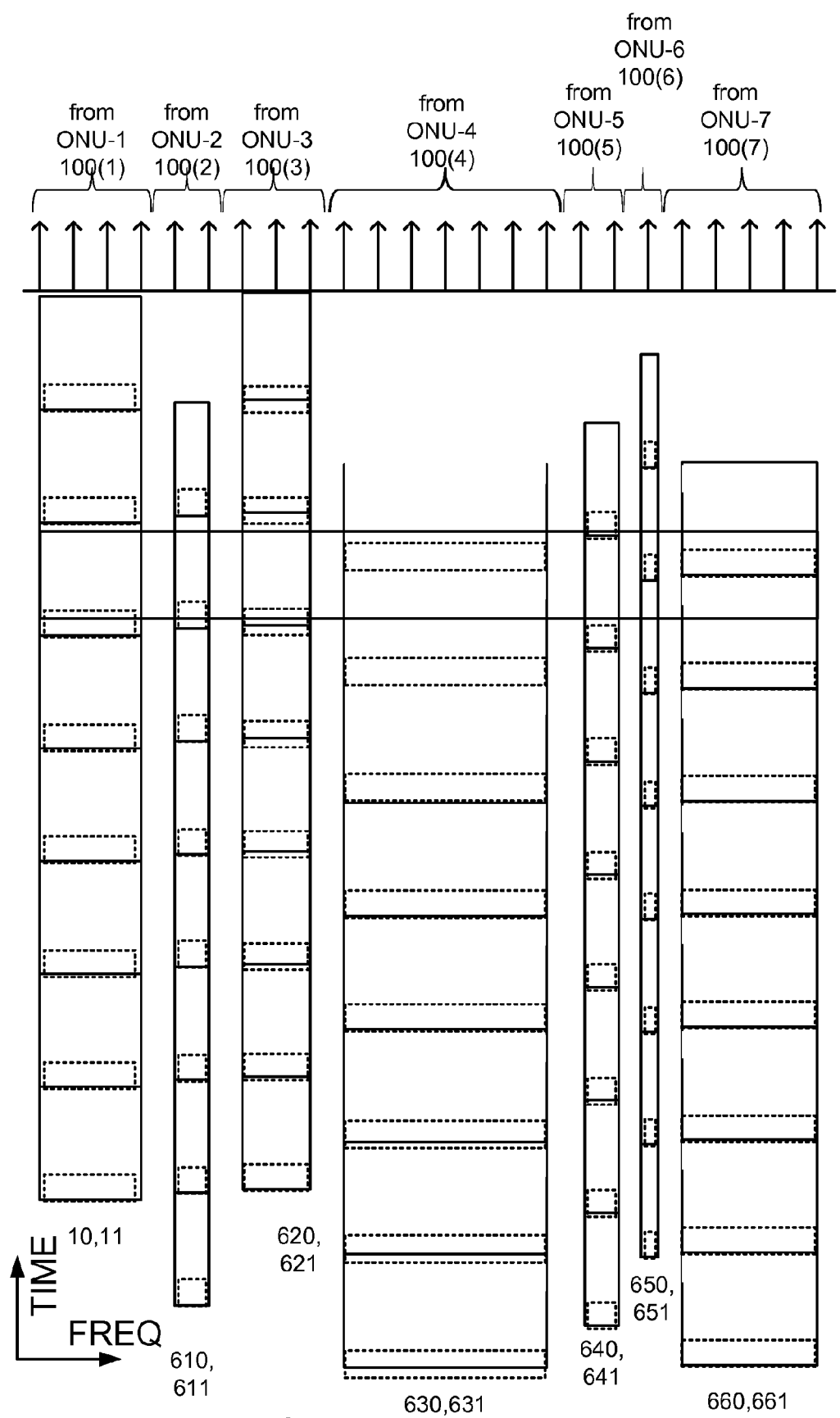

The novel multiple access scheme in the US consists of OFDM-based Frequency-Division Multiple Access (FDMA)—as illustrated in FIG. 8. FIG. 8 illustrates seven different ONUs 100(1)-100(7), that transmit upstream information signals and upstream secondary signals (10,11), (610, 611), (620,621), (630,631), (640,641), (650,651) and (660, 661) at a different sub-set of tones and at slightly different timing (to compensate for differences in the propagation of signals over the PON).

The ONUs of each multicast group all transmit US OFDM signals occupying a common spectral slice, with each ONU accessing a disjoint subset of OFDM tones, while nulling the other tones (which are assigned to other ONUs). In other words, each ONU signals upstream on a subset of tones (OFDM subcarriers) disjoint from that of its neighbors (as assigned by the OLT). All the US OFDM signals generated by the individual ONUs are OFDM-block-time synchronized by a ranging protocol and are locked onto the common frequency-comb of the DS OFDM signal. This digital-OFDM-oriented FDMA approach avoids dealing with complex analog frequency shifting schemes for the various US ONU Tx. Moreover, all users are "on" all the time, hence there are no bursts and transient effects, and inefficiencies caused by TDMA collisions are eliminated While the strategy just described for the US multiple access addresses the frequency synchronization and time-blocks synchronization, we mention that phase synchronization is not an issue (simple channel estimation techniques and one-tap equalizers are used in the OFDM OLT Rx).

Our novel frequency-domain oriented multiple access approach should be contrasted with current generation UPON systems, currently based on Time-Division Multiplexing (TDM) Multicast in the DS, and Time-Division Multiple Access (TDMA) in the US, which decimates the throughput down to one-over-the-number of users, and requires overcoming time-domain transients (burst detection).

FIG. 7A illustrates the unique spectral design according to an embodiment of the invention.

PON Hierarchy. OLT comprises $N_\lambda$ OFDM DS Tx-s and US Rx-s each transmitting on a WDM 25 GHz band ("wavelength"). The Remote Node (RN or Remote HUB) WDM de-multiplexes the WDM-OFDM signal from the ONU. Each wavelength is input into a Fractional Wavelength Division Multiplexer (FWDM) multi-port filter, with $N_{slice}$ outputs, dividing the 25 GHz OFDM spectrum into Nslice spectral slices. All the ONUs connected to the same power splitter are said to form a multicast group, sharing the same slice of the OFDM DS signal, and injecting and combining their US transmissions as further shown in FIG. 8.

FIG. 7A illustrates the spectral structure of the OFDM DS and US signals at various levels in the network, and in particular at the ONU modulator input and output. The different signals are labeled (a)-(g).

This figure exemplifies a design with Nslice=2 slices fitting in the 25 GHz WDM band, i.e. FWDM filters with one input and two outputs are connected in the HUB to each of the wavelength outputs of the WDM (the other design case, Nslice=4 is similarly structured with the PUDG frequency slots structure recurring four times).

The top row (a) illustrates an OLT the generates a wideband 25 GHz OFDM spectrum with two slices aimed at two ONU multicast groups. The sparse spectral structure is intended to make room for the US transmissions, ensuring that US and DS transmissions do not overlap and interfere (mitigate Rayleigh scattering cross-talk as well as US re-modulation of the DS information). This signal ("DSWOLT 510") includes a pilot signal 10 and downstream information signals 11 for a slice (such as third slice of FIG. 4 aimed to group 330 that includes ONU 100(1)), another pilot signal 10' and another downstream information signals 11 for another frequency slice (such as fourth slice of FIG. 4).

PUDG Frequency slots 420(9)-420(16) are also shown— as the OFDM spectrum is divided into frequency slots of equal width $W_{slot}$=25 GHz/$(4N_{slice})$=3.125 GHz. In the ONU, the US re-modulation is actually formed around pilot tones (labeled "pilot") injected at the OLT, one per slice.

The second row (b) illustrates that at the remote HUB 320, the FWDM partitions the spectrum into two slices, directed to different remote nodes. Each remote node, in turn, splits the lightwave signal to multiple ONUs, forming a multicast group:

a. Slice 3 FDWM filter profile 523 passes downstream signals within PUD frequency slots 420(9)-420(11)—pilot 10 and downstream information signals 11 and provides these signals to group 330.

b. Slice 4 FDWM filter profile 524 passes downstream signals within PUD frequency slots 420(13)-420(15)—other pilot 10' and other downstream information signals 11' and provides these signals to another group of ONUs (not shown).

The third till fifth rows (c)-(e) illustrates that ONU 100(1) receives light signals pilot 10 and downstream information signals 11 that are modulated (represented by symbol 555) by electrical signals such as upstream signals 50 and 51 (row (d)) to provide (row (e)) upstream information signals 72 that are within the upstream information frequency slot and upstream secondary signals 71 that are outside frequency slots 420(9)-420(11).

The upstream signals 50 and 51 may be OFDM US IQ SSB info signal of spectral support $[0, W_{slot}]$, that are digitally shifted to the right by $W_{slot}$ (within the OLT US Tx processor, and using a DAC), such that the modulation signal to be applied to the IQ modulator becomes a band-pass electrical signal (50, 51) with support $[W_{slot}, 2W_{slot}]$.

Modulation (multiplication) in the time-domain, maps into convolution in the frequency-domain, yielding the spectrum of row (e). What matters is that the US info has been imparted in the D frequency slot, disjoint from the U frequency slot which carries the DS info. Moreover, the extraneous signal mixing the DS and US modulation (the "triangle") is suppressed (see row (f)) by the Slice 3 FDWM filter profile 523, and does not overlap with either the D or U useful information frequency slots. This is made possible by the unique spectral design shown in (a), including the pilot pilots, and by the band-pass digital shifting of the electrical US signal, as shown in (c).

Finally, row (g) depicts the US spectrum collected at the OLT, formed by the superposition of the two spectral slices US propagating through the FWDM hub.

A comparison of rows (a) and (g) shows that half the bandwidth is unused: just the D, U frequency slots are filled, whereas the P, G frequency slots are empty. However, the G frequency slots are necessary to allow FWDM filter stop-band transitions, whereas the P frequency slots, accommodating the pilot pilots, must be left empty, else their spectral content would be shifted into the D frequency slots upon ONU re-modulation. Despite the seeming 50% spectral inefficiency, the system is quite spectrally efficient after all, by virtue of the self-coherent detection, enabling detection of rich constellations Referring back to FIG. 8 it can be noted that:

(a): Individual ONUs of a particular multicast group (all connected to the same FWDM output port via a remote node), all transmit their modulations over disjoint subsets of tones of a common frequency comb spanning the U-frequency slot. In fact each of these ONUs generates a full OFDM comb, however each ONU sets to zero all tones used by the other ONUs in the multicast group, modulating just its own distinct subset of tones. The top row indicates the superposition of the US signals from all ONUs of the multicast group, the transmissions of which add up to a full OFDM spectrum. A variable number of ONUs may thus be supported within a multicast group, and different bandwidths (number of tones) may be allocated to different ONUs, as desired. In particular it is possible to assign all US tones in the multicast group to a single ONU, i.e. have Nmcast=4, with this ONU signaling US at the maximum possible bandwidth, taking up all tones over the $W_{slot}$ spectral extent of the U-frequency slot within the slice. In addition, bandwidth may be assigned dynamically, varying in time according to user requests thus benefiting from statistical multiplexing.

(b): The OFDM time-domain blocks (frames) transmitted by each of the ONUs. All these blocks have duration T, but they may experience different timing phases from ONU to ONU, i.e. the instants between adjacent OFDM blocks of one ONU are misaligned with those of other ONUs, once received at the OLT. This would be undesirable, as all these subsets of tones are superposed in a composite OFDM signal to be processed by a single large size FFF (which also includes the tones from other slices). The method proposed to align the block boundaries of the US transmissions from all ONUs, is by means of a ranging algorithm as in the WiMax or DOCSIS standards (the usage of a small cyclic prefix (Reduced Guard Interval) allows relaxing the requirements of the ranging algorithm.

Network Hierarchy and Wavelength/Frequency Division Multiplexing

As seen in FIG. 7A the PON has a tree-like structure consisting of the OLT (WDM-OFDM), remote HUB (FWDM), Nodes (Passive splitting) layers. A new intermediate layer of denser DWDM is introduced at the remote hub based on Fractional Wavelength Division Multiplexers (FWDM), capable of extracting sub-wavelength spectral slices. The OFDM DS signal generated by each OLT Tx at a particular wavelength, comprises multiple spectral slices aimed at different multicast groups of ONUs. These spectral slices are directed to different fibers by the FWDM filters in the hub, each fiber leading to a passive splitter in the remote node. The fiber outputs of the passive splitter are directed to the ONUs of a particular multicast group. In the US direction, all the ONUs in a particular multicast group multiplex their transmissions in frequency within a US spectral frequency slot of their common spectral slice, interleaving non-overlapping subsets of OFDM tones, associated with each ONU US transmission.

Introducing the unique spectral structure of the transmitted DS and US signals the following principles are helpful to understand its rational:

(a) The US transmission in the ONU is also performed without a laser, based on US re-modulation of the DS received signal (the DS signal is "reflected" US, and re-modulated, with the US spectrum undergoing a frequency shift).

Figure 7B:
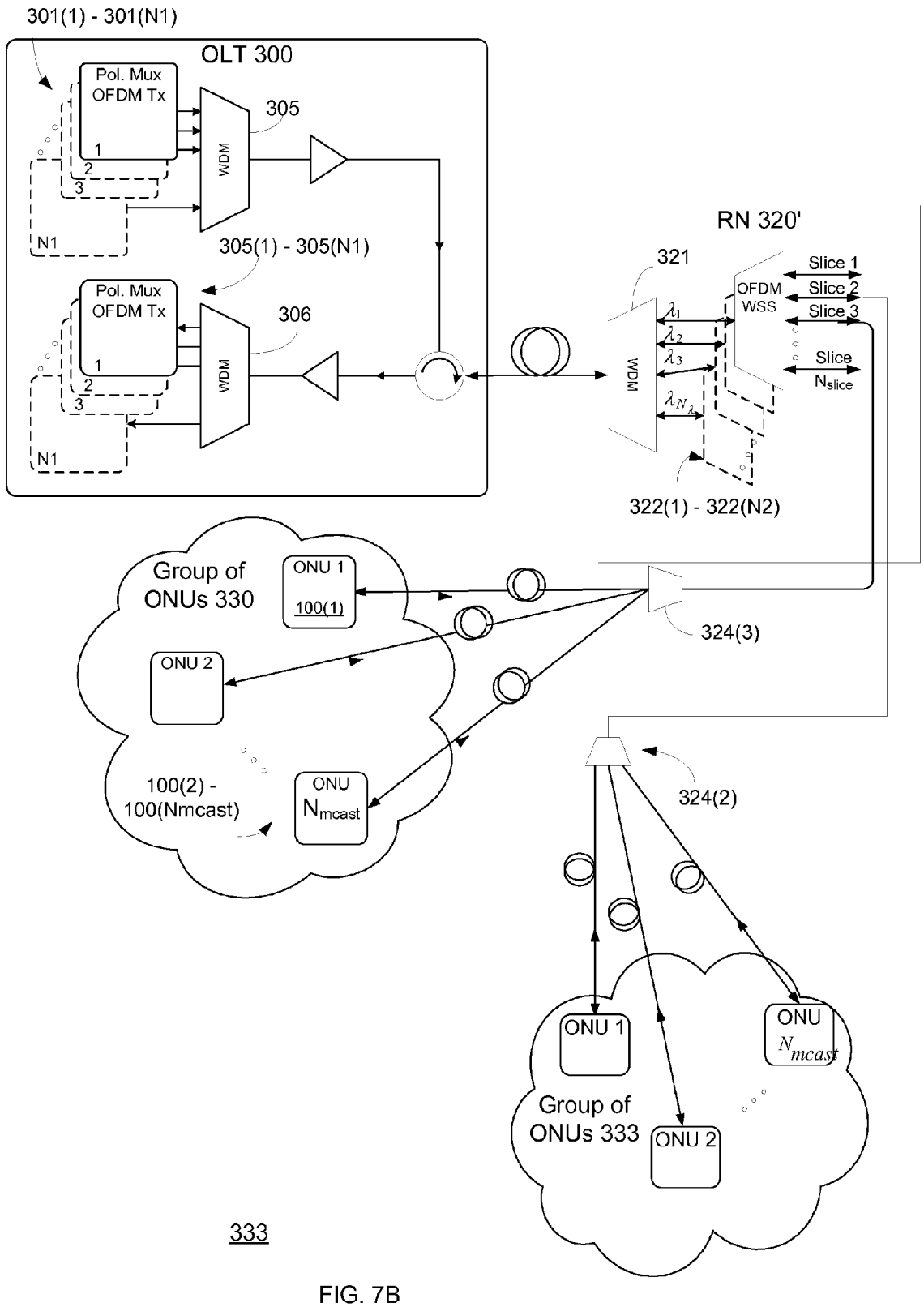

(b) A unique spectral design is illustrated in FIG. 7B throughout the network (OLT, remote HUB, ONU) enables decoupling the US re-modulation from the DS transmission (avoiding US re-modulation of the DS modulation, and mitigating Rayleigh backscatter cross-talk between the US and DS transmissions).

(c) The unique spectral design also achieves low overall detection bandwidth at the ONU, limiting the speed of the electronic detection and US re-modulation.

(d) The unique spectral design, bringing benefits (c), (d) above, consists of shaping the OFDM spectrum into spectral frequency slots including pilot pilots, limiting the optical detection bandwidth of the ONUs by means of a fractional wavelength division (de)multiplexer (FWDM) at the remote hub, and applying ONU US re-modulation with a digitally generated frequency shift.

(e) Consistent with the unique spectral design, the ONU is colorless, i.e. it includes no optical filtering. All ONUs are interchangeable.

(f) the DS pilot pilots and US re-modulation signal, are all digitally generated (analog pilot tones and analog mixers are eliminated), synthesizing all required frequency combs (and the complex amplitudes of the comb "teeth"—the subcarrier tones) in the OLT DS Tx and in the ONU US Tx, by means of IFFTs. In particular, the pilot pilot tones implanted in the DS signal (required for decoupling the US re-modulation from the DS modulation), are simply generated as un-modulated sub-carriers in the OFDM comb.

(g) Analog (opto-)electronics bandwidth is minimized—The electro-optic modulation speed (and the bandwidth of the DAC and analog modulator driver) in the ONU is kept low (either 3.125 GHz or 6.25 GHz under our two design scenarios illustrated in FIG. 7A with Nslice=2 or 4 respectively, inside a 25 GHz WDM grid, which is just a fraction of ¼ or ⅛ of the 25 GHz bandwidth of the full wavelength band). The effective optical detection bandwidth in the ONU is just 3.125 GHz (despite not having an on-board optical filter). One exception to minimizing the analog bandwidth, is the capability of using ADCs with oversampling (sampling rate of 20 Gsamp/sec, anti-aliasing filters (AAF) of 10 GHz) as implemented in the low-cost ONU Rx CMOS ASIC described above.

Reflective Re-Modulation in the US Direction in the ONU

As was indicated in the abstract of this patent, the usage of reflective re-modulation of the DS signal allows colorless and laserless operation while preventing unwanted interaction between US and DS modulations and also prevent Rayleigh back-scattering interference.

Although already described in the previous section, being a key characteristic of this patent, a section is devoted to the reflective re-modulation. This feature maybe divided into two:

Reflective re-modulation—needed to eliminate the need for a local laser for the US signal transmission Frequency shifting of the baseband information signal by a width of 1.5× frequency slot-width—needed to prevent Rayleigh back-scattering interference between the US and DS signals.

Although these two requirements are different and may be realized by two different components: the $1^{st}$ being an IQ—modulator and the $2^{nd}$ component—a frequency shifter, as an example of efficient implementation of the ONU Tx (FIG. 1) these two operations are performed by a single component (ONU IQ-modulator) by shifting the frequency of the modulated signal by the same shift that would have been required of the frequency shifter ($1.5 \cdot W_{slot}$). A comprehensive description of the re-modulation and frequency shifting process is given in the following text.

US Transmission Structure to Support Multiple Access

This sub-section describes a possible format of upstream transmission, complying with the general US remodulation structure described above, to efficiently support multiple access to all ONUs in a multicast group.

The US modulation format is essentially OFDM, with a novel FDMA method is used to frequency multiplex the Nmcast multiple ONUS linked to a particular FWDM port, i.e. all ONUs resorting to the U frequency slot of a single spectral slice (FIG. w4). The idea is that different ONUs in the multicast group use disjoint subsets of tones, as shown in FIG. 5. In fact all ONUs in the multicast group are synchronized to generate an US OFDM comb, spanning the full range of the U frequency slot. Each ONU in the multicast group modulates just a subset of the tones in the full U-frequency slot comb, while setting the other tones to zero. The assignment of tones-subsets associated with each ONU in the multicast group, is managed by a central controller in the OLT. This methodology ensures that the US transmissions of the various ONU-s in the multicast group are orthogonal, such that the US transmission do not collide and can proceed concurrently. The orthogonality of US transmissions of ONUs belonging to distinct multicast groups is further ensured by virtue of the fact that distinct spectral slices are orthogonal. Thus, to the extent that all ONUs are synchronized to the common grid launched DS by the OLT, then we will have achieved orthogonality and concurrent multiple access.

The synchronization of all ONUs to the common grid is achieved by having all ONUs recover either the duration, T, or the frequency 1/T of the OFDM block (number of OFDM blocks per second, where a "block" is the interval in which the OFDM (I)FFT occurs). Thus, if independent ONUs all acquire the duration T to good precision in the DS direction, then, in the US they may all generate FFTs of size $M^{US}$ over each of the T-duration intervals, which amounts to having their frequency domain combs synchronized. Indeed, within the block duration T, an IFFT superposes discrete-time sinusoids with $1, 2, \ldots, M^{US}$ periods fitting within the time T. The frequency spacing between these tones is precisely $\Delta v = 1/T$, and this is also the distance between adjacent spectral tones of the comb generated by an IFFT with block duration T. For the purpose of retaining the orthogonality of the tones and the US transmission from distinct ONUs, the timing phase, i.e. precise moment when the OFDM block commences, is irrelevant, however the timing phase is important after all for, as various subsets of tones cannot possibly be properly processed by the US OLT Rx, if they have different timing phases of their OFDM blocks, i.e. the situation depicted in FIG. 4 is unacceptable (unless a cyclic prefix of 100% is used, i.e. each OFDM block is repeated twice, which would incur excessive overhead).

In the US direction, the additional challenge then consists in synchronizing the OFDM blocks of independent "sub-OFDM" signals contributed by all ONUs, in both frequency and time, and at the next hierarchical level up, it is required to mutually synchronize the timing phases of the OFDM blocks in different slices, as all tones from all slices reaching upstream to the FWDM are combined into a contiguous wideband OFDM spectrum at the OLT. Moreover, the combs of ONUs belonging to different slices (different multicast groups), must also be locked to a common grid, also attained by having all ONUs acquire the block duration T of the DS OFDM transmission.

The method we initially adopt for acquiring the OFDM block timing phase synchronization, i.e. align all blocks across different ONUs (once their US transmissions reach the receiver), is by means of a ranging algorithm akin to that of WiMax and DOCSIS, as described in section 2.

Novel implementation of the ONU reflective transmitter

As illustrated in FIGS. 1A-1E the input fiber is connected to a Semiconductor Optical Amplifier (SOA) 190 in turn connected to a Polarization Beam-Splitter (PBS) 184 (reciprocally also functioning as polarization combiner). One of the PBS output ports is directly connected to a 90° polarization rotator 183, such that the PIC functions with a single physical polarization state. The ONU operates bi-directionally to allow each of the two orthogonal polarizations, to complete a loop, and return US passing through the opposite PBS port. Within this loop is an IQ modulator 170, modulating both polarizations components that propagate in opposite directions, with the same signal. This novel optical modulation path is intended to allow polarization split while generating a reflected signal in which both polarization components are identically modulated. In the detection path, the loop is split to feed a pair of self-coherent receivers for the x- and y-polarizations, enabling polarization diverse reception.

Figure 1B:
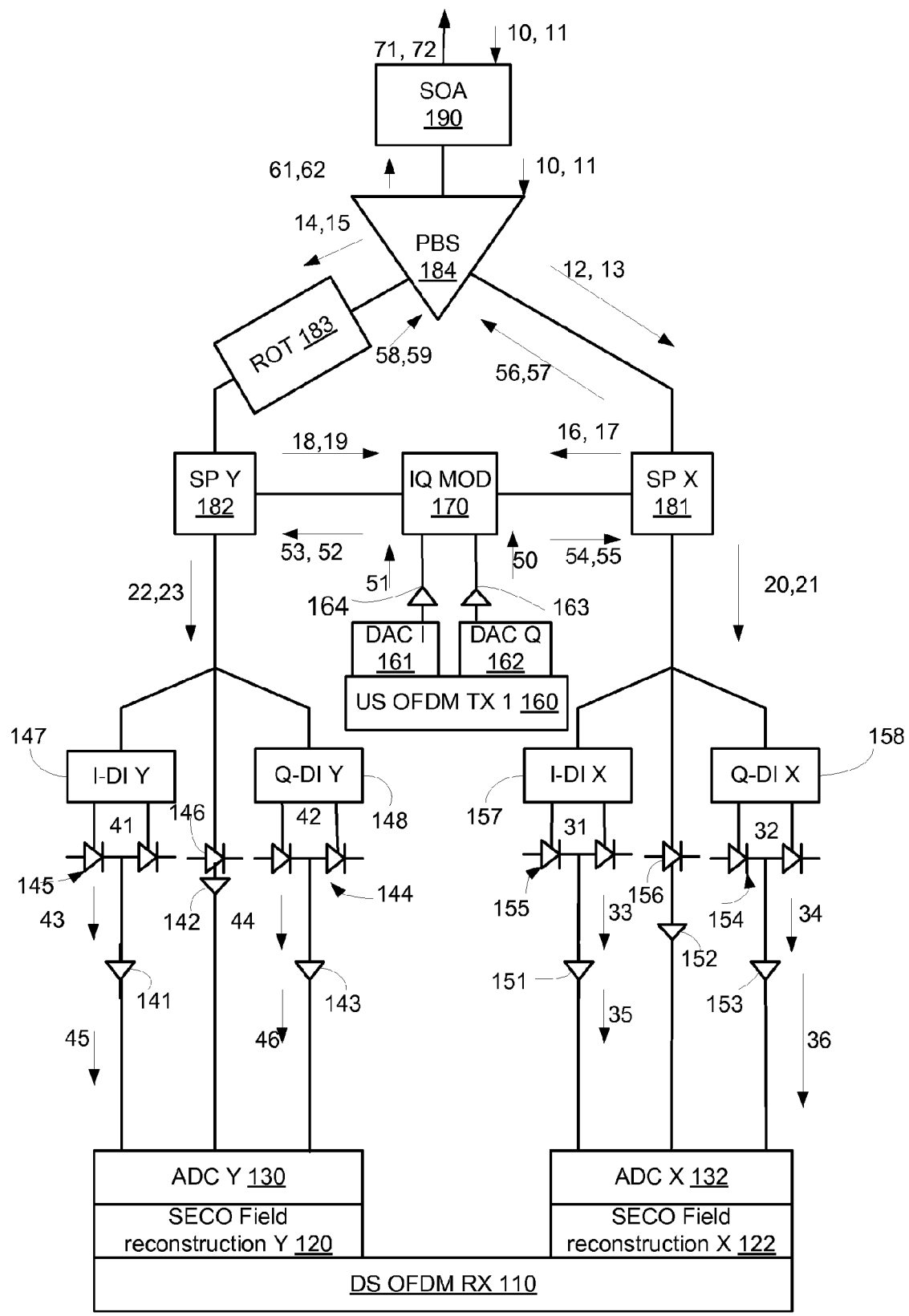
Figure 1C:
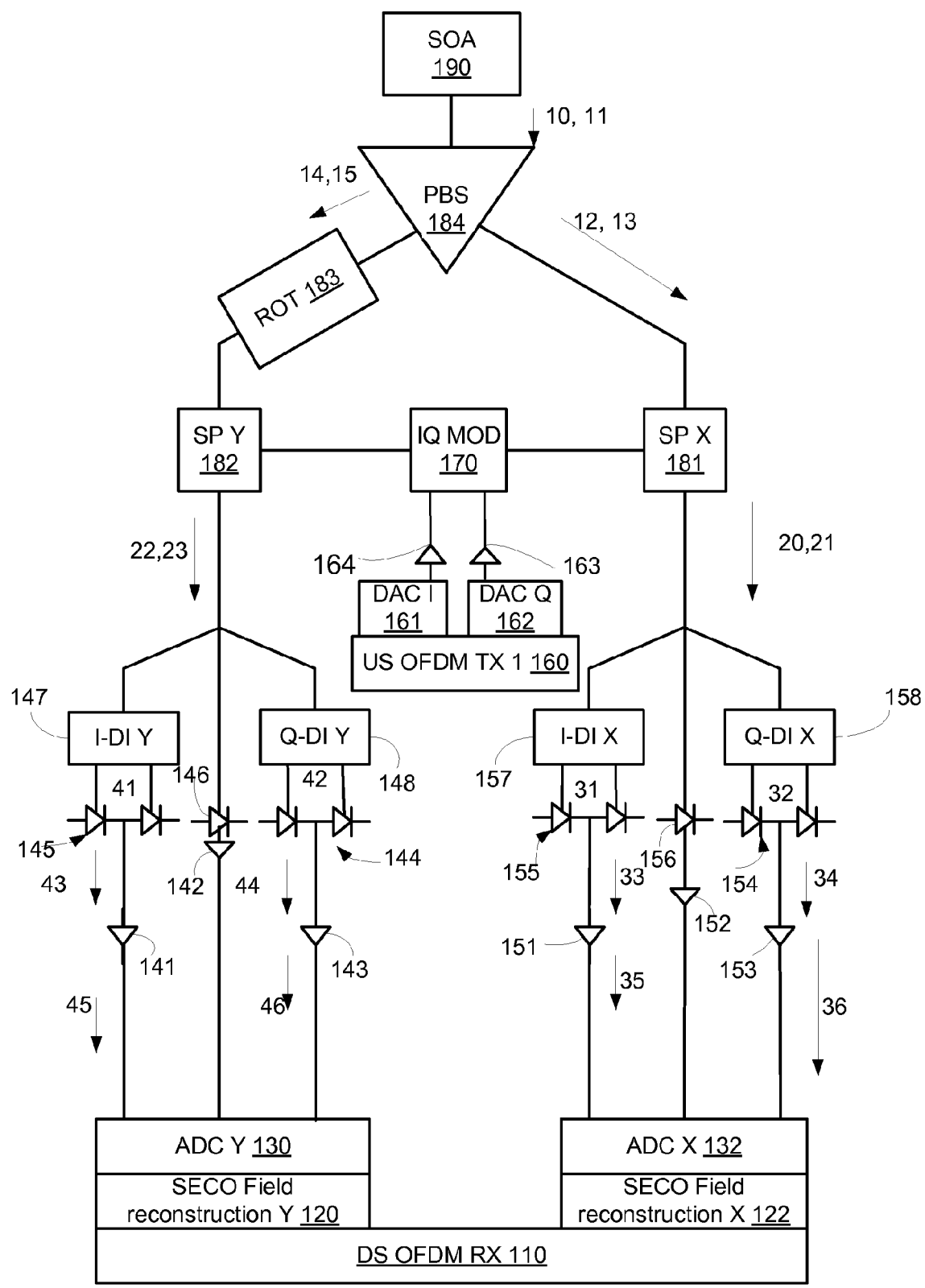
Figure 1D:
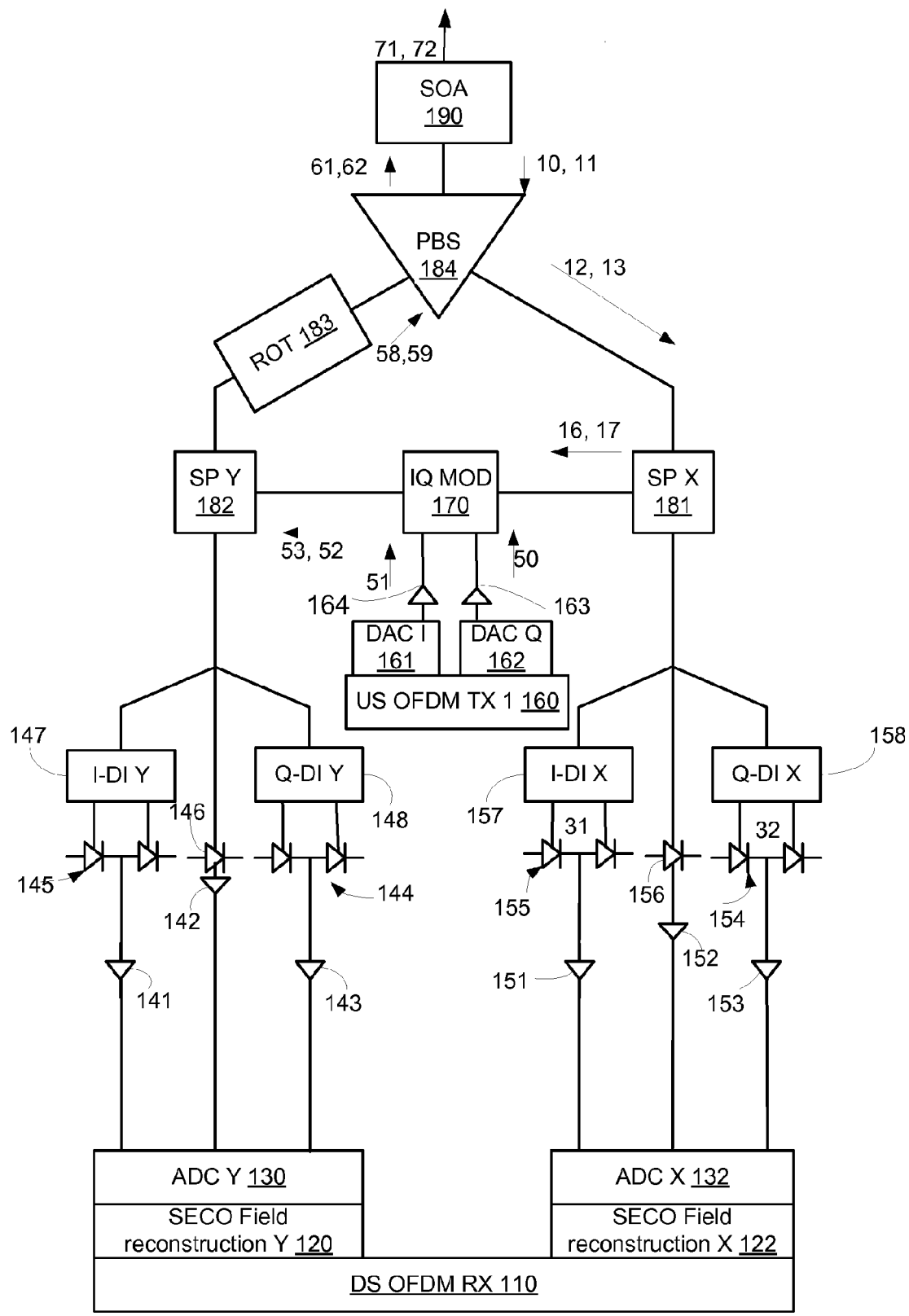
Figure 1E:
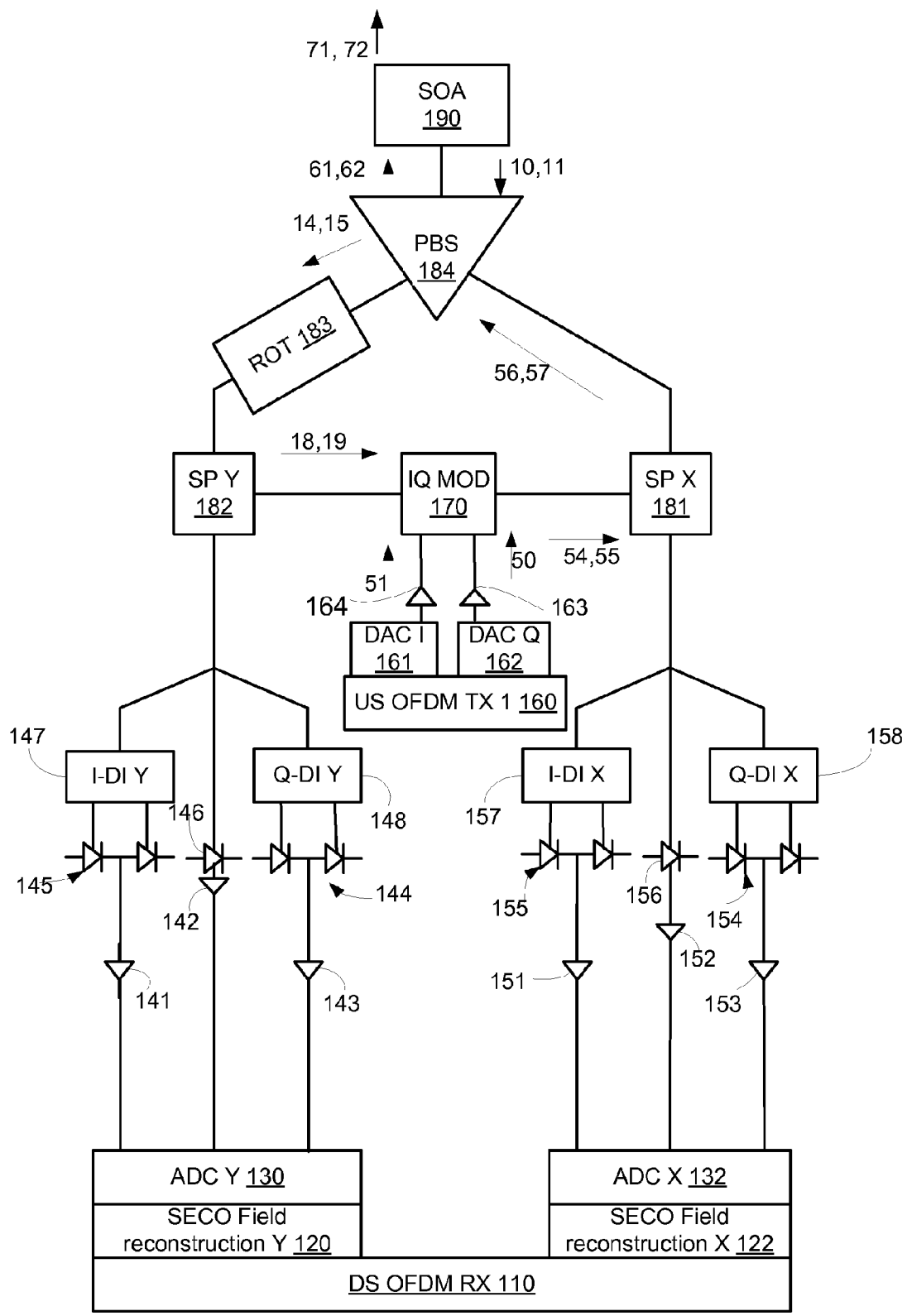
Figure 1F:
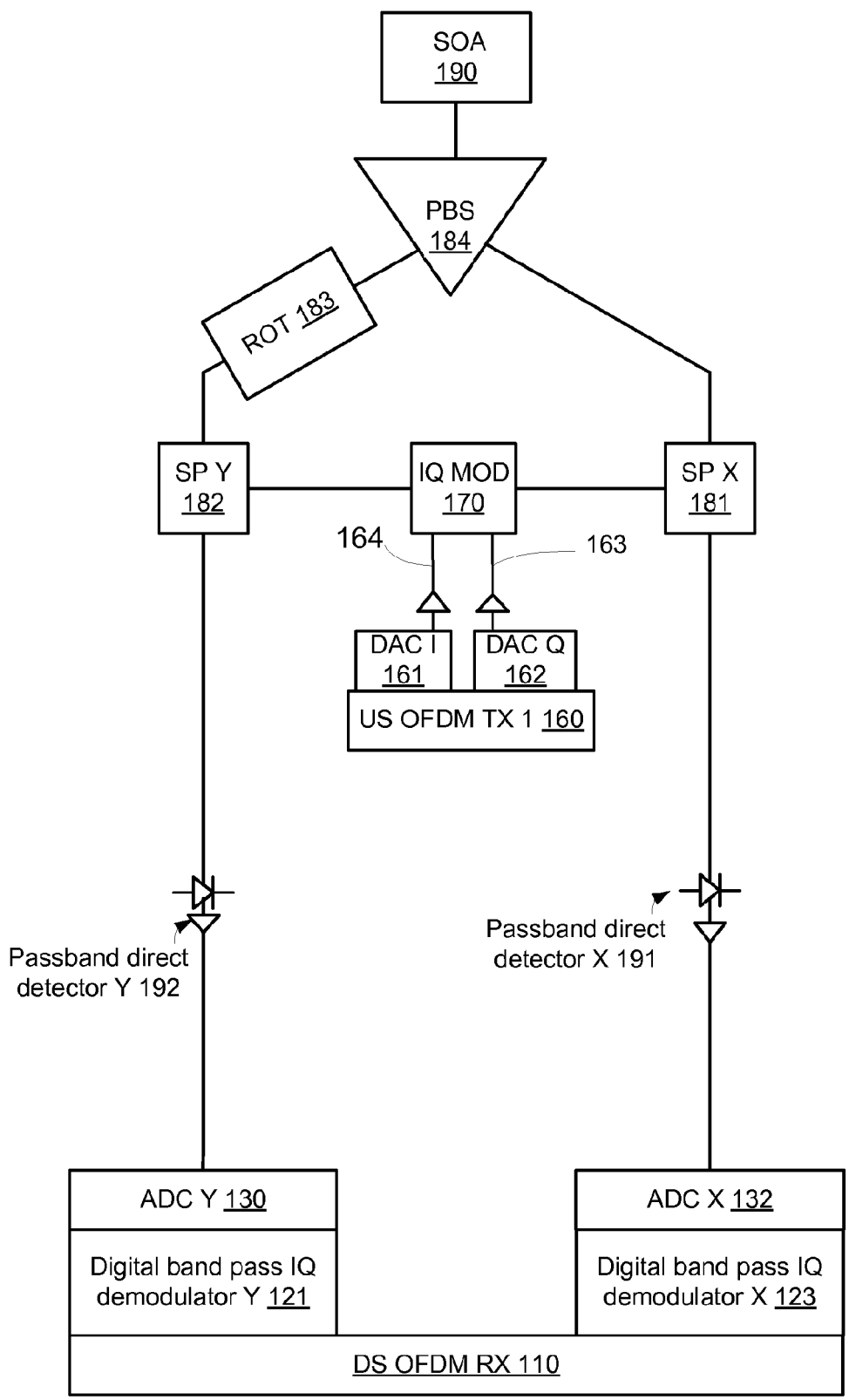
Figure 1G:
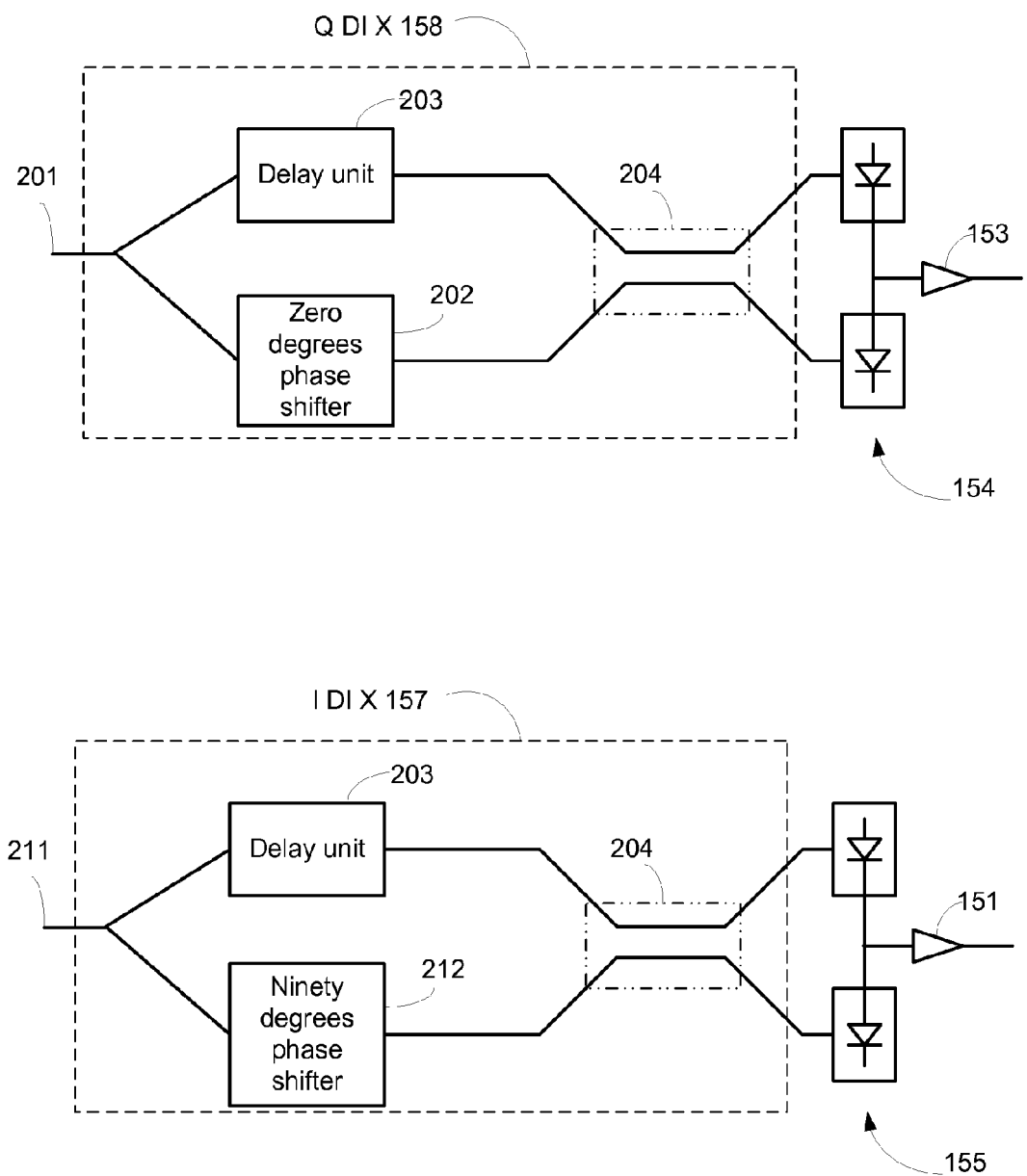
FIG. 1G illustrates a In-Phase and Quadrature delay interferometers, according to an embodiment of the invention.

Briefly, the ONU optical principle of operation is as follows: the DS signal reaches (10,11) the PBS in a random superposition of the x- and y-linear polarizations: the x polarization 12, 13 is directed to the x-pol. output port of the PBS (as illustrated in FIGS. 1B, 1C and 1D and), then starts circulating clock-wise around the loop (FIG. 1D), and is tapped by the SCFE at the right-hand-side corner (FIG. 1C), which detects the x-polarization component. The x-polarized light further circulates around the loop passes through the IQ modulator (FIG. 1D), being imparted US modulation, forming the light signal to be launched US (notice that the lightwave signal modulator output also contains a component consisting of the DS optical signal re-modulated by the US electrical IQ signal; it is going to be presently explained how interference between this extraneous signal and the desired US signal is avoided). Continuing to propagate clock-wise around the loop, the x-polarized signal is turning into a y-polarized lightwave signal upon traversing the 90° polarization rotator. This y-polarized, US modulated lightwave signal finally reaches the y-pol. port of the polarization beam-splitter, which now acts as a polarization combiner. The y-polarized lightwave signal (carrying US modulation) incident on the PBS y-pol. port is fully routed to the top port of the PBS, from which it propagates through the SOA and then back out, onto the access fiber in the US direction towards the OLT.

Similarly, following the y-polarization component of the DS light received at the top port of the PBS, this component is dropped at the y-port of the PBS (FIGS. 1B, 1C and 1E) from which it enters the 90° polarization rotator turning the y-polarized lightwave into an x-polarized signal. This x-polarized signal, starts circulating counter-clock-wise around the loop, gets tapped at the left corner of the loop into the self-coherent receiver front-end listening to the y-polarization (which was turned into x), then traverses the IQ modulator from left-to-right, then completes the loop (FIG. 1E) reaching the x-port of the PBS in the proper x-polarization, allowing it to be combined in the US direction with the signal which traversed the loop in the other sense. Notice that both self-coherent front-ends operate with a common, x-polarization, and so does the modulator, which is traversed in both directions by x-polarization, which is modulated by the IQ signal.

The IQ modulator is driven by the ONU OFDM US Tx, via a digital mixer (complex multiplier by $e^{j2\pi \cdot 1.5 \cdot W_{slot}T_c k}$, with $T_c$ the clock rate of the digital processor back-end, followed by a pair of DACs on the I and Q paths. The digital mixer, followed by the DACs, effects the complex multiplication by $e^{j2\pi \cdot 1.5 \cdot W_{slot}t}$ of the US modulated signal to be transmitted (a frequency shift of $1.5 \cdot W_{slot}$ is to be applied on a baseband information signal in the frequency support of $[0, W_{slot}]$, alternatively, a frequency shift of only of $W_{slot}$ is need we address a sideband signal in the spectral support of $[0, W_{slot}]$). In either ways, this corresponds to shifting the transmitted complex envelope spectrum to the right, producing an electrical signal with spectral support $[W_{slot}, 2W_{slot}]$, which is applied to the IQ modulator ports. The optical spectrum incident on the IQ modulator (essentially the DS received optical signal shown in FIG. 1C) is convolved in the frequency domain with the $[W_{slot}, 2W_{slot}]$ spectrum of the shifted information signal. This is equivalent to two successive steps: (i) convolving the optical spectrum incident on the IQ modulator with the $[0, W_{slot}]$ band-limited spectrum of the signal generated by the ONU US Tx, which is shown in FIG. 1C). This step (which would actually occur in case no digital modulation were applied at the US Tx output) results in the received DS pilot tone acquiring upper-sideband SSB modulation, in the spectral range $[v_p, v_p+W_{slot}]$, where $v_p$ is the pilot lightwave frequency. However, the D frequency slot spectrum is also affected by this step, being convolved with the one-sided spectrum of the US modulation (shown as a comb of equal height tones, becoming triangular, though the triangle is only for representational purposes). (ii): The effect of the digital modulation is to shift the composite spectrum resulting from step (i), and shifting it the right by $1.5 \cdot W_{slot}$, as shown in FIG. 1D).

As the result of the succession of these two transformations (SSB modulate and frequency right-shift), the pilot and its SSB US modulation end up in the U frequency slot which was received from the OLT void of modulation, precisely in order to accommodate the US imparted modulation. In addition, original D signal component is also convolved with the US electrical modulation as it traverses the IQ modulator (the triangle in FIG. 1E), however this is of no consequence, as this garbled signal falls onto the G and P frequency slots and does not overlap with either of our active PUD frequency slots which are to be kept clear.

Referring to the examples set fourth in FIGS. 1A-1E and 1G, the ONU 100(1) may include an interface such as SOA 190, at least one splitting circuit, a detection circuit, a modulator 170, an upstream information signals provider (such as 160, 161 and 162), and a transmitter.

The interface (such as a cable that is connected to SOA 190 or SOA 190 itself) may be arranged for receiving a pilot signal and downstream information signals 10 and 11. The pilot signal 10 is received at a pilot frequency slot and the downstream information signals 11 are received at a downstream information frequency slot. The ONU 100(1) is allocated with a spectral slice that comprises the pilot frequency slot, the downstream information frequency slot, a guard frequency slot and an upstream information frequency slot. At least one other spectral slice is allocated for exchanging information with at least one other group of ONUs.

The at least one splitting circuit (such as PBS 184, X power splitter 181 and Y power splitter 182) may be arranged to split the downstream information signals and the pilot signal to portions of downstream information signals and pilot signals.

The detection circuit (such as SECO receiver modules 173 and 174) may be arranged to detect downstream information, in response to at least a first portion of downstream information signals 11.

The modulator 170 may be arranged to modulate upstream information signals 50 and 51 by (i) second and fourth portions 16 and 18 of the pilot signal, and (ii) second and fourth portions 17 and 19 of the downstream information signals to provide:

c. X upstream information signals (first polarization upstream information signals) 57 and other upstream information signals 53 that are rotated by ROT 183 to provide Y upstream information signals (second polarization upstream information signals) 59; and d. X upstream secondary signals (first polarization upstream secondary signals) 56 and other upstream secondary signals 52 that are rotated by ROT 183 to provide Y upstream secondary signals (second polarization upstream secondary signals) 58.

The X and Y information signals 57 and 59 are combined by BPS 184 and amplified by SOA 190 to provide upstream information signals 72 that are within the upstream information frequency slot.

The X upstream secondary signals 56 and the Y upstream secondary signals 58 are combined by BPS 184 and amplified by SOA 190 to provide upstream secondary signals 71 that are outside the pilot frequency slot, the downstream information frequency slot and the upstream information frequency slot.

SOA 190 is arranged to upstream transmit the upstream information signals 71 and the upstream secondary signals 72.

SECO receiver module 173 may be arranged to perform the self-coherent detection by evaluating a relationship between first portion of downstream information signals 21 and a delayed version of the first portion of downstream information signals. SECO receiver module 173 may be arranged to detect an amplitude of the first portion of the downstream information signals 173.

PSB 184 may be arranged to split the downstream information signals 11 to first polarization components 13 and second polarization components 15. X power splitter 181 is arranged to perform a first power splitting of the first polarization components 15 to provide the first portion 21 and the second portion 17 of the downstream information signals. ROT 183 is arranged to perform a polarization rotation of the second polarization components 15 of the downstream information signals to provide rotated second polarization components of the downstream information signals. Y power splitter 182 is arranged to perform a second power splitting of the rotated second polarization components of the downstream information signals to provide a third portion 23 and a fourth portion 19 of the downstream information signals.

SECO receiver module 173 may provide the first portion 21 of the downstream information signals to a first polarization I delay interferometer 157 and to a first polarization Q delay interferometer 158. Photo-detectors 154 and 155 are arranged to photo-detect output signals 31 and 32 of the first polarization I delay interferometer 157 and the first polarization Q delay interferometer 158 to provide first polarization I photo-detection signals 33 and first polarization Q photo-detection signals 34. The first polarization I photo-detection signals and first polarization Q photo-detection signals are provided to a first set of amplifiers 151 and 153 to provide first polarization I delay-interferometer detected output signals 35 and first polarization Q delay-interferometer detected output signals 36.

Analog to digital converter (ADC) X 132 performs analog to digital converting the first polarization I delay-interferometer detected output signals and first polarization Q delay-interferometer detected output signals to provide first polarization digital I signals and first polarization digital Q signals (not shown).

SECO field reconstructor X 122 may perform self coherent field reconstruction of the first polarization digital I and Q signals to provide first polarization I and Q field reconstructed signal.

Y power splitter 182 may provide the third portion 23 of the downstream information signals to a second polarization I delay interferometer 137 and to a second polarization Q delay interferometer 148 of SECO receiver module 174.

Photo-detectors 144 and 145 are arranged to photo-detect output signals 41 and 42 of the second polarization I delay interferometer and the second polarization Q delay interferometer to provide second polarization I photo-detection signals and second polarization Q photo-detection signals 43 and 44. The second polarization I photo-detection signals 43 and second polarization Q photo-detection signals 44 are provided to a second set of amplifiers 141 and 143 to provide second polarization I delay-interferometer detected output signals 45 and second polarization Q delay-interferometer detected output signals 46.

ADC Y 130 is arranged to perform analog to digital converting the second polarization I delay-interferometer detected output signals and second polarization Q delay-interferometer detected output signals to provide second polarization digital I signal and second polarization digital Q signal. SECO field Reconstructor Y 120 can be arranged to perform self coherent field reconstruction of the second polarization digital I and Q signals to provide second polarization I and Q field reconstructed signal.

DS OFDM RX module 110 may be arranged to process the first polarization I and Q field reconstructed signals and the second polarization I and Q field reconstructed signals to provide downstream receiver output signals.

The ONU may be arranged to performing a polarization diversity maximal ratio combining of the first polarization I field reconstructed signals, the first polarization Q field reconstructed signals, the second polarization I field reconstructed signals and the second polarization Q field reconstructed signals.

PBS 184 may be arranged to split the pilot signal 10 to first polarization pilot components 12 and second polarization pilot components 14. The X power splitter 181 may be arranged to performing a first power splitting of the first polarization pilot components 12 to provide the first portion 20 and the second portion 16 of the pilot signal. ROT 183 may perform a polarization rotation of the second polarization pilot components 14 of the pilot signal to provide rotated second polarization pilot components. Y power splitter 182 may perform a second power splitting of the pilot rotated second polarization components of the pilot signal to provide a third portion 22 and a fourth portion 18 of the pilot signal.

Modulator 170 may be arranged to modulate upstream information signals 50 and 51 by the second portion 18 of the pilot signal, and the second portion 19 of the downstream information signals to provide (a) first upstream information signals that are within the upstream information frequency slot, and (b) first upstream secondary signals that are outside the pilot frequency slot, the downstream information frequency slot and the upstream information frequency slot;

perform a polarization rotation of the first upstream information signals and the first upstream secondary signals to provide second polarization upstream information signals and second polarization upstream secondary signals;

modulate the upstream information signals by the fourth portion of the pilot signal, and the fourth portion of the downstream information signals to provide (a) first polarization upstream information signals that are within the upstream information frequency slot, and (b) first polarization upstream secondary signals that are outside the pilot frequency slot, the downstream information frequency slot and the upstream information frequency slot; and add the second polarization upstream information signals, the second polarization upstream secondary signals, the first polarization upstream information signals and the first polarization upstream secondary signals to provide the upstream information signals and the downstream information modulated upstream information.

Polarization Diversity Maximal Ratio Combiner (MRC) in OLT Rx

Regarding the DS direction, polarization impairments compensation is performed followed by polarization demultiplexing to extract the 2 signals modulated onto the 2 degrees of freedom available by the two polarizations. In the OLT Rx, however this algorithm should be modified to account for the fact that unlike in the DS direction, in the US direction the two polarizations are imparted common modulation, as polarization multiplexing is not practiced in the upstream, but rather polarization diversity is used (the reason that polarization multiplexing is not possible in the upstream is that that the power splitting between the two polarizations is uncontrollable, hence one or the other polarization channels may be unpredictable fading—however in the polarization diversity strategy—proposed in the coherent detection schemes studied in the late 80-ies—one 'hedges the bet' applying the same modulation to both polarizations, and combining the two polarizations at the receiver, e.g. taking the sum of squares for ASK modulation. Here we use more advanced multi-level and multi-phase constellations, therefore a different combining strategy should be used, as detailed in this section.

The polarization handling stage in the OLT Rx should be terminated in a coherent combiner, aligning the common phases of the two polarizations (i.e. applying a transformation mapping the received arbitrary elliptical SOP into linear polarization, and then adding the two complex polarization components (which are now in-phase as the polarization has been rotated to linear). As the energies of the two received polarization signals at the OLT bear common modulation. Polarization diversity in the US signal is exploited at the OLT Rx by means of a MRC as described in this section. The US OLT Rx uses a PMD mitigation algorithm, along with a novel Maximal Ratio Combining (MRC) scheme. The US re-modulation undergoes polarization fading, being received as a general elliptical state-of-polarization. The MRC technique, akin to that practiced in 2×1 MISO wireless systems, coherently (in-phase) combines these two orthogonal polarization components, which are in random power ratio. MRC mitigates polarization fading and doubles the OSNR (supporting 32-QAM rather than 16-QAM in the US).

By virtue of its advanced DSP algorithms, our system is impervious to polarization birefringence and Polarization-Mode-Dispersion (PMD) in both the DS and US directions. Our system is also insensitive to polarization fading of the DS pilot pilot used for US remodulation.

Figure 9:
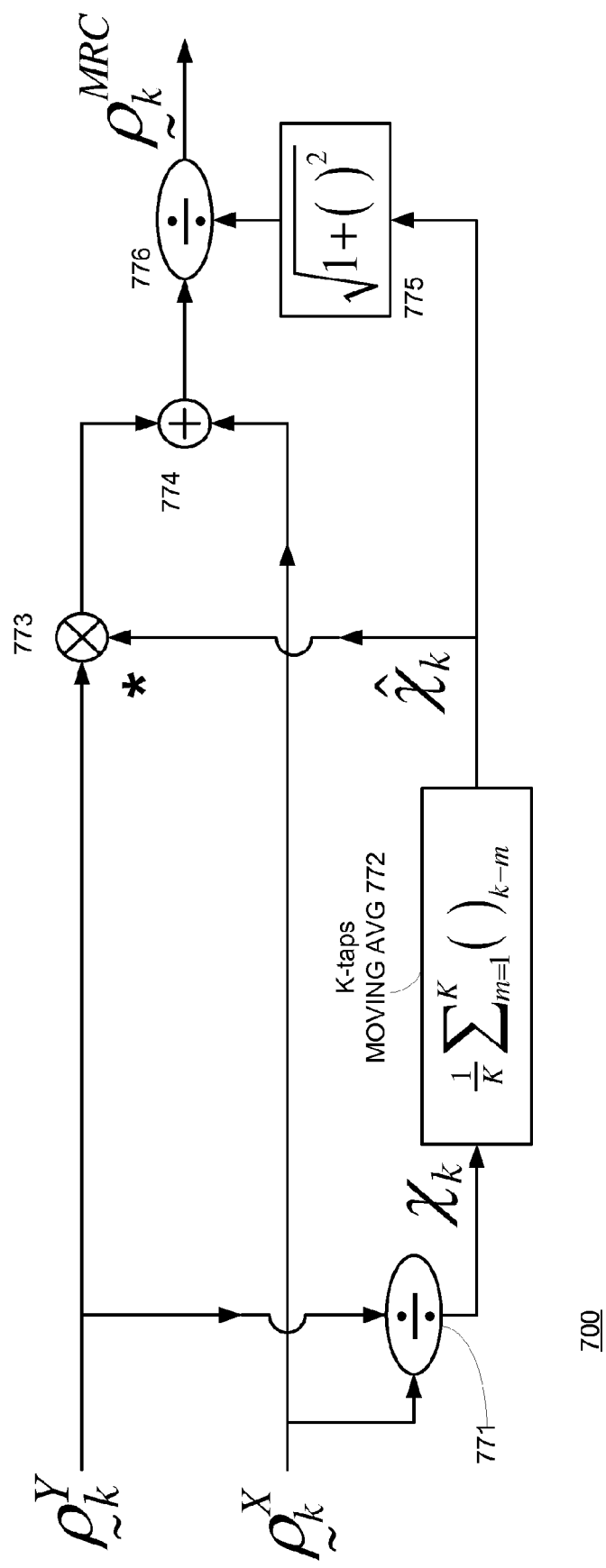
FIG. 9 illustrates a Polarization Diversity Maximal Ratio Combiner in the OLT according to an embodiment of the invention.

FIG. 9 illustrates a Polarization Diversity Maximal Ratio Combiner in the OLT according to an embodiment of the invention.

It is apparent that unlike the OLT Tx, the ONU Tx does not multiplex both polarizations with independent modulated data, but it applies one stream of modulated symbols to the x-polarization propagating through the IQ MOD, within which the energy is randomly partitioned between incident x and y polarizations—moreover, recalling the ONU photonic structure of FIGS. 1A-1E, the x and y polarizations are actually traversing the IQ MOD in opposite directions (and are subsequently combined by the PBS into a single US lightwave signal).

The reason we opted not to apply polarization multiplexing in the ITS, is that the pilot tone received DS and "reflected" and modulated in the US, undergoes random polarization fading by the time it reaches the DS ONU Rx, hence if we were to separate out its two polarization components, and modulate them separately with independent data, then one or the other of the two polarizations to be re-modulated, would potentially experience low SNR. This indicates the desirability of introducing our polarization diversity (rather than multiplexing) US remodulation scheme.

The US OLT Rx can be a fully coherent receiver (rather than a self-coherent receiver as used at the ONUs), using a front-end consisting of a coherent hybrid front end receiving both polarizations and separating each of them out into I and Q signals. The complex envelope of each polarization is then input into a linear equalizer (RGI FDE) and then the two equalized signals are input into the PMD$^{-1}$ module, the two outputs of which, representing the state-of-polarization in some de-rotated axes, are then input into the novel block called Polarization Diversity Maximal Ratio Combining (MRC). To understand the function of this block first consider the polarization properties of the US ONU Tx. As both polarizations are modulated by the same symbols in the IQ MOD in the ONU, then it is possibly to take advantage of the polarization diversity, and resolve those US polarizations with a polarization de-rotator stage at the Rx, combining them coherently (in phase and in the best power ratio to minimize noise) by means of the technique of Maximal Ratio Combining (MRC) in the digital domain to gain approximately 3 dB from the stage (MRC is a technique known in MIMO systems, or more precisely in detection of Single-Input Multiple Output (SIMO).

The MRC technique is next described.

Our US polarizations transmission amounts to a SIMO one, since a single data stream modulates both polarizations, i.e. the transmitted vector is $S_k[E_k^X, 0]^T$, where $S^k$ is the common modulation applied to both polarization components, the received vector is $$[\varrho_k^X, \varrho_k^Y]^T = s_k U_k [E_k^X, 0]^T + [n_k^X, n_k^Y]^T \text{ where } n_k^X, n_k^Y$$

are independent additive circularly symmetric noises, which is a 1×2 SIMO system and $U_k$ is the unitary transformation in the US optical channel. Notice that the terms in $$U_k [E_k^X, 0]^T$$

are slowly varying, changing with a time constant of very many samples, relative to the modulation $S_k$ which changes very rapidly. Let us denote, $$[E_k'^X, E_k'^Y]^T = U_k [E_k^X, 0]^T$$

(this may be an arbitrary state-of-polarization).

According to SIMO theory, the optimal filtering operation is given by a match-filter, taking the inner product of the received vector $[\rho_k^X, \rho_k^Y]^T$ against the underlying vector $$[E_k'^X, E_k'^Y]^T.$$

This vector may be estimated by module 700 of FIG. 9. The module calculates (by divider 771 the ratio of the two noisy components, $\chi_k = \rho_k^Y/\rho_k^X$. This ratio contains the full information (though corrupted by noise) of the state-of-polarization, and applies a moving average (box 772) to smooth out the noise in $\chi_k = \rho_k^Y/\rho_k^X$ yielding an estimate $\hat\chi_k$ which is to the state-of-polarization $$[E_k'^X, E_k'^Y]^T$$

as follows:

$$[1, \hat\chi_k]^T \propto [E_k'^X, E_k'^Y]^T.$$

This estimate is provided to a conjugate multiplier 773 having an output that is connected to an input of an adder 774. The other input of adder 774 receives the x-polarization noisy component—so that the conjugate multiplier 772 and the adder 774 implement the inner product:

$$[1, \hat\chi_k]^T \cdot [\rho_k^X, \rho_k^Y]^T = \rho_k^X + \hat\chi_k^* \rho_k^Y,$$

The output signal of adder 774 is used to normalize (by divider 776) the square root output of module 775 that outputs $\sqrt{1+(\hat\chi_k)^2}$. This output is divided by the norm of the $[1, \hat\chi_k]^T$.

At first sight it appears that since we use polarization diversity in the US rather than polarization multiplexing as in the DS, then we would incur a factor-of-two penalty in throughput. However, our projected throughput reduction due to this limitation is closer to 50%, since the Maximal Ratio Combining provides SNR gain of about 3 dB which may be invested in using a higher QAM constellation in the US rather than the down-stream, e.g. 32-QAM rather than 16-QAM.

Alternative ONU Structures Using Local Laser Source

A novel structure of a laserless ONU applying self coherent detection and reflective re-modulation is illustrated in FIG. 1 and described above There are presented two alternatives for the implementation of the ONU using a local laser source in the ONU, shown in FIG. 10.

In option a) the local laser is used in Rx and coherent, instead of self coherent, detection scheme is applied, by mixing the light from the local tunable laser source (Local Oscillator—LO) with the incoming signal at the Coherent Front Ends COHFE (hybrid). In option b) the tunable laser is used in the Rx as in a), and in addition to that it is also used by the Tx as the source of the optical carrier to modulate the information signal.

Figure 11:
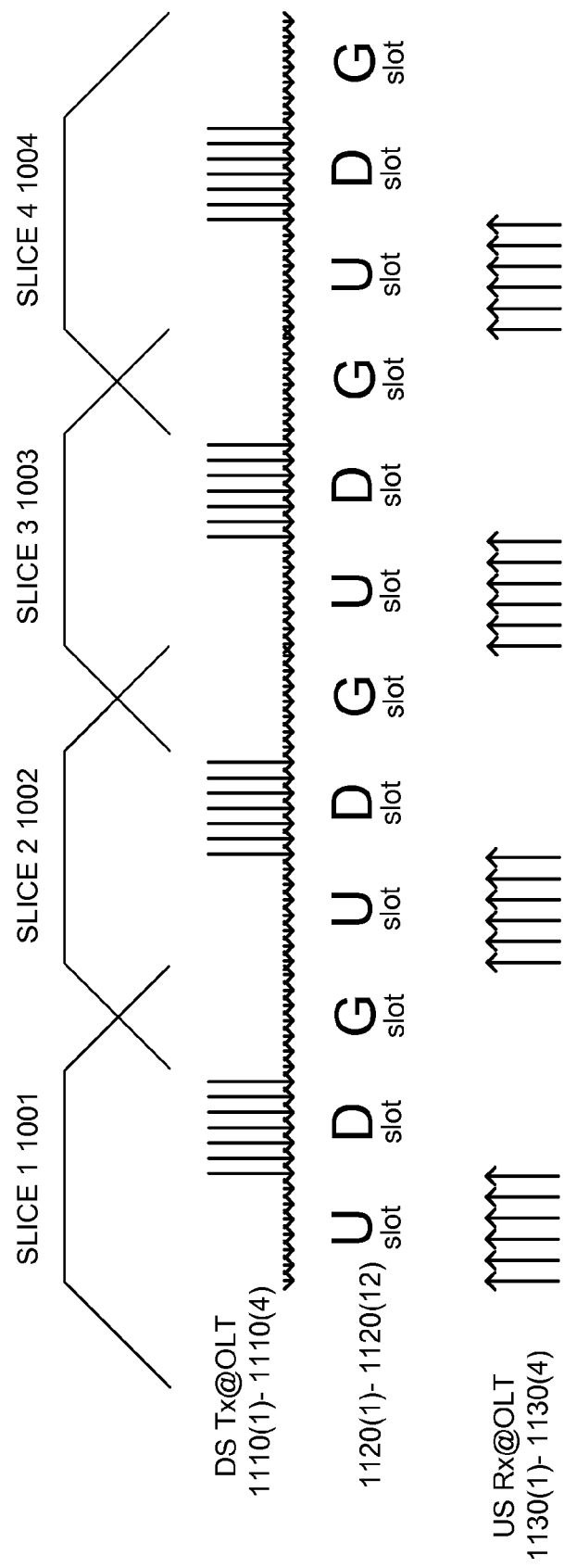

Applying option a) does not incur any modification to the transmitted signal, and both OLT and ONU transmit the same signal. In opposed to a), applying option b) the ONU no longer reflect DS signal upwards into the US direction thus backscattering of the DS signal is no longer an issue and frequency shifting is not needed to mitigate this hazard. In addition, transmission of the pilot tone in the DS direction is no longer needed, and the spectral structure may be modified, creating a spectral structure with only 3 frequency slots per slice: U, D and G as shown in FIG. 11 increasing spectral efficiency at a ratio of ~4/3.

Figure 10A:
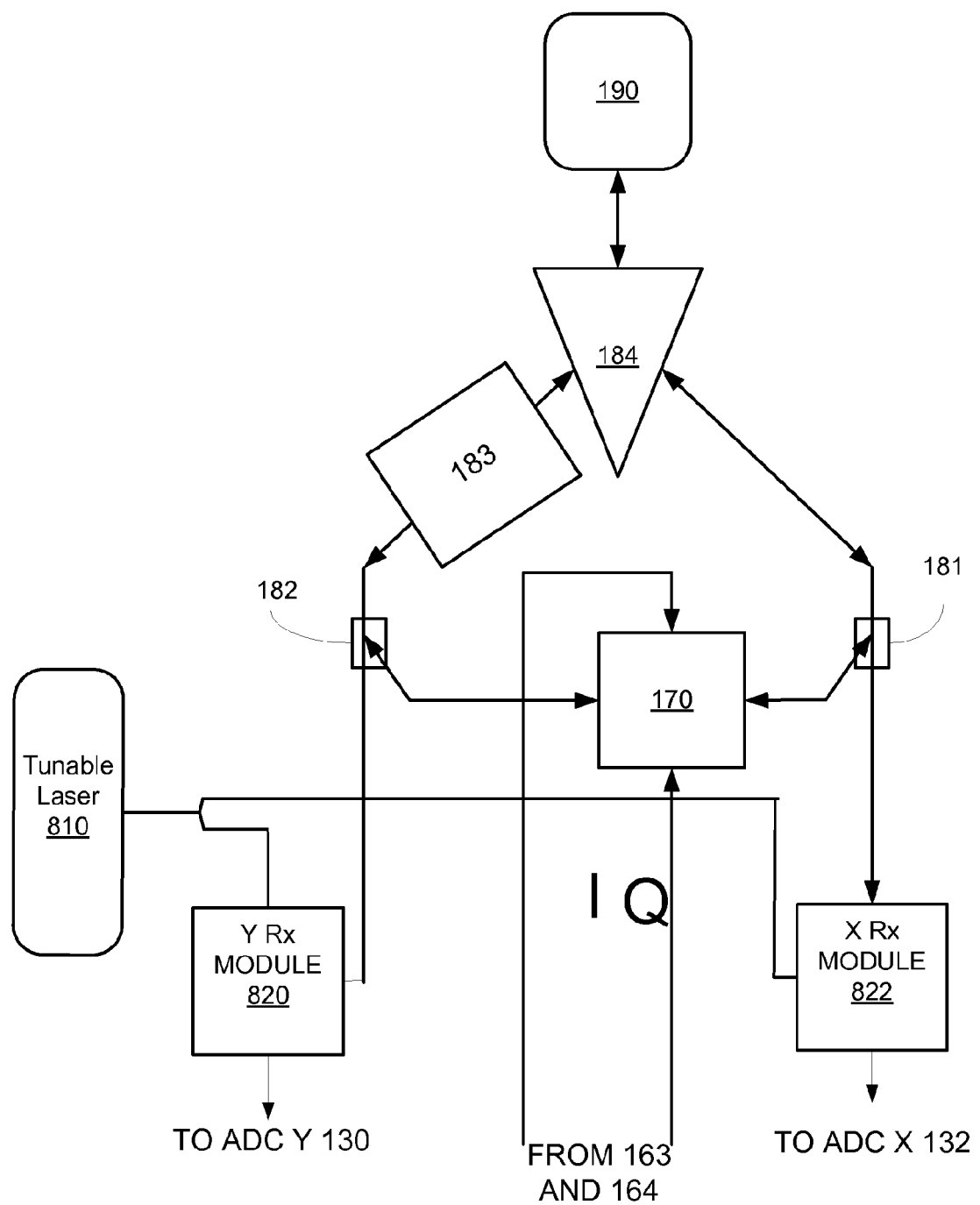
Figure 10B:
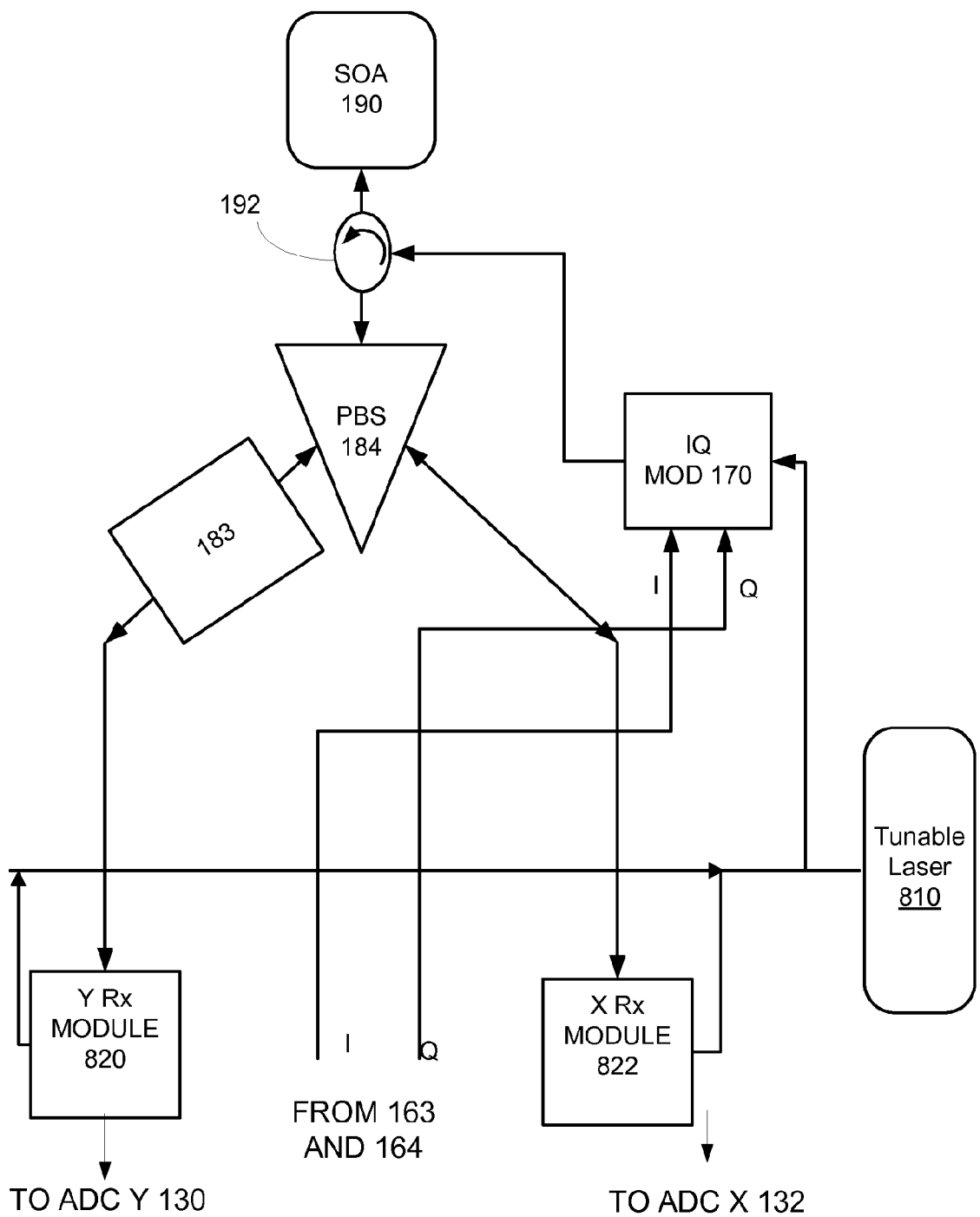

FIGS. 10A and 10B illustrates two alternative ONU structures 102 and 104, both incorporate a local tunable laser 810. FIG. 10A illustrates the tunable laser 810 as being used in Rx as a local oscillator (LO) to coherently demodulate DS signal. FIG. 10B illustrates the tunable laser 810 as being used in Rx as in a) and in addition also in Tx as a carrier modulating the information signal instead of reflective re-modulation.

In FIG. 10A the output of X power splitter 181 and the tunable laser are fed to an X RX module 822 that provides its output to ADC X 132. In addition the output of Y power splitter 182 and the tunable laser 810 are fed to a Y RX module 820 that provides its output to ADC Y 130.

In FIG. 10B the output of X power splitter 181 and the tunable laser are fed to an X RX module 822 that provides its output to ADC X 132. In addition the output of Y power splitter 182 and the tunable laser 810 are fed to a Y RX module 820 that provides its output to ADC Y 130. The tunable laser 810 also provides its output to IQ modulator 170.

Figure 10C:
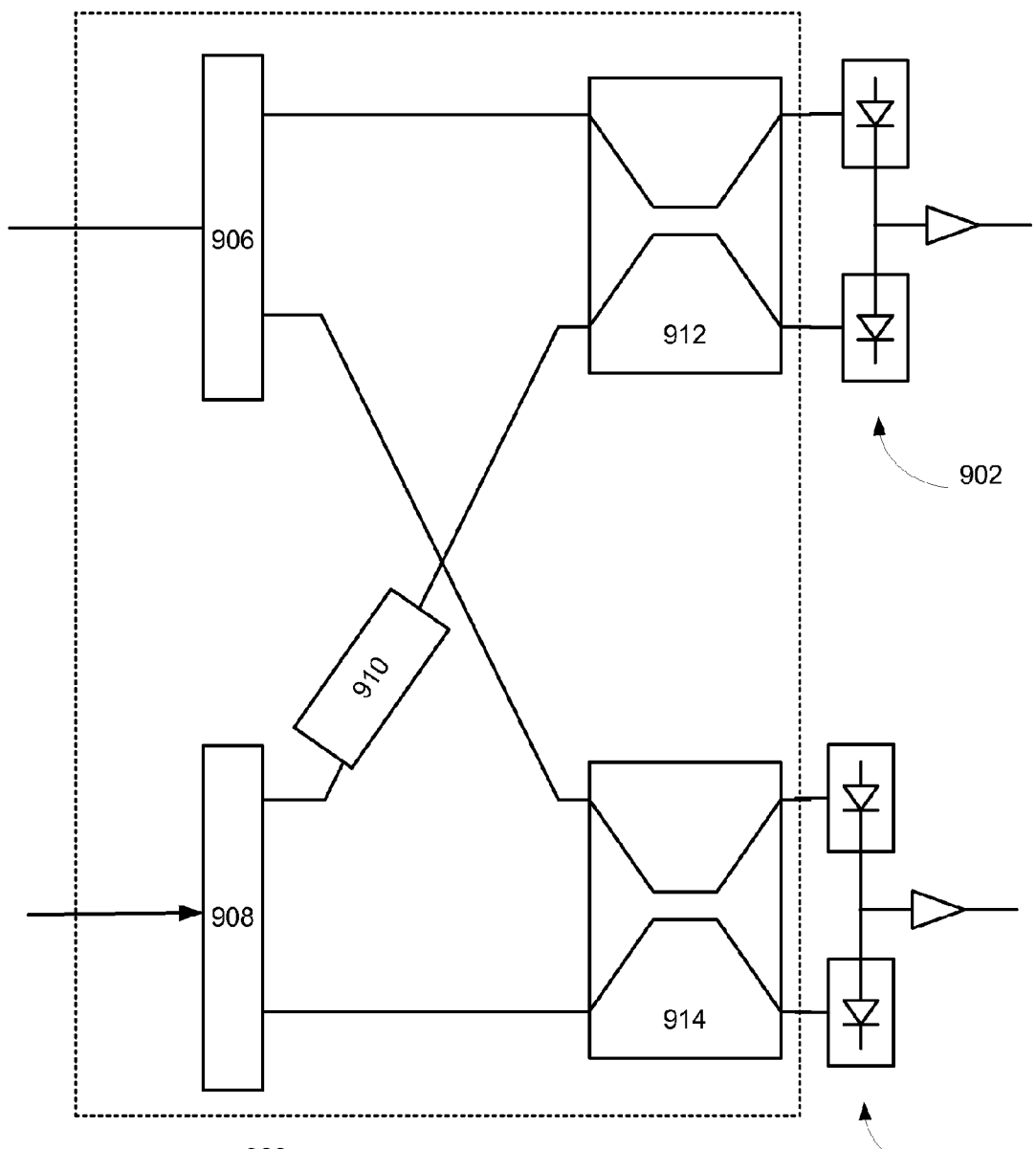
FIG. 10C illustrates X RX module according to an embodiment of the invention.

FIG. 10C illustrates X RX module 820. It is the same as Y RX module 822. X RX module 820 has: a first splitter 906, a second splitter 908, a ninety degrees phase shifter 910, a first coupler 912 and a second coupler 914.

The first splitter 906 receives a first portion of the downstream signal, splits it and provides two outputs signals to a first input of the first coupler 912 and a first input of the second coupler 914.

A second splitter 906 that receives the tunable laser signal, splits it and provides a first portion of the tunable laser signal to the ninety degrees phase shifter 910 and a second portion of the tunable laser signal to a second input of the second coupler 914. The ninety degrees phase shifter 910 performs a ninety degrees phase shift to provide a phase shifted signal that is provided to a second input of the first coupler 912. Each coupler has two outputs that are provided to a sequence of two diodes and amplifier 902 and 904.

FIG. 11 illustrates a modified spectral structure of the ONU 104 of FIG. 10B. There is no pilot signal and thus there is no need in a pilot frequency slot. Thus, four slices 1001-1004 are shown, each includes three frequency slots U frequency slot, D frequency slot and G frequency slot (the frequency slots of the four slices are denoted 1120(1)-1120(12)), upstream information signals 1130(1)-1130(4) are transmitted over the U frequency slots and downstream information signals 1120(1)-1120(4) are transmitted over the D frequency slots.

Alternative Spectral Design: Transmitting DS and US Signals on Separate Wavelengths This section describes an alternative to the signal structure described above separating the DS signals of the entire PON from the US signals of the entire PON, allocating them on different wavelengths.

The complete signal spectrum shall be divided into two parts one containing the DS WDM channels and the other containing the US channels. In each of the DS channels, each OFDM signal, filling the bandwidth of a single WDM channel will contain two types of frequency slots: D frequency slots for downstream information (1210) and G frequency slot—guard tones in which no signal is transmitted, corresponding with the FWDM filter bank transient frequency bands.

Figure 12:
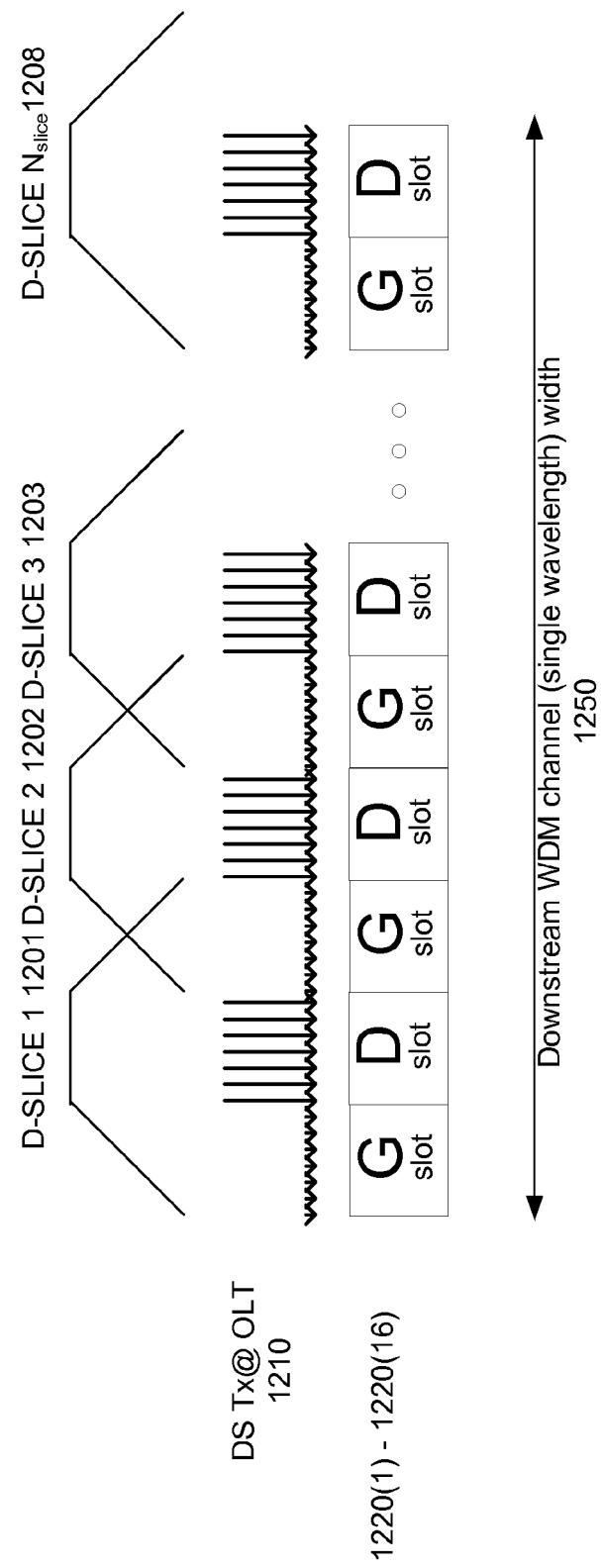

FIG. 12 illustrates Nslice frequency slices 1201-1208 each targeted at a different multicast group of ONUs containing its DS information and sixteen frequency slots 1220(1)-1220(16). Number other than eight and sixteen can represent the number of slices and frequency slots respectively.

The US signals coming from the ONUs associated with these multicast groups are transmitted over a separate wavelengths and no US signal is transmitted by the ONUs in this WDM channel, preventing backscattering interference.

In the upstream direction, each of the WDM channels devoted to US transmission shall be split to slices similarly as in the DS channels in FIG. 12. The OLT shall transmit an OFDM signal in the DS direction containing a sparse signal with a single pilot tone per slice, as illustrated in FIG. 13.

Figure 13:
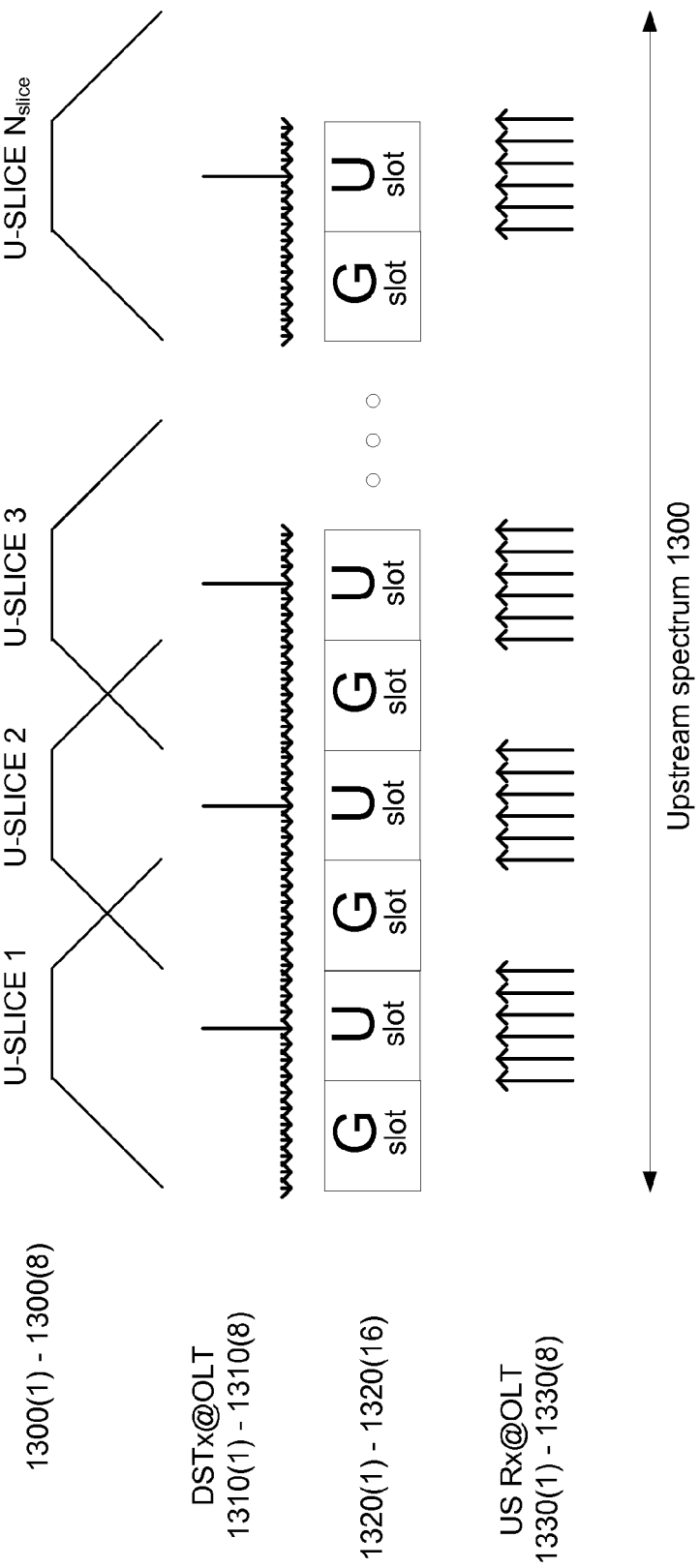

FIG. 13 illustrates a spectral content of a US WDM cannel: a sparse OFDM signal containing only pilot tones is transmitted DS (over a U frequency slot) to allow reflective re-modulation by the ONUs. ONUs are transmitting the re-modulated signal in the same frequency slot where the pilot arrived, no frequency shift is needed. FIG. 13 illustrates Nslice frequency slices 1300(1)-1300(8), multiple pilot signals 1310(1)-1310(8), sixteen and U frequency slots 1320(1)-1320(16), and eight upstream information signals 1330(1)-133(8) transmitted over the U frequency slots 1320(2), 1320(4), 1320(6), 1320(8), 1320(10), 1320(12), 1320(14) and, 1320(16).

The signal arriving to each ONU contains a pilot carrier in one WDM channel and the DS information inside the OFDM signal inside a separate WDM channel (different wavelength) The ONU, receiving this signal shall apply optical filtering at the ONU input to split the DS signal and the pilot carrier, routing the DS OFDM information signal into the ONU Rx operating similarly to the Rx described in section in a similar way and the pilot carrier into a reflective modulator modulating the US information with the pilot tone in a similar way as described above.

Figure 14:
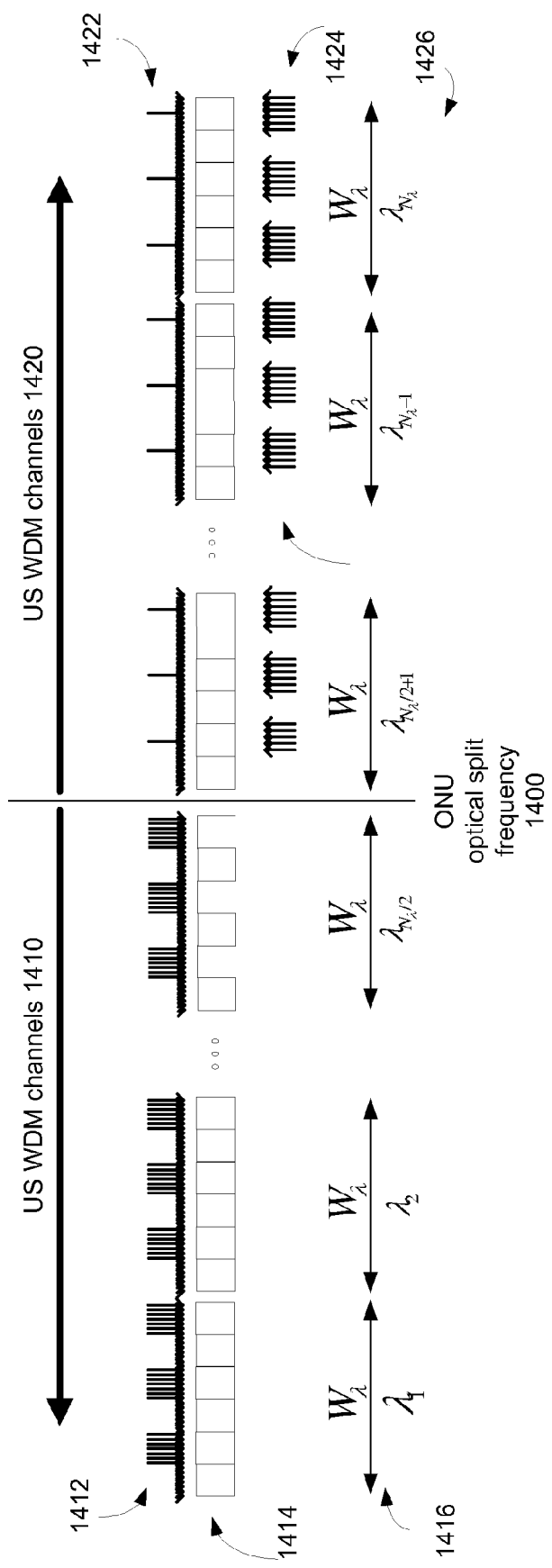

Designing such a system entails a degree of freedom of assigning each wavelengths to either DS or US transmission. One example of DS/US assignment is to assign all lower wavelengths channels to DS and the upper wavelength channels to US (or vice-versa). One advantage of such an assignment policy is that ONUs may be easily implemented colorless by setting its optical splitter frequency 1400 to the middle frequency between the DS channels 1410 and the US channels 1420, regardless of the wavelength channel this particular ONU is connected to—as illustrated in FIG. 14.

Figure 15:
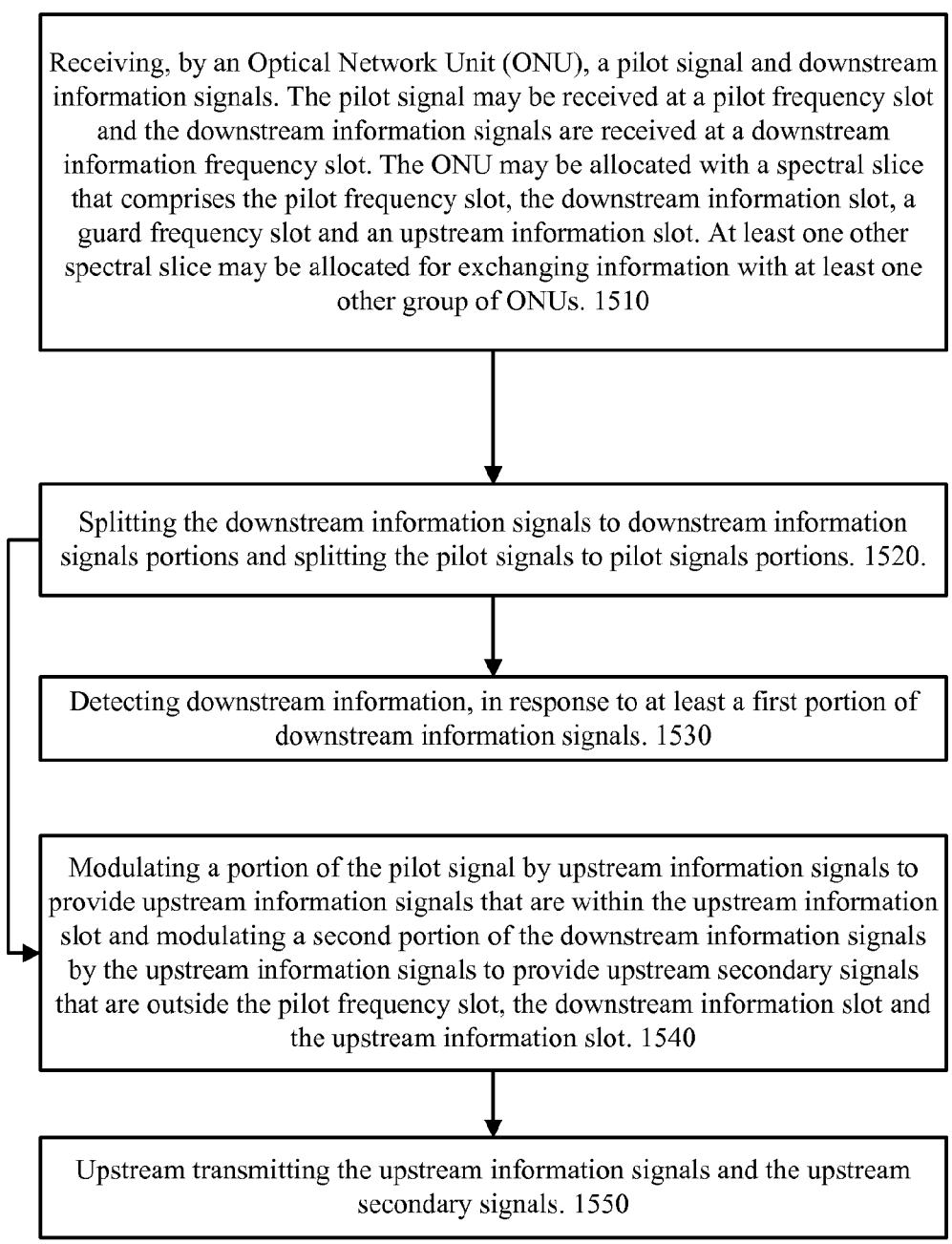
FIGS. 15 and 16 illustrate methods according to various embodiments of the invention.

FIG. 15 illustrates method 1500 according to an embodiment of the invention.

Method 1500 includes various stages such as 1510-1550.

Stage 1510 includes receiving, by an Optical Network Unit (ONU), a pilot signal and downstream information signals. The pilot signal may be received at a pilot frequency slot and the downstream information signals are received at a downstream information frequency slot. The ONU may be allocated with a spectral slice that comprises the pilot frequency slot, the downstream information frequency slot, a guard frequency slot and an upstream information frequency slot. At least one other spectral slice may be allocated for exchanging information with at least one other group of ONUs.

Stage 1520 includes splitting the downstream information signals to downstream information signals portions and splitting the pilot signals to pilot signals portions. Referring to the example set fourth in FIG. 1B the splitting can be executed by PBS 183, X power splitter 181, Y power splitter 182. It is noted that each receiver module 173 and 174 performs an additional splitting—as indicated by arrows 171 and 172).

Stage 1530 includes detecting downstream information, in response to at least a first portion of downstream information signals.

Stage 1540 includes modulating a portion of the pilot signal by upstream information signals to provide upstream information signals that are within the upstream information frequency slot and modulating a second portion of the downstream information signals by the upstream information signals to provide upstream secondary signals that are outside the pilot frequency slot, the downstream information frequency slot and the upstream information frequency slot.

Stage 1550 includes upstream transmitting the upstream information signals and the upstream secondary signals.

The ONU may belong to a group of ONUs that are allocated with the spectral slice; and wherein at least one other spectral slice is allocated for at least one other group of ONUs.

Stage 1550 can include upstream transmitting the first upstream signals, by the ONU, over a frequency sub-band of the upstream information frequency slot that differ from other frequency sub-bands of the upstream information frequency slots used by other ONUs that belong to the group of ONUs.

The frequency sub-bands subsets of tones used by the ONUs of the group of ONU form an Orthogonal Frequency Division Multiplexing (OFDM) comb.

A first portion of the upstream secondary signals may be within the guard frequency slot and wherein a second portion of the upstream secondary signals is outside the spectral slice.

The upstream information signals may be within an intermediate frequency range that is frequency shifted from zero frequency.

The intermediate frequency range may be frequency shifted from zero frequency by a frequency shift that is equal to a bandwidth of at least one of the pilot frequency slot, the downstream information frequency slot, the guard frequency slot and the upstream information frequency slot.

The pilot frequency slot, the downstream information frequency slot, a guard frequency slot and an upstream information frequency slot may differ from each other and are adjacent to each other.

Stage 1550 can include upstream transmitting the upstream information signals and the upstream secondary signals to components of the OAN that are arranged to filter out the upstream secondary signals.

Stage 1530 can include detecting the downstream information by self-coherent detection.

The self-coherent detection may include evaluating a relationship between first portion of downstream information signals and a delayed version of the first portion of downstream information signals.

Stage 1530 can include further detecting an amplitude of the first portion of the downstream information signals.

Stage 1530 can include receiving a laser signal and utilizing the laser signal to detect the downstream information in a coherent manner.

The splitting of the downstream information signals and the pilot signal comprises performing polarization based splitting and power splitting.

Stage 1520 can include splitting the downstream information signals to first polarization components and second polarization components; performing a first power splitting of the first polarization components to provide the first portion and the second portion of the downstream information signals; performing a polarization rotation of the second polarization components of the downstream information signals to provide rotated second polarization components of the downstream information signals; and performing a second power splitting of the rotated second polarization components of the downstream information signals to provide a third portion and a fourth portion of the downstream information signals.

Stage 1530 can include providing the first portion of the downstream information signals to a first polarization I delay interferometer and to a first polarization Q delay interferometer;
photo-detecting output signals of the first polarization I delay interferometer and the first polarization Q delay interferometer to provide first polarization I photo-detection signals and first polarization Q photo-detection signals; providing the first polarization I photo-detection signals and first polarization Q photo-detection signals to a first set of amplifiers to provide first polarization I delay-interferometer detected output signals and first polarization Q delay-interferometer detected output signals;
analog to digital converting the first polarization I delay-interferometer detected output signals and first polarization Q delay-interferometer detected output signals to provide first polarization digital I signals and first polarization digital Q signals; performing self coherent field reconstruction of the first polarization digital I and Q signals to provide first polarization I and Q field reconstructed signal; and
processing at least the first polarization I and Q field reconstructed signal to provide downstream receiver output signal.

Stage 1530 can include: providing the third portion of the downstream information signals to a second polarization I delay interferometer and to a second polarization Q delay interferometer; photo-detecting output signals of the second polarization I delay interferometer and the second polarization Q delay interferometer to provide second polarization I photo-detection signals and second polarization Q photo-detection signals; providing the second polarization I photo-detection signals and second polarization Q photo-detection signals to a second set of amplifiers to provide second polarization I delay-interferometer detected output signals and second polarization Q delay-interferometer detected output signals; analog to digital converting the second polarization I delay-interferometer detected output signals and second polarization Q delay-interferometer detected output signals to provide second polarization digital I signal and second polarization digital Q signal;
performing self coherent field reconstruction of the second polarization digital I and Q signals to provide second polarization I and Q field reconstructed signal; and processing the first polarization I and Q field reconstructed signals, the second polarization I and Q field reconstructed signals to provide downstream receiver output signals.

Stage 1530 can include performing a polarization diversity maximal ratio combining of the first polarization I field reconstructed signals, the first polarization Q field reconstructed signals, the second polarization I field reconstructed signals and the second polarization Q field reconstructed signals.

Stage 1530 can include further detecting an amplitude of the first portion of the downstream information signals.

Stage 1520 can include: splitting the pilot signal to first polarization pilot components and second polarization pilot components; performing a first power splitting of the first polarization pilot components to provide the first portion and the second portion of the pilot signal;
performing a polarization rotation of the second polarization pilot components of the pilot signal to provide rotated second polarization pilot components; and performing a second power splitting of the pilot rotated second polarization components of the pilot signal to provide a third portion and a fourth portion of the pilot signal.

The first and second polarizations may be orthogonal to each other but can be non-orthogonal to each other.

Stage 1540 can include modulating upstream information signals by the second portion of the pilot signal, and the second portion of the downstream information signals to provide (a) first upstream information signals that are within the upstream information frequency slot, and (b) first upstream secondary signals that are outside the pilot frequency slot, the downstream information frequency slot and the upstream information frequency slot; and performing a polarization rotation of the first upstream information signals and the first upstream secondary signals to provide second polarization upstream information signals and second polarization upstream secondary signals; modulating the upstream information signals by the fourth portion of the pilot signal, and the fourth portion of the downstream information signals to provide (a) first polarization upstream information signals that are within the upstream information frequency slot, and (b) first polarization upstream secondary signals that are outside the pilot frequency slot, the downstream information frequency slot and the upstream information frequency slot; and
adding the second polarization upstream information signals, the second polarization upstream secondary signals, the first polarization upstream information signals and the first polarization upstream secondary signals to provide the upstream information signals and the downstream information modulated upstream information.

Stage 1550 can be followed by a stage (not shown) of receiving, by an Optical Line Terminal (OLT) that is coupled to the ONU, the upstream information signals; filtering out, by the OLT, the first polarization upstream secondary signals and the second polarization upstream secondary signals; aligning, by the OLT, common phases of the second polarization upstream information signals and the first polarization upstream information signals; and performing a coherent combination of the second polarization upstream information signals and the first polarization upstream information signals.

Stage 1530 can include providing the first portion of the downstream information signals to a first direct detection circuit to provide first direct detection signals; providing the third portion of the downstream information signals to a first direct detection circuit to provide second direct detection signals.

Stage 1530 can include further sending the first and second direct detection signals to a receiver circuit that comprises an analog to digital converter and a field reconstruction circuit.

The first detection circuit may exhibit a spectrum that comprises the pilot frequency slot, the downstream information frequency slot and the upstream information frequency slot.

The stages of receiving 1510, splitting 1520, modulating 1540 and upstream transmitting 1550 can be executed by a laserless ONU.

The stages of receiving, splitting, modulating and upstream transmitting can be executed without frequency filtering.

The pilot frequency slot, the downstream information frequency slot, the guard frequency slot and the upstream information frequency slot may have a same bandwidth.

The pilot frequency slot, the downstream information frequency slot, the guard frequency slot and the upstream information frequency slot may differ from each other by bandwidth.

Stage 1550 can be followed by a stage (not shown) of receiving by a hub of the OAN the upstream information signals and the upstream secondary signals; and filtering out by the hub at least a portion of the upstream secondary signals.

The pilot frequency slot may precede the upstream information frequency slot, the upstream information frequency slot may precede the downstream information frequency slot and the downstream information frequency slot may precede the guard frequency slot.

The ONU may belong to a group of ONUs that are allocated with the spectral slice; and wherein at least one other spectral slice may be allocated for at least one other group of ONUs.

Figure 16:
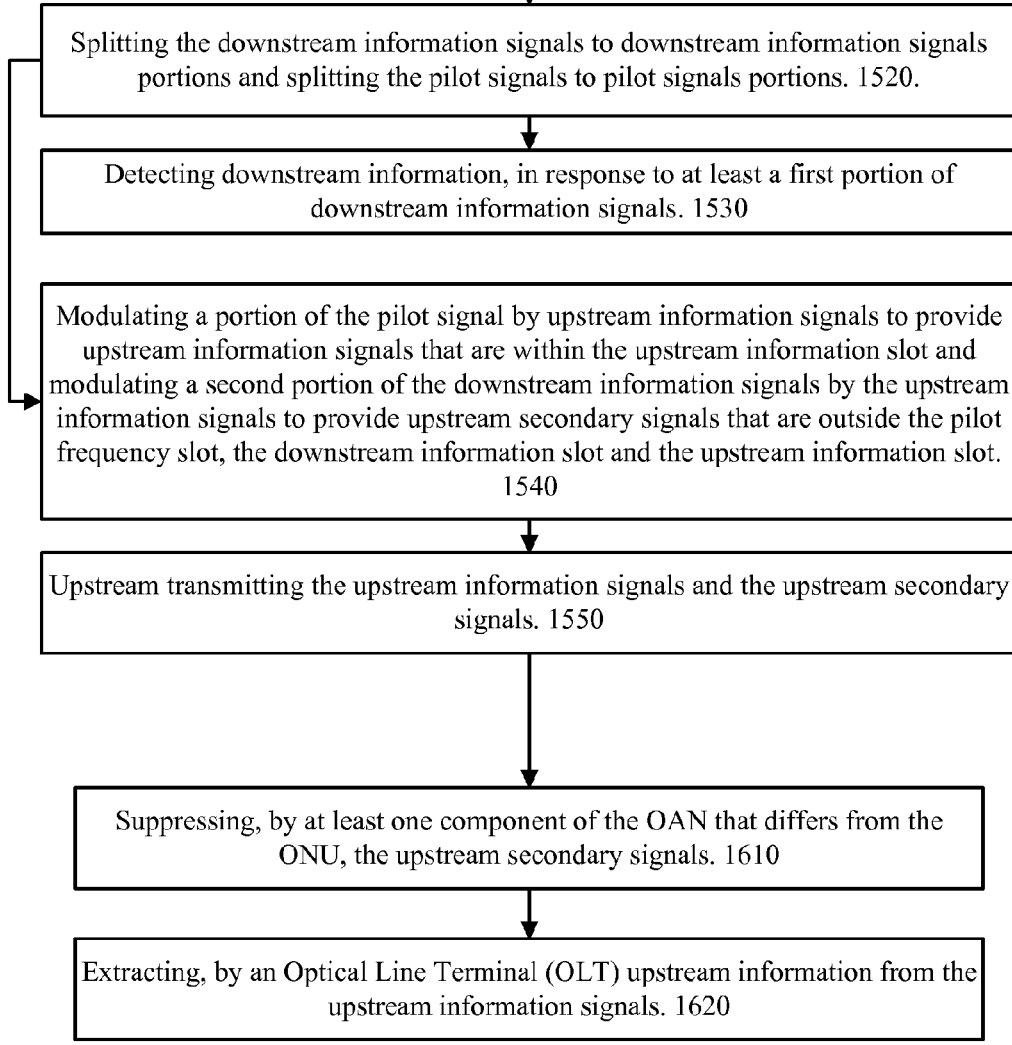

FIG. 16 illustrates method 1600 according to an embodiment of the invention. Method 1600 differs from method 1500 by stages 1610 and 1620 that follow stage 1550. It is noted that either one of these stage (or a combination thereof) can be included in method 1500.

Stage 1610 includes suppressing, by at least one component of the OAN that differs from the ONU, the upstream secondary signals. This stage may include receiving by a hub of the OAN the upstream information signals and the upstream secondary signals; and filtering out by the hub at least a portion of the upstream secondary signals. Additionally or alternatively, the suppressing can be executed by the OLT, by a remote node and the like.

Stage 1620 includes extracting, by an Optical Line Terminal (OLT) upstream information from the upstream information signals.

Stage 1620 can include: (a) receiving, by an Optical Line Terminal (OLT) that is coupled to the ONU, the upstream information signals, (b) filtering out, by the OLT, the first polarization upstream secondary signals and the second polarization upstream secondary signals, (c) aligning, by the OLT, common phases of the second polarization upstream information signals and the first polarization upstream information signals; and (d) performing a coherent combination of the second polarization upstream information signals and the first polarization upstream information signals.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An Optical Network Unit (ONU), comprising:
An interface for receiving a pilot signal and downstream information signals;
Wherein the pilot signal is received at a pilot frequency slot and the downstream information signals are received at a downstream information frequency slot;
Wherein the ONU is allocated with a spectral slice that comprises the pilot frequency slot, the downstream information frequency slot, a guard frequency slot and an upstream information frequency slot;
Wherein at least one other spectral slice is allocated for exchanging information with at least one other group of ONUs;
At least one splitting circuit for splitting the downstream information signals and the pilot signal to portions of downstream information signals and pilot signals;
A detection circuit for detecting downstream information, in response to at least a first portion of downstream information signals;
a modulator for modulating upstream information signals by (i) a portion of the pilot signal, and (ii) a second portion of the downstream information signals to provide (a) upstream information signals that are within the upstream information frequency slot, and (b) upstream secondary signals that are outside the pilot frequency slot, the downstream information frequency slot and the upstream information frequency slot; and
a transmitter circuit for upstream transmitting the upstream information signals and the upstream secondary signals.

2. The ONU according to claim 1, wherein the ONU belongs to a group of ONUs that are allocated with the spectral slice; and wherein at least one other spectral slice is allocated for at least one other group of ONUs.

3. The ONU according to claim 2, wherein the ONU is arranged to upstream transmit the first upstream signals, by the ONU, over a frequency sub-band of the upstream information frequency slot that differ from other frequency sub-bands of the upstream information frequency slots used by other ONUs that belong to the group of ONUs.

4. The ONU according to claim 3, wherein the frequency sub-bands subsets of tones used by the ONUs of the group of ONU form an Orthogonal Frequency Division Multiplexing (OFDM) comb.

5. The ONU according to claim 1, wherein a first portion of the upstream secondary signals is within the guard frequency slot and wherein a second portion of the upstream secondary signals is outside the spectral slice.

6. The ONU according to claim 1, wherein the upstream information signals are within an intermediate frequency range that is frequency shifted from zero frequency.

7. The ONU according to claim 6, wherein the intermediate frequency range is frequency shifted from zero frequency by a frequency shift that is equal to a bandwidth of at least one of the pilot frequency slot, the downstream information frequency slot, the guard frequency slot and the upstream information frequency slot.

8. The ONU according to claim 1, wherein the pilot frequency slot, the downstream information frequency slot, a guard frequency slot and an upstream information frequency slot differ from each other and are adjacent to each other.

9. The ONU according to claim 1, wherein the ONU is arranged to upstream transmit the upstream information signals and the upstream secondary signals to components of the OAN that are arranged to filter out the upstream secondary signals.

10. The ONU according to claim 1, wherein the ONU is arranged to detect the downstream information by self-coherent detection.

11. The ONU according to claim 10, wherein ONU is arranged to perform the self-coherent detection by evaluating a relationship between first portion of downstream information signals and a delayed version of the first portion of downstream information signals.

12. The ONU according to claim 11 wherein the ONU is arranged to detect an amplitude of the first portion of the downstream information signals.

13. The ONU according to claim 1, wherein the ONU is arranged to receive a laser signal and utilizing the laser signal to detect the downstream information in a coherent manner.

14. The ONU according to claim 1, wherein t the ONU is arranged to perform the splitting of the downstream information signals and the pilot signal by performing polarization based splitting and power splitting.

15. The ONU according to claim 14, wherein the ONU is arranged to:
split the downstream information signals to first polarization components and second polarization components;
perform a first power splitting of the first polarization components to provide the first portion and the second portion of the downstream information signals;
perform a polarization rotation of the second polarization components of the downstream information signals to provide rotated second polarization components of the downstream information signals; and
perform a second power splitting of the rotated second polarization components of the downstream information signals to provide a third portion and a fourth portion of the downstream information signals.

16. The ONU according to claim 15 wherein the ONU is arranged to:
provide the first portion of the downstream information signals to a first polarization I delay interferometer and to a first polarization Q delay interferometer;
photo-detect output signals of the first polarization I delay interferometer and the first polarization Q delay interferometer to provide first polarization I photo-detection signals and first polarization Q photo-detection signals;
provide the first polarization I photo-detection signals and first polarization Q photo-detection signals to a first set of amplifiers to provide first polarization I delay-interferometer detected output signals and first polarization Q delay-interferometer detected output signals;
analog to digital converting the first polarization I delay-interferometer detected output signals and first polarization Q delay-interferometer detected output signals to provide first polarization digital I signals and first polarization digital Q signals;
performing self-coherent field reconstruction of the first polarization digital I and Q signals to provide first polarization I and Q field reconstructed signal; and
processing at least the first polarization I and Q field reconstructed signal to provide downstream receiver output signal.

17. The ONU according to claim 16, wherein the ONU is arranged to:
provide the third portion of the downstream information signals to a second polarization I delay interferometer and to a second polarization Q delay interferometer;
photo-detect output signals of the second polarization I delay interferometer and the second polarization Q delay interferometer to provide second polarization I photo-detection signals and second polarization Q photo-detection signals;
provide the second polarization I photo-detection signals and second polarization Q photo-detection signals to a second set of amplifiers to provide second polarization I delay-interferometer detected output signals and second polarization Q delay-interferometer detected output signals;
analog to digital converting the second polarization I delay-interferometer detected output signals and second polarization Q delay-interferometer detected output signals to provide second polarization digital I signal and second polarization digital Q signal;
performing self-coherent field reconstruction of the second polarization digital I and Q signals to provide second polarization I and Q field reconstructed signal; and
processing the first polarization I and Q field reconstructed signals, the second polarization I and Q field reconstructed signals to provide downstream receiver output signals.

18. The ONU according to claim 16, wherein the ONU is arranged to performing a polarization diversity maximal ratio combining of the first polarization I field reconstructed signals, the first polarization Q field reconstructed signals, the second polarization I field reconstructed signals and the second polarization Q field reconstructed signals.

19. The ONU according to claim 16 wherein the ONU is arranged to detect an amplitude of the first portion of the downstream information signals.

20. The ONU according to claim 15, wherein the ONU is arranged to:
splitting the pilot signal to first polarization pilot components and second polarization pilot components;
performing a first power splitting of the first polarization pilot components to provide the first portion and the second portion of the pilot signal;
performing a polarization rotation of the second polarization pilot components of the pilot signal to provide rotated second polarization pilot components; and
performing a second power splitting of the pilot rotated second polarization components of the pilot signal to provide a third portion and a fourth portion of the pilot signal.

21. The ONU according to claim 20, wherein the ONU is arranged to:
modulate upstream information signals by the second portion of the pilot signal, and the second portion of the downstream information signals to provide (a) first upstream information signals that are within the upstream information frequency slot, and (b) first upstream secondary signals that are outside the pilot frequency slot, the downstream information frequency slot and the upstream information frequency slot;
perform a polarization rotation of the first upstream information signals and the first upstream secondary signals to provide second polarization upstream information signals and second polarization upstream secondary signals;
modulate the upstream information signals by the fourth portion of the pilot signal, and the fourth portion of the downstream information signals to provide (a) first polarization upstream information signals that are within the upstream information frequency slot, and (b) first polarization upstream secondary signals that are outside the pilot frequency slot, the downstream information frequency slot and the upstream information frequency slot; and add the second polarization upstream information signals, the second polarization upstream secondary signals, the first polarization upstream information signals and the first polarization upstream secondary signals to provide the upstream information signals and the downstream information modulated upstream information.

22. The ONU according to claim 16 wherein the first and second polarizations are orthogonal to each other.

23. The ONU according to claim 15 wherein the ONU is arranged to:

provide the first portion of the downstream information signals to a first direct detection circuit to provide first direct detection signals;

provide the third portion of the downstream information signals to a first direct detection circuit to provide second direct detection signals.

24. The ONU according to claim 23 wherein the ONU is arranged to sending the first and second direct detection signals to a receiver circuit that comprises an analog to digital converter and a field reconstruction circuit.

25. The ONU according to claim 23 wherein the first detection circuit exhibits a spectrum that comprises the pilot frequency slot, the downstream information frequency slot and the upstream information frequency slot.

26. The ONU according to claim 1, wherein the ONU is a laserless ONU.

27. The ONU according to claim 1, wherein the ONU is arranged to receive, split, modulate and upstream transmit without frequency filtering.

28. The ONU according to claim 1, wherein the pilot frequency slot, the downstream information frequency slot, the guard frequency slot and the upstream information frequency slot have a same bandwidth.

29. The ONU according to claim 1, wherein the pilot frequency slot, the downstream information frequency slot, the guard frequency slot and the upstream information frequency slot differ from each other by bandwidth.

30. The ONU according to claim 1, wherein the ONU is arranged to receive by a hub of the OAN the upstream information signals and the upstream secondary signals; and filtering out by the hub at least a portion of the upstream secondary signals.

31. The ONU according to claim 1, wherein the pilot frequency slot precedes the upstream information frequency slot, the upstream information frequency slot precedes the downstream information frequency slot and the downstream information frequency slot precedes the guard frequency slot.

* * * * *